United States Patent [19]

Wells

[11] 4,089,028

[45] May 9, 1978

[54] METHOD AND APPARATUS FOR CONTROLLING EXTERNAL DEVICES AND FOR TRANSFERRING INFORMATION

[75] Inventor: William R. Wells, Linwood, N.J.

[73] Assignee: United Audio Visual Corporation, Las Vegas, Nev.

[21] Appl. No.: 560,061

[22] Filed: Mar. 20, 1975

[51] Int. Cl.² .............................................. G03B 31/00
[52] U.S. Cl. ....................................... 360/79; 364/900
[58] Field of Search ................. 235/61.6 R, 61.11 E, 235/151.11; 318/39, 569, 571; 340/172.5; 360/80, 82, 83, 79; 364/900

[56] References Cited

U.S. PATENT DOCUMENTS

| | | | |
|---|---|---|---|
| 2,901,732 | 8/1959 | Canning | 340/172.5 |
| 2,935,732 | 5/1960 | Guerber | 340/172.5 |
| 3,007,137 | 10/1961 | Page | 340/172.5 |
| 3,552,037 | 1/1971 | Stern | 360/80 |
| 3,668,653 | 6/1972 | Fair et al. | 445/1 |
| 3,673,346 | 6/1972 | Gordon et al. | 360/80 |
| 3,772,473 | 11/1973 | Parham | 360/80 |
| 3,812,474 | 5/1974 | Linn et al. | 318/569 |
| 3,839,733 | 10/1974 | Schechter | 360/80 |
| 3,883,723 | 5/1975 | Lukstas | 235/61.11 E |

OTHER PUBLICATIONS

Bartee, Thomas C., Digital Computer Fundamentals, McGraw-Hill, (1966), pp. 292, 293.

Primary Examiner—Gareth D. Shaw
Assistant Examiner—Michael C. Sachs
Attorney, Agent, or Firm—Seidel, Gonda & Goldhammer

[57] ABSTRACT

A first set of digital signals is generated in response to information received from a magnetic tape. The first set of digital signals is stored. A second set of digital signals is generated in response to the first set of stored signals and information received from a punched tape. The second set of digital signals is stored. One or more external devices or peripheral control equipment connected to a plurality of external devices is controlled in response to the second set of stored signals. The second set of stored signals is transmitted in a form for storage on the magnetic tape or the punched tape.

8 Claims, 52 Drawing Figures

CUE INPUT CONTROL

BIT 9 INPUT CONTROL

CUE LOAD LOGIC

OSCILLATOR

INPUT/OUTPUT CONTROL

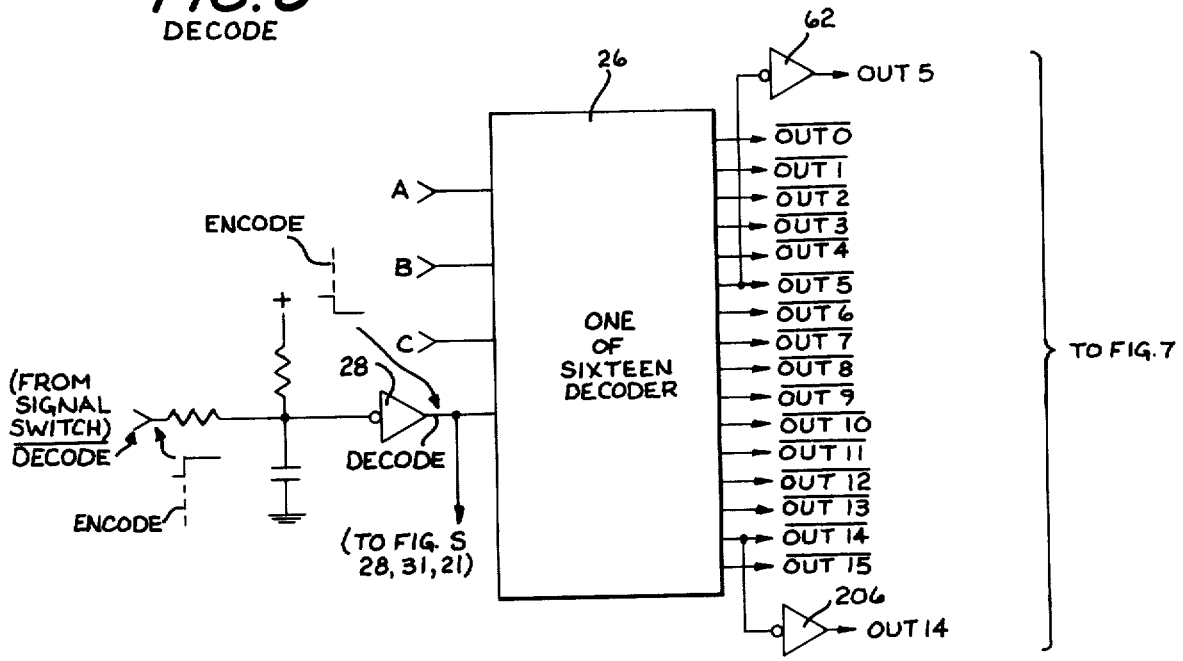
FIG. 8
DECODE
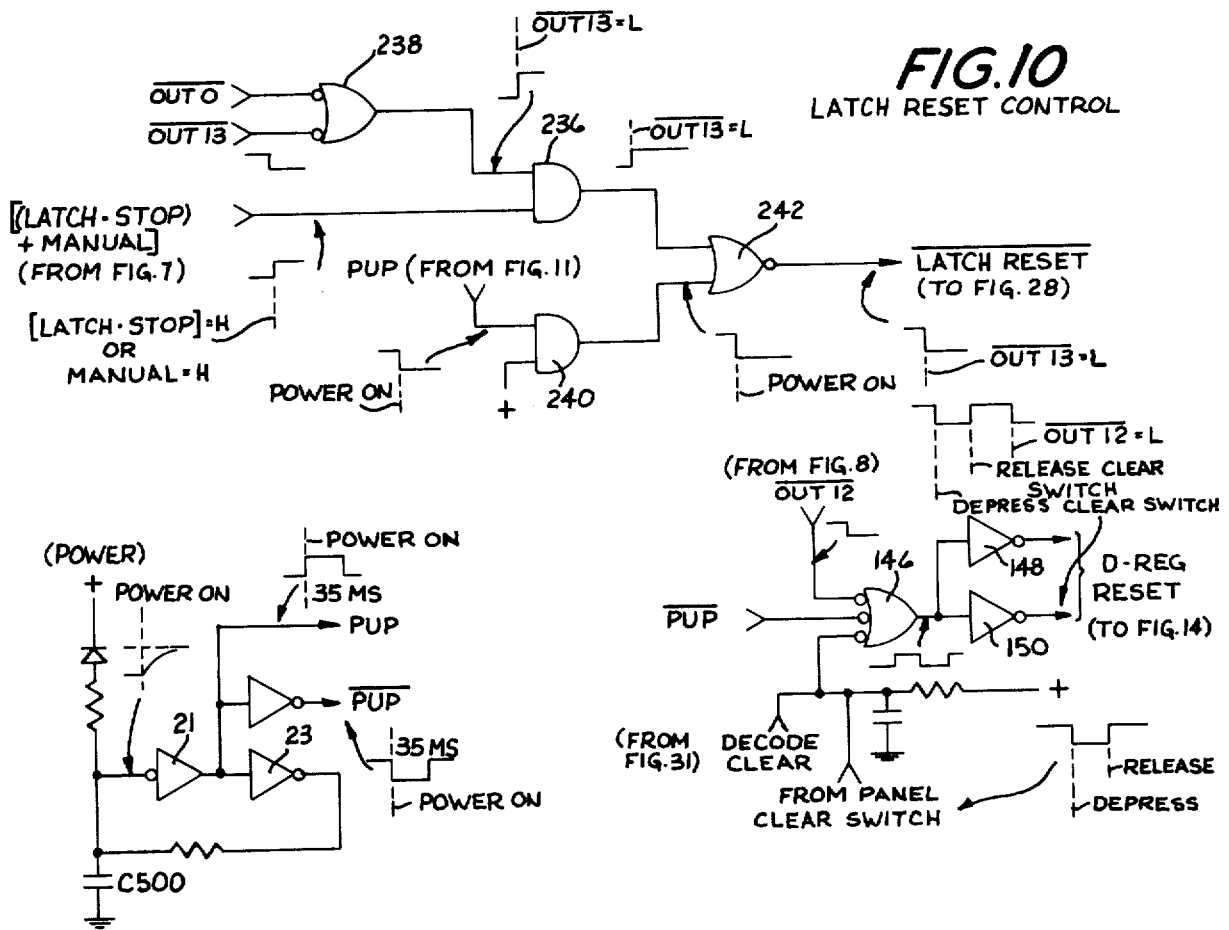
FIG. 10
LATCH RESET CONTROL
FIG. 11
POWER UP PULSE
FIG. 15
D-REGISTER PULSE

OPTICAL ISOLATOR

WORD SELECT

D-REGISTER LATCH

D-REGISTER LOAD

STOP DECODE

BUFFER

T-REGISTER LATCH

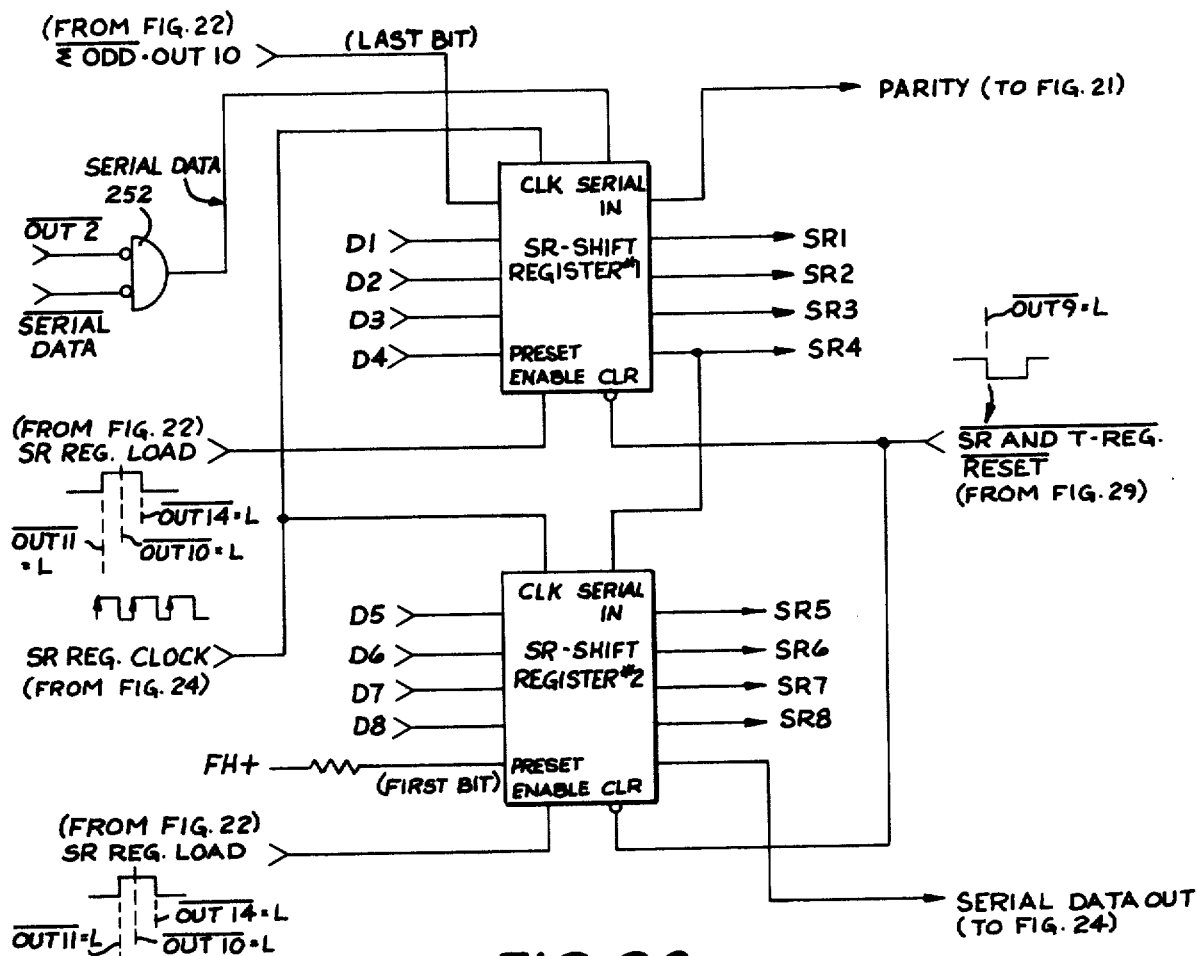
FIG. 20
SR SHIFT REGISTER
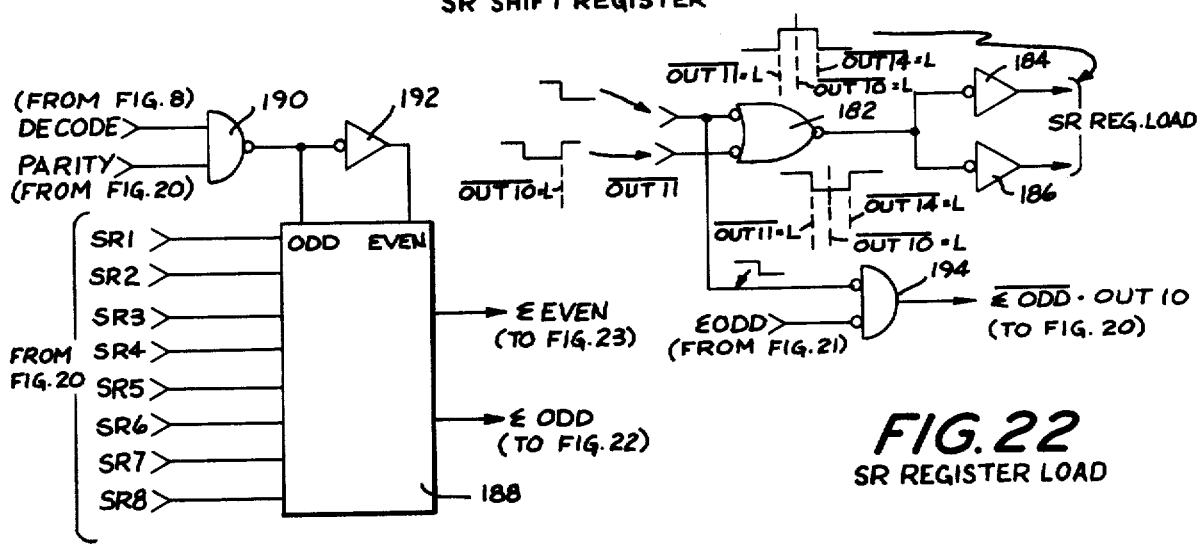
FIG. 21
PARITY CHECKER/GENERATOR
FIG. 22
SR REGISTER LOAD

LOAD T-REGISTER LATCH PARITY COMPARE

SR-REGISTER CLOCK CONTROL

END OF WORD DECODE

ERROR INDICATOR LOGIC

RECORDER DELAY DRIVER

RECORDER CONTROL

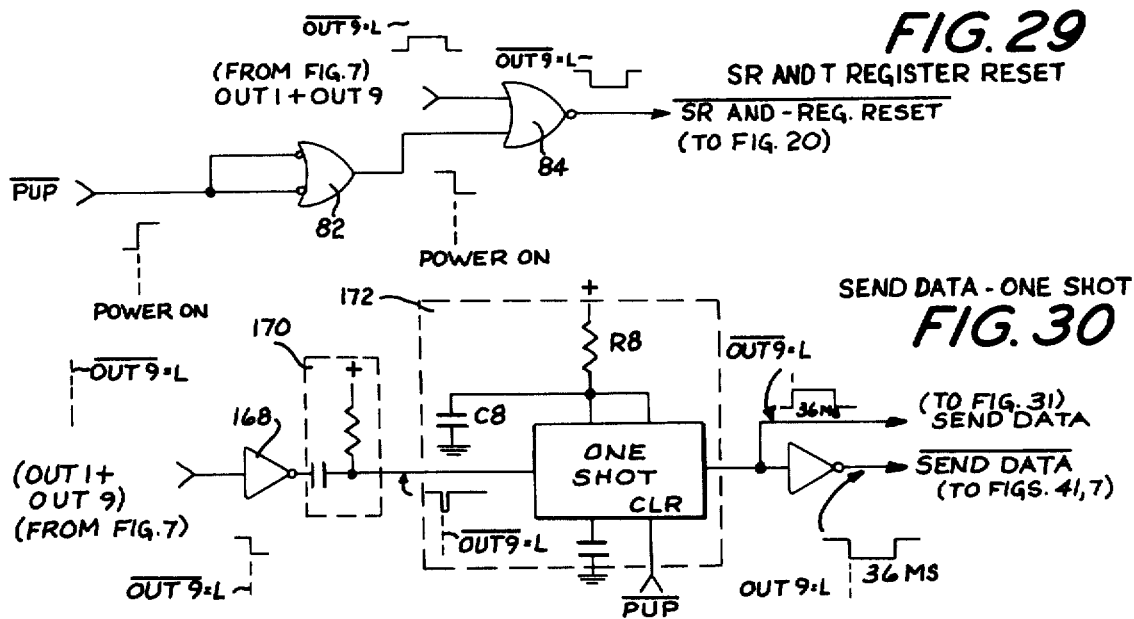
FIG. 29 SR AND T REGISTER RESET
FIG. 30 SEND DATA - ONE SHOT
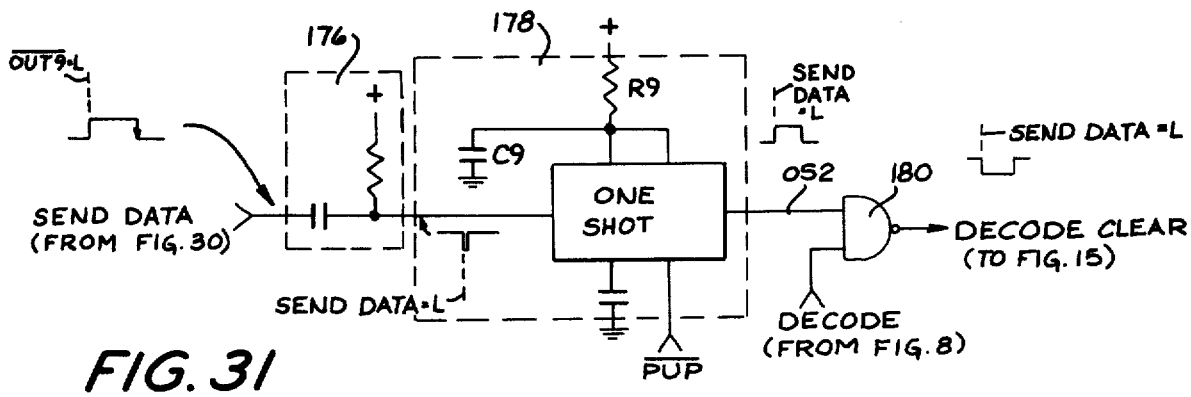
FIG. 31
CLEAR D-REGISTER DECODE ONLY
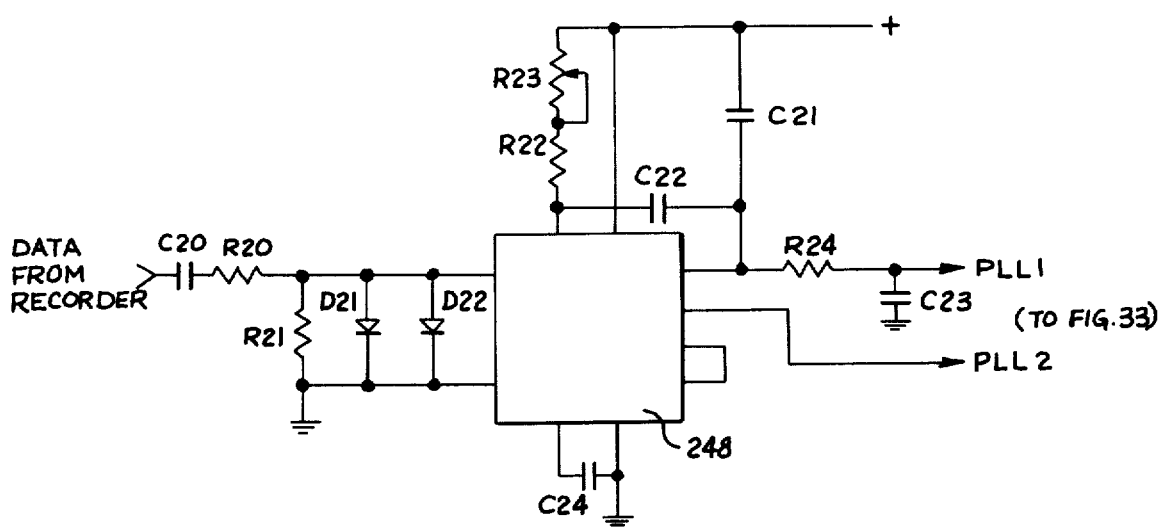
FIG. 32
RECEIVER PHASE LOCKED LOOP

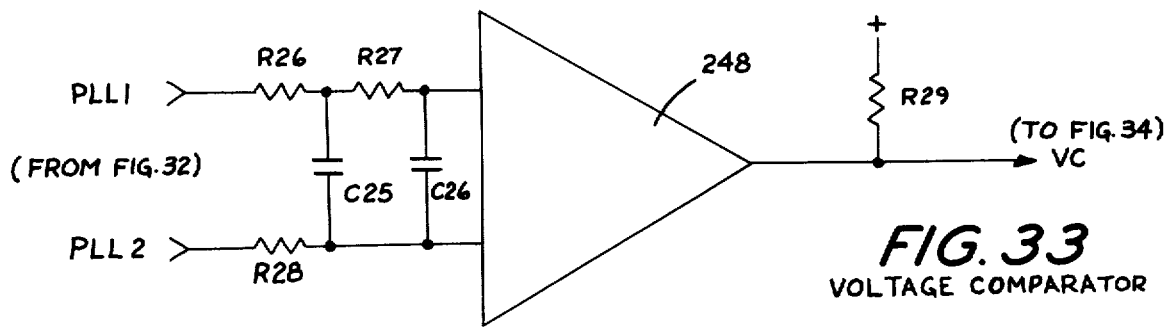
FIG. 33
VOLTAGE COMPARATOR
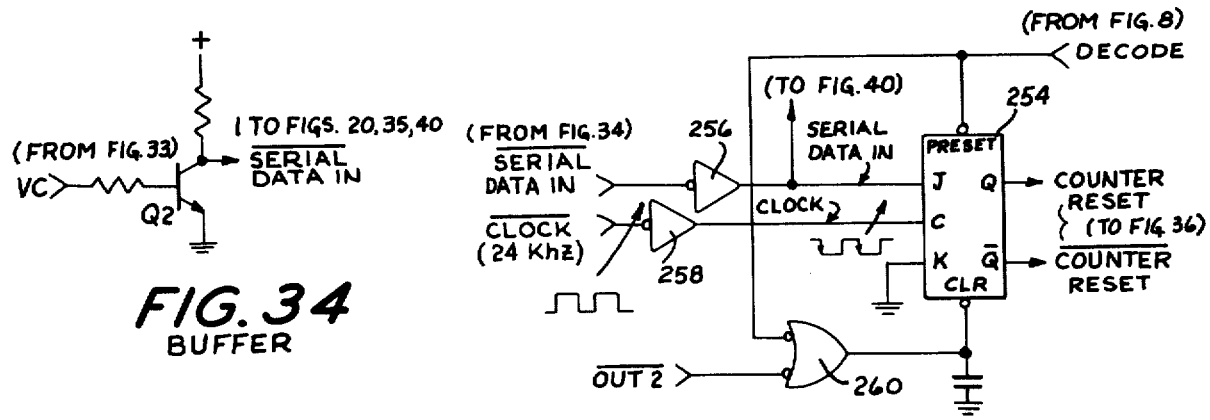
FIG. 34
BUFFER
FH BIT VERIFICATION/RESET COUNTERS
FIG. 35
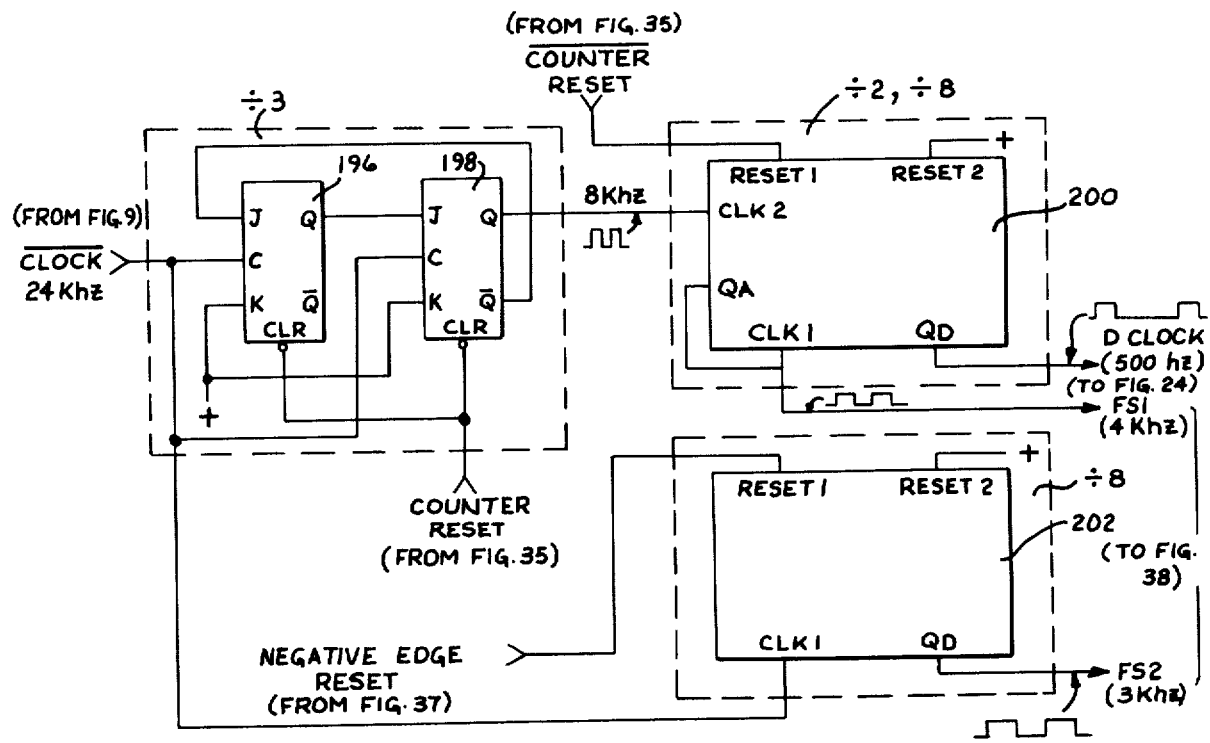
FIG. 36
FREQUENCY DIVISION

NEGATIVE EDGE RESET

RECEIVE CLOCK ENABLE

TRANSMIT LOGIC (FSK)

RECEIVE END DETECTION

EXTERNAL DECODE

PROJECT SELECTOR

RECORDER TAPE DATA FORMAT

RELAY BOARD

CHANNEL LIGHTS

OUTPUT DRIVE

METHOD AND APPARATUS FOR CONTROLLING EXTERNAL DEVICES AND FOR TRANSFERRING INFORMATION

BACKGROUND OF THE INVENTION

The present invention relates to a method and apparatus for controlling one or more external devices and transferring information. In particular, the present invention relates to a method and apparatus for directly controlling one or more external devices or indirectly controlling a plurality of external devices connected to peripheral control equipment, in response to information received from a magnetic tape or a punched tape, and for transferring information between punched and magnetic tapes.

Information for controlling a limited number of external devices may be supplied by a programmer with a punched tape storage facility. The operation of a programmer is generally described in my pending U.S. applications Ser. Nos. 537,724 now U.S. Pat. No. 3,947,819, 486,805, and 537,750 now U.S. Pat. No. 3,961,162, all of which are incorporated herein by reference. In general, the number of external devices which can be controlled by the programmer is limited by the programmer output channel capacity. For example, a programmer having eight output channels can control eight external devices.

To expand the number of external devices which can be controlled by the programmer, without modifying the number of physical programmer channels, peripheral control equipment — such as that described in my pending U.S. applications Ser. Nos. 537,724 now U.S. Pat. No. 3,947,819 and 486,805 now U.S. Pat. No. 3,961,162 — can be connected between the programmer and the external devices. Thus, for example, the number of external devices which can be controlled by an eight channel programmer can be expanded from eight to forty or more.

A programmer equipped with a punched tape storage facility detects the information stored on the punched tape and supplies that information in digital form directly to the external devices or the peripheral control equipment. A programmer with a punched tape storage facility, however, cannot detect information stored on a magnetic tape. Moreover, the digital representation of the information stored on the punched tape cannot be directly stored on a magnetic tape for later use.

It may, however, be desirable to control one or more groups of external devices in synchronism using a multiple track magnetic tape. Additionally, it may be desirable to use one track of the magnetic tape for controlling the external devices in synchronism with an entirely different function performed by another track of the magnetic tape. For example, in audio-visual applications, it may be desirable to have the audience listen to narrative description or background music stored on one track of the magnetic tape while controlling a number of external devices such as slide projectors, sound sources and so forth in synchronism with the narrative or background music. For this purpose, another track on the magnetic tape would be used to store the information for controlling the external devices.

Moreover, where information has already been stored on one of the punched and magnetic tapes, it may be desirable to transfer that information to the other of those tapes. For example, in audio-visual applications, the narrative description or background music may be pre-recorded on one track of the magnetic tape while the basic program for controlling the external devices has been recorded on the punched tape. To operate the external devices in synchronism with the narrative description or background music, the punched tape information should be transferred to another track on the magnetic tape.

Thus, a principal advantage of the present invention is to control a number of external devices either in response to informaton stored on a magnetic tape or on a punched tape.

A further advantage of the present invention is to transfer information between punched and magnetic tapes.

A still further advantage of the invention is to control a number of external devices and transfer information between punched and magnetic tapes without requiring the re-design of programmers and peripheral control equipment extant in the art.

Other advantages and applications of the present invention will become manifest from the following portions of the specification.

BRIEF SUMMARY OF THE INVENTION

A sequence of digital signals is generated in response to information received from a magnetic tape. The sequence of digital signals is converted to a first set of digital signals and stored in a first storing means. The first set of stored signals and information received from a punched tape are detected and a second set of digital signals is generated in response thereto. The second set of digital signals is stored in a second storing means.

One or more external devices and/or peripheral control equipment connected to a plurality of external devices are controlled in response to the second set of stored signals. The second set of stored signals is transferred out of the second storing means and transmitted in a form for storage on the magnetic tape. Alternatively, the second set of stored signals is transmitted for storage on the punched tape.

BRIEF DESCRIPTION OF THE DRAWINGS

FIGS. 4-45 are the circuits shown in block form in FIGS. 3A, 3B, 3C and 3D.

Figure 1:
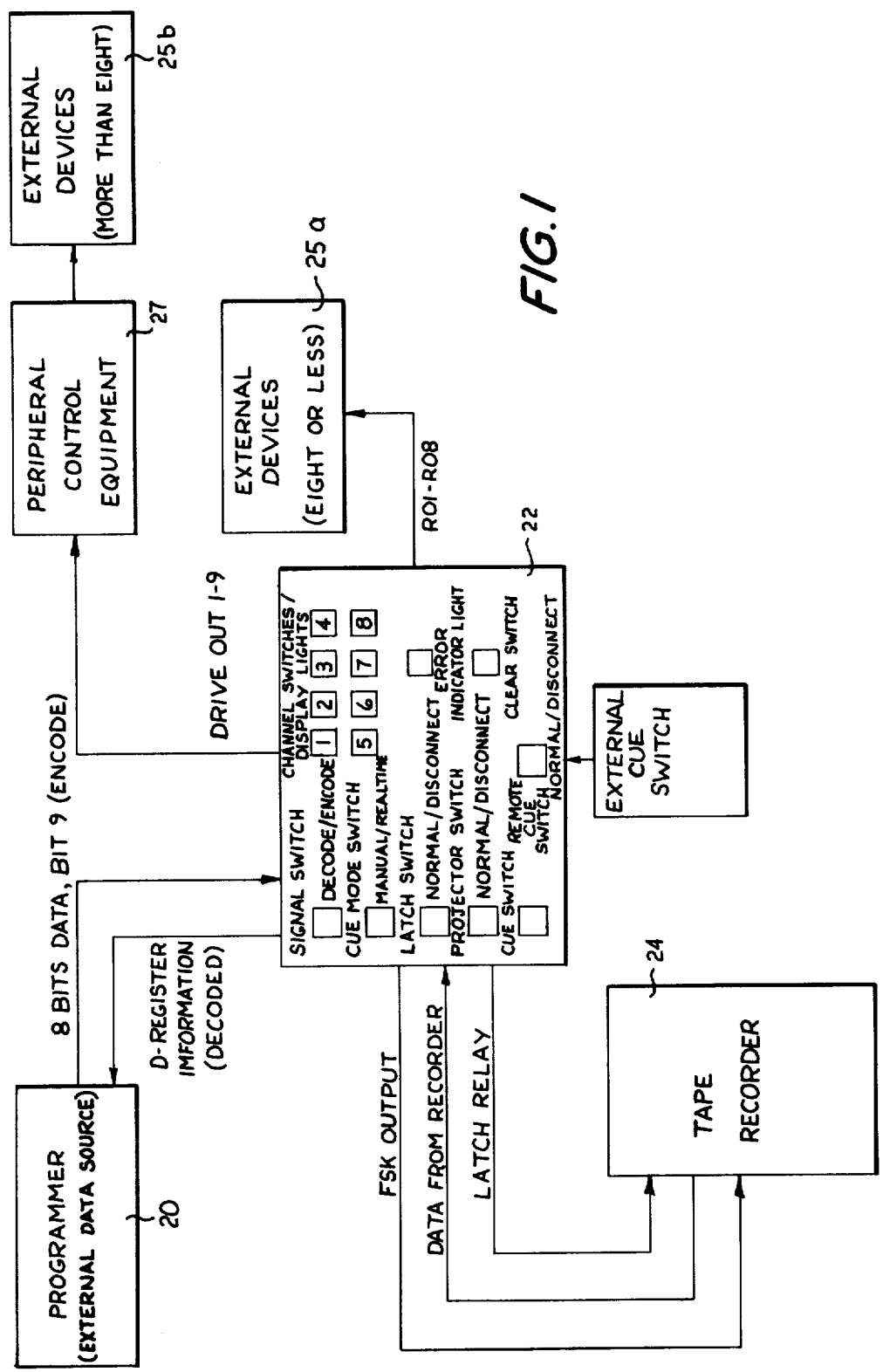
FIG. 1 is a schematic diagram showing the interconnection of a programmer, a tape recorder, one or more external devices, and peripheral control equipment to an apparatus constructed in accordance with the principles of the present invention.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Referring to the drawings, wherein like numerals indicate like elements, an external data source such as a programmer 20, FIG. 1, supplies data to an audio-processor constructed in accordance with the principles of the present invention and designated generally as 22. The audio-processor 22 processes the data supplied by programmer 20 and transfers the data to a tape recorder 24, a limited number of external devices designated generally as 25a, or peripheral control equipment designated generally as 27. The external devices 25a may be slide projectors, motion film projectors, sound sources or any machinery which can be operated by remote control. The peripheral control equipment 27 is used to expand the channel capacity of the audio-processor to permit control of a larger number of external devices designated generally as 25b. The operation of programmer 20 and peripheral control equipment 27 is explained in detail in my pending U.S. applications Ser. Nos. 537,724 now U.S. Pat. No. 3,947,819 and 537,750 now U.S. Pat. No. 3,961,162 which are incorporated herein by reference.

The transfer of data from programmer 20 to tape recorder 24 is hereinafter referred to as the "encode" mode of operation of the audio-processor. In addition to the encode mode, the audio-processor can be operated in "decode" mode. In the decode mode, data is transferred from tape recorder 24 to the external devices 25a or the peripheral control equipment 27 and/or programmer 20. In both the encode and decode modes, the audio-processor can automatically start and stop the tape recorder.

The programmer 20 stores data or information in a punched tape by punching holes at particular locations in the body of the tape. In general, the tape body is divided into a predetermined number of channels running across the length of the tape. Typically, a tape has eight such channels for storing data. The programmer is equipped with an electro-optical tape reader (not shown) for reading the data stored in the punched tape. In particular, at predetermined intervals of time, the tape reader detects the presence or absence of punched holes along a line transverse to the length of the tape. Each such transverse line contains information for controlling the external devices and peripheral control equipment at a particular instant of time and, accordingly, is called a "cue." A collection of cues on the tape constitutes a complete program for controlling the sequence of operating states of the external devices and peripheral control equipment over a designated time period. Thus, an entire sequence of operations can be stored on the punched tape.

A magnetic tape may also supply the information for controlling the external devices and peripheral control equipment. The information may be stored either directly on the magnetic tape, by manual operation of the audio-processor, or indirectly, by automatic transfer of the information from the programmer punched tape. To store the punched tape information on the magnetic tape, the audio-processor modifies the punched tape data format of cues and channels to accommodate the physical features of the magnetic tape. The audio-processor 22 stores data on the magnetic tape, either manually or by automatic transfer from the punched tape, depending on the positions of the panel switches shown in FIG. 1. Thus, the Signal, Cue Mode and Latch switches determine the modes of operation of the audio-processor. In Table 1, below, the operation of audio-processor 22 in the encode mode is summarized with respect to the states of these switches.

TABLE 1

| Panel Switches | | |
|---|---|---|
| Cue Mode | Latch | Mode of Operation |
| REAL TIME | NORMAL | Either automatically transfer punched tape data to magnetic tape or manually load data into audio-processor using Channel switches. Automatically start tape recorder. Automatically stop tape recorder only if STOP command appears on punched tape. |
| REAL TIME | DISCONNECT | Same as entry 1 but no automatic control over tape recorder. Tape recorder must be started and stopped manually. |
| MANUAL | NORMAL | Either automatically transfer punched tape data to magnetic tape or manually load data into audio-processor using Channel switches. Automatically start tape recorder. Send cue twice and automatically stop tape recorder. |
| Panel Signal switch in ENCODE Position | | |

The overall interconnection of the circuitry in the audio-processor 22 is given in FIGS. 3A, 3B, 3C and 3D. The states or phases of the audio-processor in both the encode and the decode modes of operation are identified by the outputs of the Status Decode circuit, FIG. 8, and the system phase diagram, FIG. 2. The Status Decode circuit includes a One of Sixteen Decoder 26 having four input terminals and 16 output terminals. In the embodiment described herein, One of Sixteen Decoder 26 may be a SN74154 4-line-to-16-line decoder/demultiplexer manufactured by Texas Instruments, Inc. Only one of the decoder outputs $\overline{OUT\ 0}$ – $\overline{OUT\ 15}$ will be at nominal ground or zero volts, hereinafter referred to as a digital "low" in accordance with conventional terminology, at any given instant of time. The particular decoder output which is "low" is determined by the states of the decoder input signals A, B, C and Decode, FIG. 8.

Figure 7:
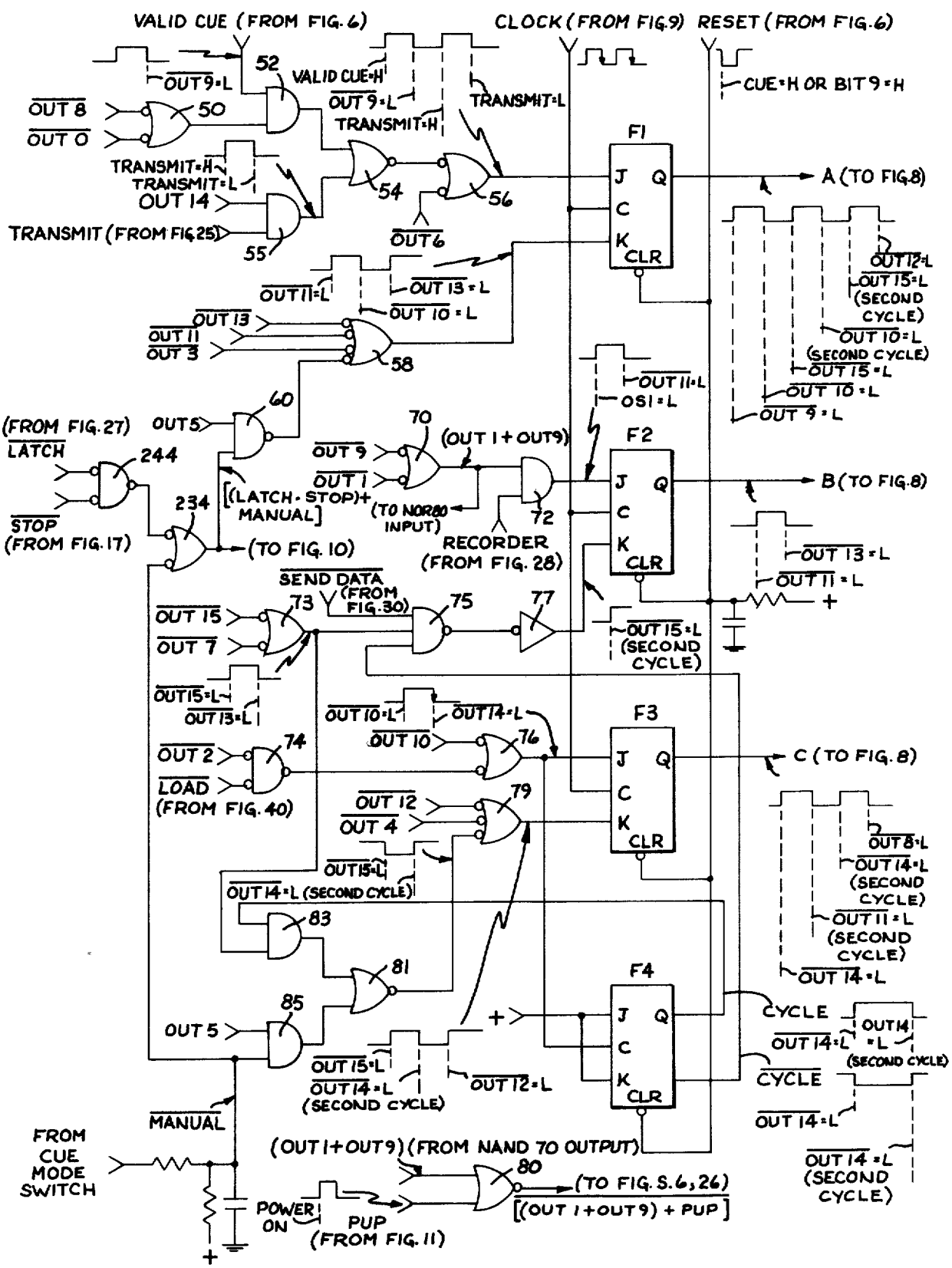

Input signals A, B and C to Decoder 26 are taken, respectively, from the Q outputs of flip-flops F1, F2 and F3 in the Input/Output Control circuit, FIG. 7. In the embodiment described herein, flip-flops F1, F2 and F3 may be SN74107 dual J-K master-slave flip-flops manufactured by Texas Instruments, Inc. For ease of reference, waveforms have been drawn at certain locations in FIG. 7 to indicate the operation of the Input/Output Control circuit in the encode mode. Similarly, in other of the drawings waveforms have been drawn to help visualize the operation of particular circuitry in the encode mode. It should be understood, however, that other waveforms may be generated at the same locations in the decode mode — and in some cases such waveforms have been drawn — as will become apparent from the following description.

Figure 3A:
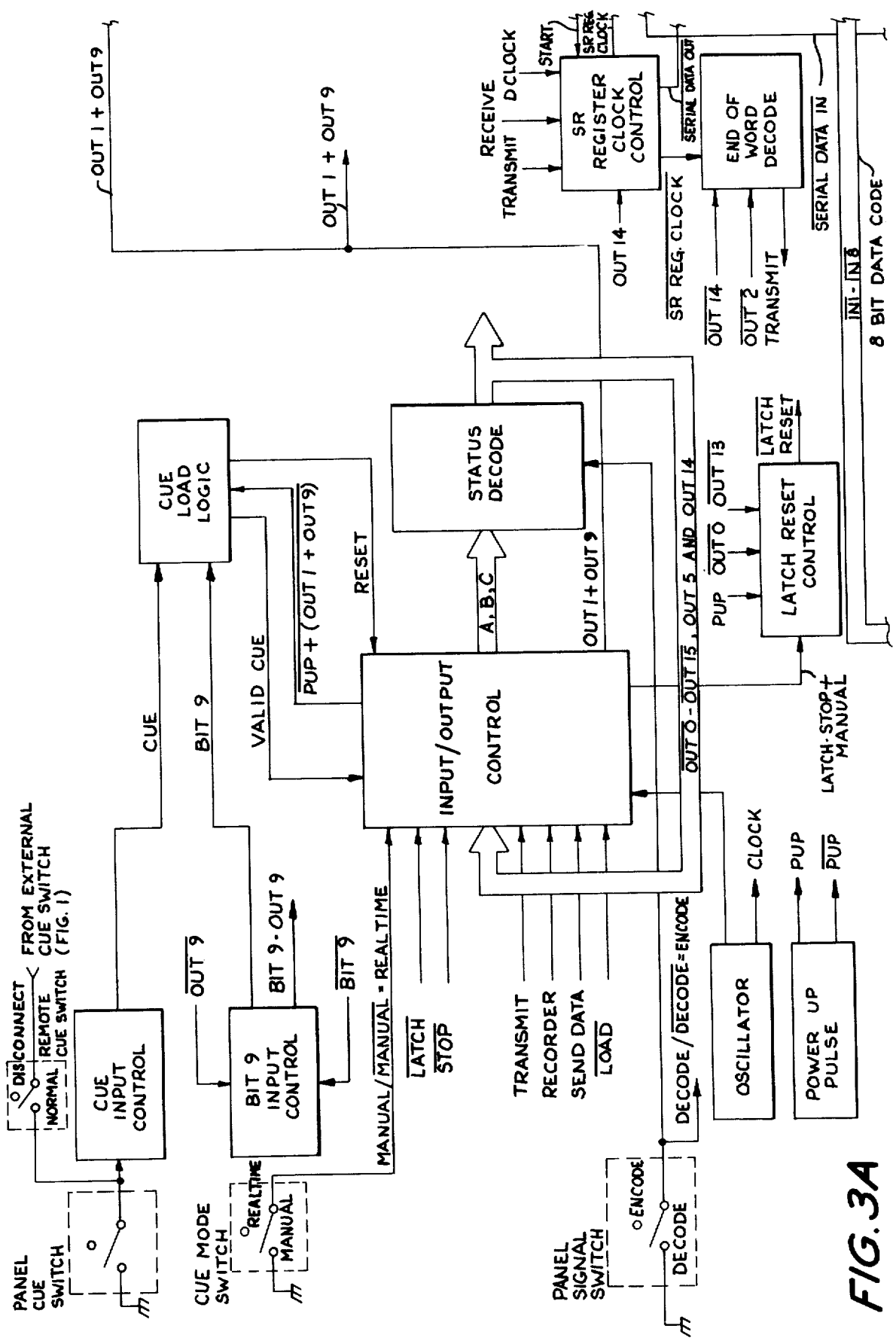
FIGS. 3A, 3B, 3C and 3D comprise a block diagram of the circuitry of the preferred embodiment described herein.

The Decode input to Decoder 26, FIG. 8, is taken from the output of an inverter 28 which is connected to the panel Signal switch, FIG. 3A. In the encode mode, the panel Signal switch is in the ENCODE position so that a positive voltage, hereinafter referred to as a digital "high" in accordance with conventional terminology, appears at the input to inverter 28. Accordingly, the Decode input to Decoder 26, FIG. 8, is "low" in the encode mode. The operation of Decoder 26 in the encode mode, as the A, B, and C outputs of the Input-/Output Control circuit, FIG. 7, vary is summarized in Table 2, below.

TABLE 2

| Operation of Decoder 26 In Encode Mode | | | | | | | | | | |
|---|---|---|---|---|---|---|---|---|---|---|
| Decoder Inputs | | | Decoder Outputs | | | | | | | |
| A | B | C | $\overline{OUT\,8}$ | $\overline{9}$ | $\overline{10}$ | $\overline{11}$ | $\overline{12}$ | $\overline{13}$ | $\overline{14}$ | $\overline{15}$ |
| L | L | L | L | H | H | H | H | H | H | H |
| H | L | L | H | L | H | H | H | H | H | H |
| L | H | L | H | H | L | H | H | H | H | H |
| H | H | L | H | H | H | L | H | H | H | H |
| L | L | H | H | H | H | H | L | H | H | H |
| H | L | H | H | H | H | H | H | L | H | H |
| L | H | H | H | H | H | H | H | H | L | H |
| H | H | H | H | H | H | H | H | H | H | L |

H = "high"
L = "low"
Decode (output of inverter 28) = L

Figure 6:
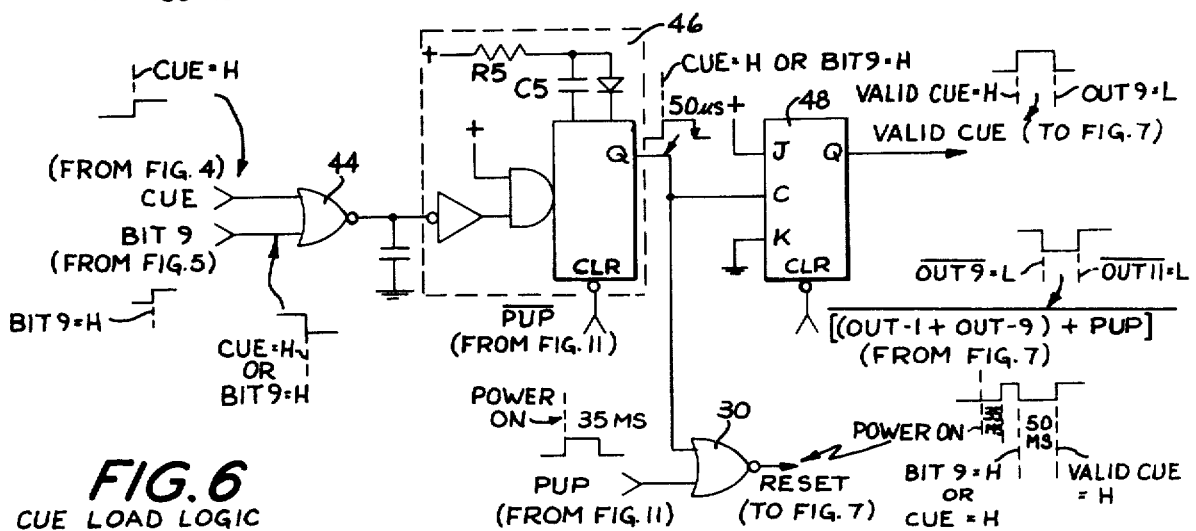

When power is first applied to the audio-processor 22, the Cue Load Logic circuit, FIG. 6, generates a "low" Reset output signal in response to the PUP signal input. More specifically, immediately after power is applied to the audio-processor, the capacitor C500 starts to charge to a positive voltage. While the capacitor is charging, the output of inverter 21 is "high." After approximately 35 ms, the capacitor is sufficiently charged to cause the output of inverter 21 to go "low." Thus, the Power Up Pulse circuit, FIG. 11, generates a "high" PUP signal when power is initially applied. The "high" PUP signal causes the reset signal output of NOR gate 30, FIG. 6, to go "low", resetting flip-flops F1, F2 and F3, FIG. 7. As a result, the A, B and C outputs of the Input/Output Control circuit, FIG. 7, go "low" after power is applied and the decoder $\overline{OUT\,8}$ goes "low," Table 2. Consequently, the audio-processor enters the First Phase, the "Begin Encode" Phase, Fig. 2.

Figure 2:
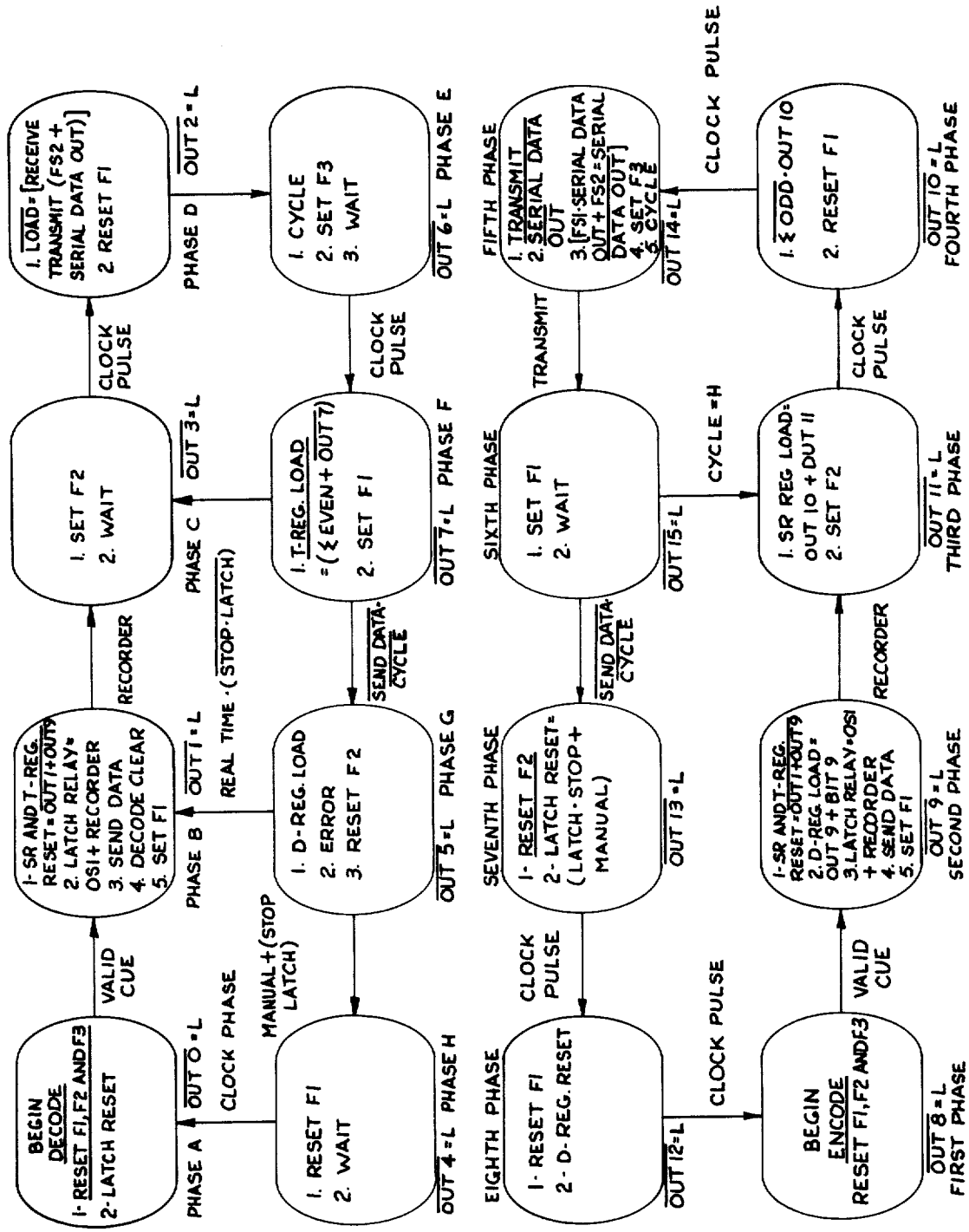
FIG. 2 is a phase diagram of the operating states or phases of the preferred embodiment described herein.

To enter the Second Phase, FIG. 2, a "high" Valid Cue signal must be generated. The Cue Load Logic circuit, FIG. 6, in response to either the Cue or Bit 9 signals, generates the "high" Valid Cue signal after decoder output $\overline{OUT\,8}$ has gone "low." More particularly, when either the panel Cue switch, FIG. 3A, is depressed momentarily or a Bit 9 signal is generated, FIG. 5, a "high" Valid Cue signal is generated.

Figure 4:
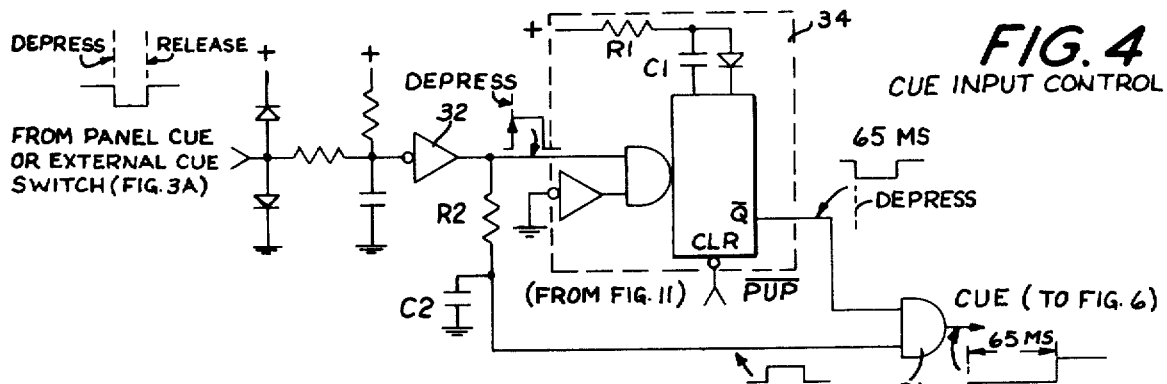

If the panel Cue switch 3A, is depressed momentarily, the input to inverter 32, FIG. 4, will be "low." The inverter 32 will therefore generate a "high" signal at its output, triggering one-shot 34. In response, one-shot 34 produces a "low" pulse at its $\overline{Q}$ output. In the embodiment described herein, one-shot 34 may be a SN74123 dual retriggerable monostable multivibrator manufactured by Texas Instruments, Inc. The duration of the pulse at the $\overline{Q}$ output of one-shot 34 is determined by the values of resistor $R_1$ and capacitor $C_1$ as is well-known in the art. In the embodiment described herein, resistor $R_1$ is 27K and capacitor $C_1$ is 10μf and the pulse width of the one-shot output is approximately 65ms. The resistor $R_2$ and capacitor $C_2$, FIG. 4, are connected to the output of inverter 32 and an input to AND gate 36 to prevent the AND gate from generating a Cue signal at its output before the one-shot output pulse begins. When the one-shot output pulse begins, it blanks AND gate 36, causing the Cue signal output to stay "low." When the one-shot output pulse expires, AND gate 36 will generate a "high" Cue signal if the output of inverter 32 is still "high." The purpose of the 65ms blanking period is to ensure that the one-shot 34 has not been triggered by noise and to make the Cue signal insensitive to switch bounce.

The Cue signal may also be generated by setting the Remote Cue switch, FIG. 3A, at NORMAL and momentarily depressing the External Cue switch. The External Cue switch may be a conventional Carousel remote control switch.

Figure 5:
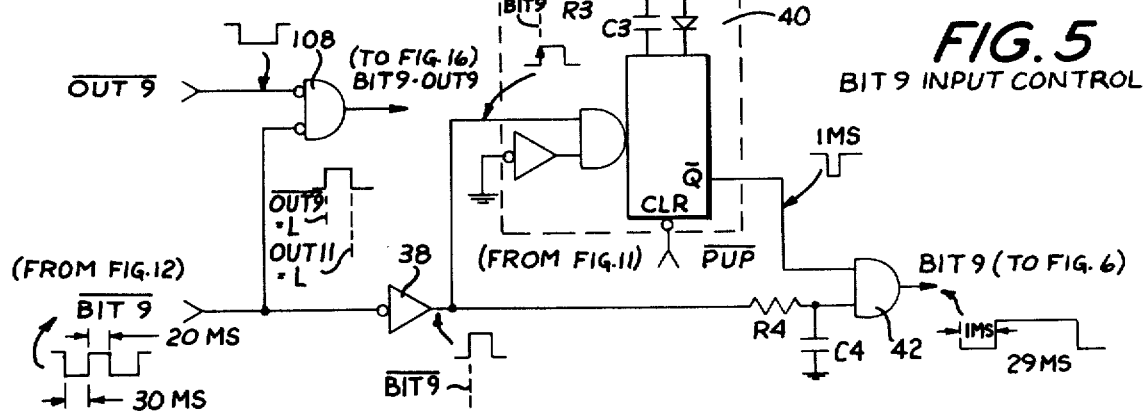

If the Panel Cue switch is not depressed, the input to inverter 32 will be "high" and the output of the inverter will be "low." The one-shot 34, therefore, will not be triggered and the Cue signal at the output of AND gate 36 will stay "low." The Valid Cue signal, FIG. 6, must then be generated in response to the Bit 9 signal, FIG. 5, not the Cue signal. The Bit 9 signal is generated by the Bit 9 Input Control circuit, FIG. 5, which is similar to the Cue Input Control circuit already described. The $\overline{Bit\,9}$ input signal to inverter 38, FIG. 5, is derived from the output of programmer 20, FIG. 1. More particularly, the $\overline{Bit\,9}$ input signal is derived from a $\overline{PBIT\,9}$ signal generated internally within programmer 20. The $\overline{PBIT\,9}$ is a synchronization signal which determines the rate at which the programmer 20 detects information on the punched tape. The $\overline{PBIT\,9}$ signal is supplied to an input to the Optical Isolator circuit, FIG. 12. The Optical Isolator circuit scales down the $\overline{PBit\,9}$ signal to produce the $\overline{Bit\,9}$ signal which appears at the input to inverter 38, FIG. 5. In the embodiment described herein, the $\overline{Bit\,9}$ signal is "low" for approximately 30ms and "high" for approximately 20ms and is repeated at a rate of approximately 20 pulses per second. During the 30 ms "low" portion of the $\overline{Bit\,9}$ signal, programmer 20 scans the punched tape and supplies the data inputs $\overline{1-8}$ to the Optical Isolator circuit, FIG. 21. The form of data inputs $\overline{1-8}$ is described in greater detail hereinafter with respect to the operation of the Word Select and D-Register Latch circuits.

The $\overline{Bit\,9}$ signal is inverted by inverter 38, FIG. 5. The rising edge of the output signal of inverter 38 triggers one-shot 40 which generates a "low" pulse, at its $\overline{Q}$ output, having a duration fixed by the values of resistor $R_3$ and capacitor $C_3$. In the embodiment described herein, one-shot 40 may be a SN74123 dual retriggerable monostable multivibrator, resistor $R_3$ is 6800 ohms and capacitor $C_3$ is 0.47μf. Accordingly, the duration of the one-shot output pulse is approximately 1ms. The resistor $R_4$ and the capacitor $C_4$ are connected to the output of inverter 38 and the input of AND gate 42 to prevent the generation of a Bit 9 signal at the output of AND gate 42 before the one-shot output pulse begins. When the one-shot output pulse begins, it blanks AND gate 42, causing the Bit 9 signal output to stay "low." When the one-shot pulse expires, AND gate 42 will generate a "high" Bit 9 signal if the output of inverter 38 is still "high." The purpose of the 1ms blanking period is to prevent the Bit 9 signal from going "high" if the one-shot is triggered by a noise pulse.

The outputs of AND gate 36, FIG. 4, and AND gate 42, FIG. 5, are connected to the inputs of NOR gate 44 in the Cue Load Logic circuit, FIG. 6. When either the Cue or Bit 9 signal goes "high," NOR gate 44 generates an inverted replica of the signal at its output, triggering one-shot 46. In the embodiment described herein, one-shot 46 may be a SN74123 dual retriggerable monostable multivibrator, resistor $R_5$ is 20K and capacitor $C_5$ is .001μf so that one-shot 46 generates a "high" pulse approximately 50μs long at its Q output. The Q output of one-shot 46 is connected to an input of NOR gate 30 and the Clock input of flip-flop 48. In the embodiment described herein, flip-flop 48 may be a SN74107 flip-flop. The rising edge of the output pulse generated by one-shot 46 causes NOR gate 30 to generate a "low" Reset signal, and the falling edge of the output pulse causes flip-flop 48 to generate a "high" Valid Cue signal at its Q output. As previously explained, the Reset signal appears at the Clear inputs of flip-flops F1, F2, F3 and F4, FIG. 7, resetting those flip-flops. Accordingly, at the rising edge of the one-shot output pulse, the A, B and C outputs of the Input/Output Control circuit are "low" and decoder output $\overline{OUT\ 8}$ is "low," Table 2, indicating that the audio-processor is in the First Phase. When, at the falling edge of the one-shot output pulse 50μs later, the "high" Valid Cue pulse appears at the Q output of flip-flop 48, FIG. 6, the Reset signal at the output of NOR gate 30 will return to the "high" level, freeing flip-flops F1, F2, F3 and F4.

When the Valid Cue signal is generated, the audio-processor enters the Second Phase, FIG. 2. In particular, since, in the First Phase only the decoder output $\overline{OUT\ 8}$ is "low", the output of NAND gate 50, FIG. 7, is "high," enabling AND gate 52. Therefore, when the "high" Valid cue signal appears at the input to AND gate 52, the AND gate generates a "high" signal at its output. Since the output of AND gate 52 is connected to an input to NOR gate 54, the NOR gate generates a "low" signal at this time. The "low" signal output of NOR gate 54 is inverted by NAND gate 56, causing the J input of flip-flop F1 to go "high."

Figure 9:
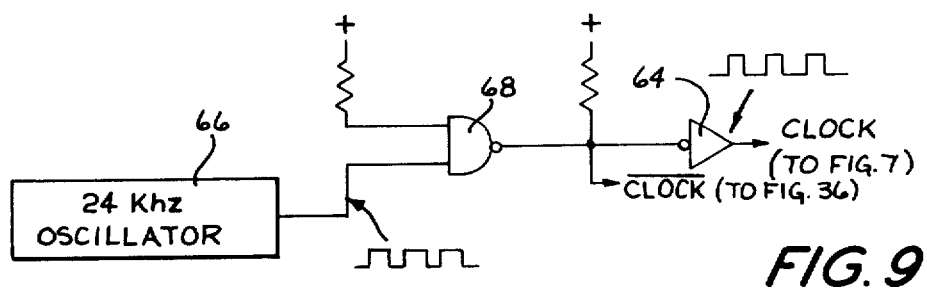

The Clock inputs of flip-flops F1–F4 are connected together to the output of inverter 64 in the Oscillator circuit, FIG. 9. The Oscillator circuit includes an oscillator 66 which generates a train of pulses at a 24Khz rate so that the interpulse period at the output of oscillator 66 is approximately 41.6μs. The 24Khz pulse train at the output of oscillator 66 is inverted by NAND gate 68 and re-inverted by inverter 64 so that the 24Khz pulse train appears at the Clock inputs of flip-flops F1–F4, FIG. 7. The first Clock pulse appearing at the Clock input of flip-flop F1 causes the Q output of the flip-flop to go "high" since the J input of the flip-flop has been driven "high" in response to the Valid Cue signal. Thus, the A signal input to Decoder 26, FIG. 8, goes "high." The B and C signal inputs to Decoder 26, however, remain "low" since the J inputs of flip-flops F2 and F3, FIG. 7, are "low" when the Clock pulse appears. This can be readily seen from Table 3, below, which summarizes the states of the inputs and outputs of the logical gating connected to the J inputs of flip-flops F2 and F3 prior to the Second Phase.

TABLE 3

| NAND gate 70 | | AND gate 72 | | J input flip-flop |
|---|---|---|---|---|
| inputs | output | inputs | output | F2 |
| $\overline{OUT\ 9}$=H | L | NAND 70 output=L | L | L |
| $\overline{OUT\ 1}$=H | | Recorder=L | | |
| OR gate 74 | | NAND gate 76 | | J input flip-flop |
| inputs | output | inputs | output | F3 |
| $\overline{OUT\ 2}$=H | H | OUT 10=H | L | L |
| $\overline{LOAD}$=H | | OR gate 74 | | |

TABLE 3-continued

FIRST PHASE
output=H

Thus, the decoder inputs B and C, FIG. 8, will remain "low" and the decoder input A will go "high" following the Valid Cue and Clock signals. Consequently, decoder output $\overline{OUT\ 9}$ will go "low" while all other decoder outputs will remain "high," indicating that the audio-processor has entered the Second Phase, FIG. 2.

When decoder output $\overline{OUT\ 9}$ goes "low," the output signal (OUT 1+OUT 9) of NAND gate 70, FIG. 7, goes "high," causing the input to NOR gate 80 to go "high." Accordingly, the output of NOR gate 80, $\overline{(OUT\ 1+OUT\ 9)+PUP}$, goes "low". The output of NOR gate 80 is connected to the Clear input of flip-flop 48, FIG. 6. Accordingly, when the decoder output $\overline{OUT\ 9}$ goes "low," flip-flop 48 is reset and the Valid Cue signal output of the flip-flop returns to the "low" level.

When, in the Second Phase, the Valid Cue output signal returns to the "low" level, the output of AND gate 52, FIG. 7, goes "low." Since the output, OUT 14, of inverter 206, FIG. 8, is "low" at this time-decoder output $\overline{OUT\ 14}$ being "high," Table 2 — the output of AND gate 55 will also be "low." Thus, both inputs to NOR gate 54 will be "low" and the NOR gate output will go "high." The output of NOR gate 54 appears at an input to NAND gate 56. The other input to NAND gate 56 is connected to decoder output $\overline{OUT\ 6}$ which is also "high," Table 2. The NAND gate 56 therefore drives the J input of flip-flop F1 "low." This, however, will not affect the Q output of flip-flop F1 when the next Clock pulse occurs because each of the inputs to NAND gate 58, FIG. 7, are "high," causing the NAND gate to keep the K input of flip-flop F1 "low." In addition, the J inputs to flip-flops F2 and F3 remain "low" during the Second Phase, until the Recorder output signal, FIG. 28, goes "high" so that the next Clock pulse will not change the states of flip-flops F2 and F3. This can be readily seen from Table 4, below, in which the states of the inputs and outputs of the logical gating connected to the J inputs of flip-flops F2 and F3, during the Second Phase, are summarized.

TABLE 4

| NAND gate 70 | | SECOND PHASE AND gate 72 | | J input flip-flop |
|---|---|---|---|---|
| inputs | output | inputs | output | F2 |
| $\overline{OUT\ 9}$=L | H | NAND 70 output=H | L | L |
| $\overline{OUT\ 1}$=H | | Recorder=L | | |
| OR gate 74 | | NAND gate 76 | | J input flip-flop |
| inputs | output | inputs | output | F3 |
| $\overline{OUT\ 2}$=H | H | OUT 10=H | L | L |
| $\overline{LOAD}$=H | | OR gate 74 output=H | | |

Thus, when decoder output $\overline{OUT\ 9}$ goes "low," the Clock pulses do not affect the states of flip-flops F1, F2 and F3 and audio-processor 22 remains in the Second Phase until the Recorder signal input to AND gate 72, FIG. 7, goes "high."

In the Second Phase, the T-Register Latch and SR-Shift Register circuits, FIGS, 19 and 20, must be reset. This function is performed by the SR and T-Register Reset circuit, FIG. 29. During the Second Phase, the decoder output $\overline{OUT\ 9}$ is "low" so that the (OUT 1+OUT 9) input signal to NOR gate 84, FIG. 29, is "high." The SR and T-Reg. Reset signal output of NOR gate 84 therefore goes "low," driving the Clear inputs to T-Register Latches 1 and 2, FIG. 19, and SR-Shift Registers #1 and 2, FIG. 20, "low." This resets the SR and T registers. When the T-Register Latches #1 and 2 reset, the eight outputs $\overline{Bit1}-\overline{Bit8}$ go "high." When the SR Shift Registers #1 and 2 reset, the ten outputs, Parity, SR1-SR8 and Serial Data Out, go "low." In the embodiment described herein, the T-Register Latches #1 and 2 may be SN74175 hex/quadruple D-type flip-flops manufactured by Texas Instruments, Inc. The SR Shift Registers #1 and 2 may be SN7496 5-Bit Shift registers also manufactured by Texas Instruments, Inc.

Figure 3B:
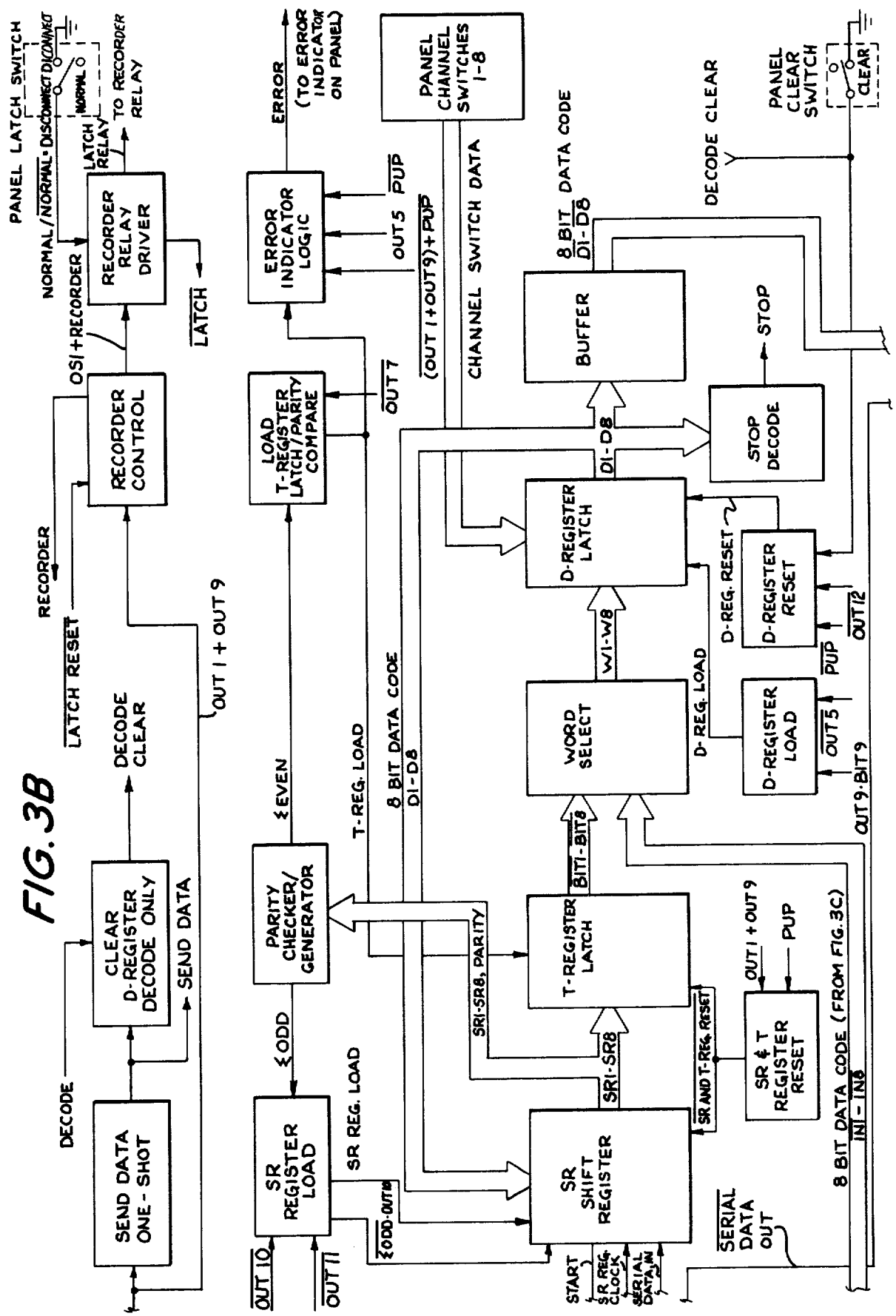
Figure 3C:
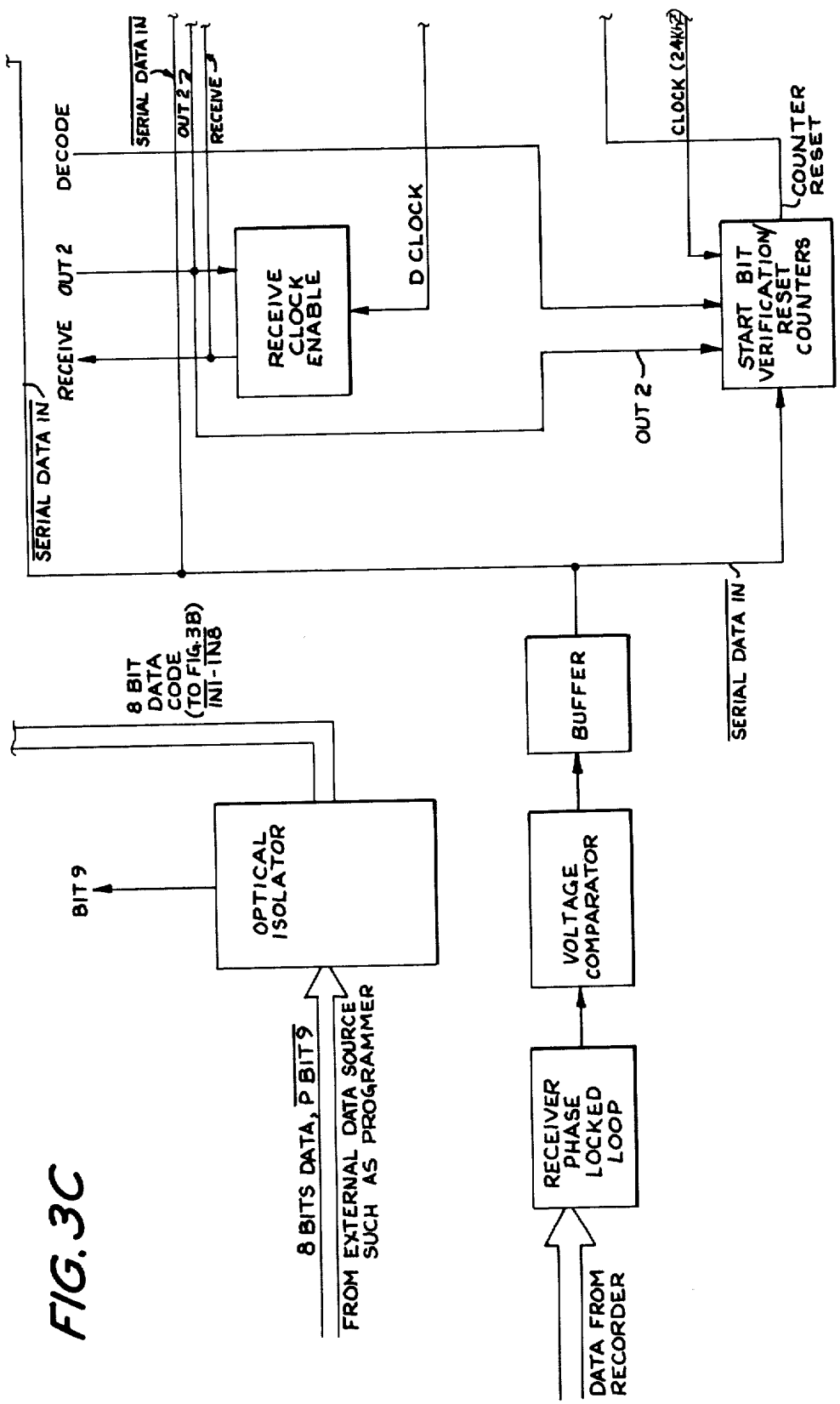
Figure 13:
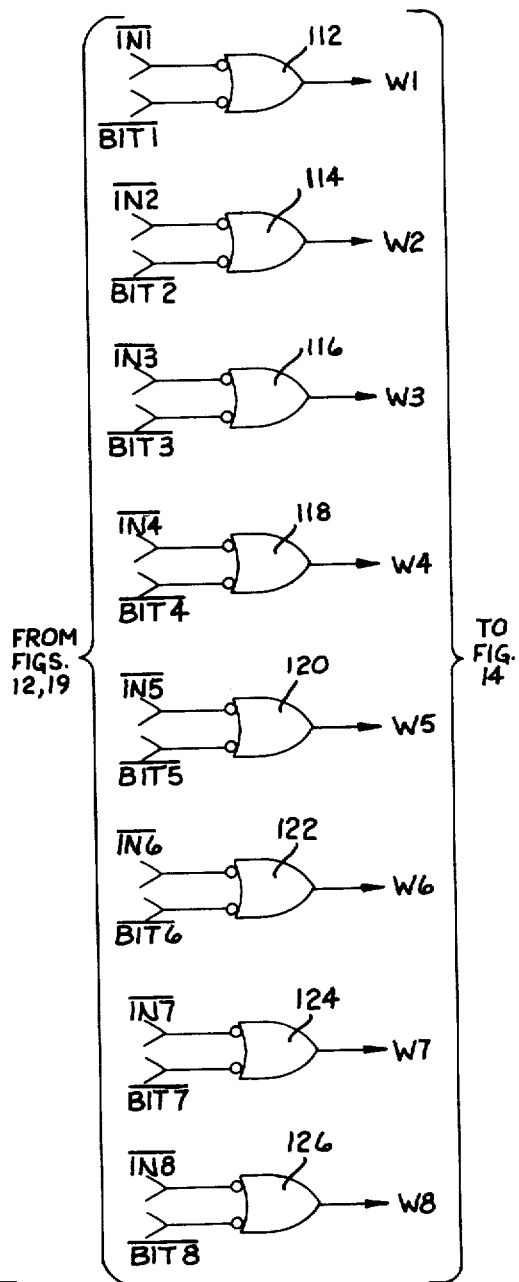
Figure 14:
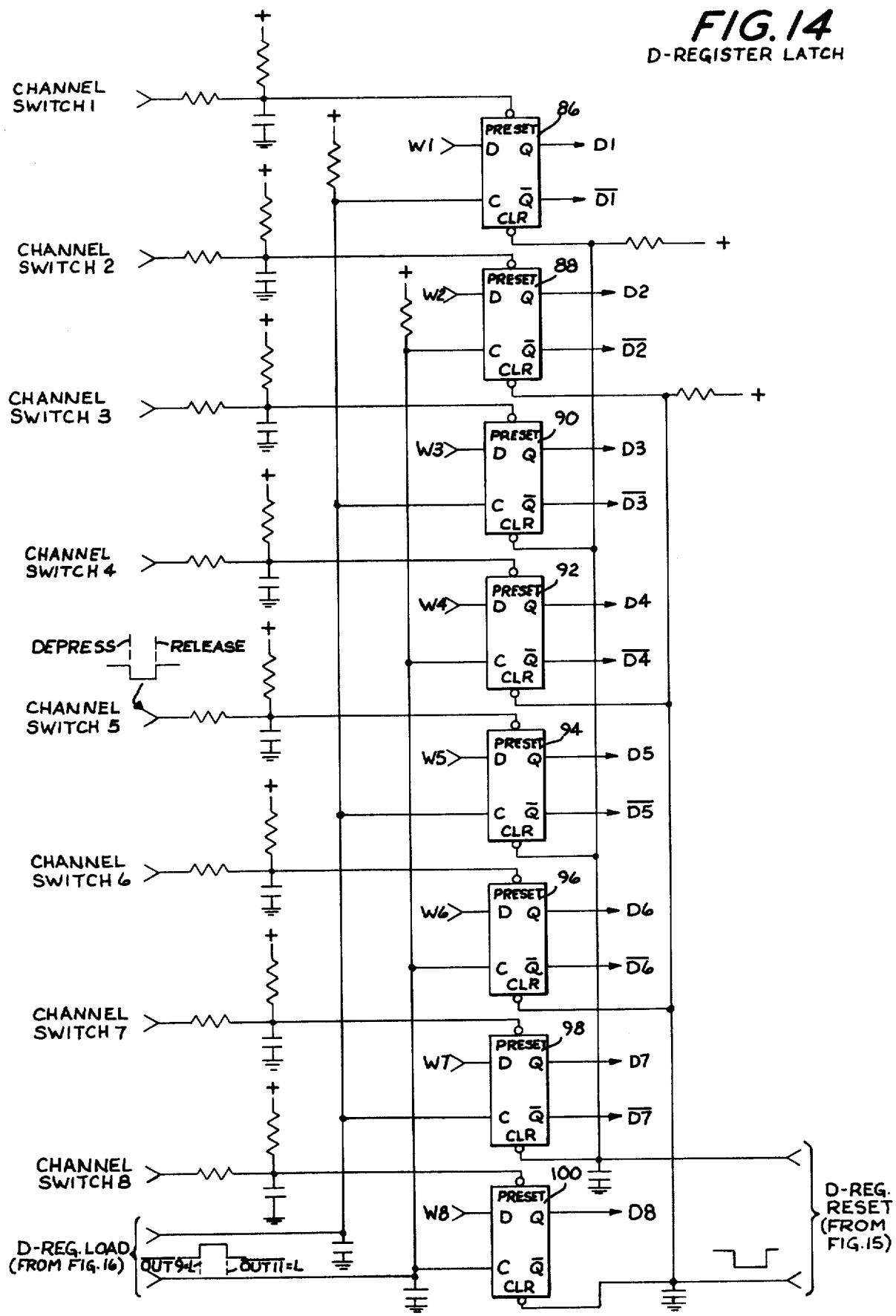

Also, while in the Second Phase, the D-Register Latch circuit, FIG. 14, can be loaded with the signal outputs W1-W8 of the Word Select circuit, FIG. 13. The overall connection of these circuits is shown in FIG. 3B. The D-Register Latch circuit includes even-numbered flip-flops 86-100, FIG. 14. The loading of data into the D-Register Latch flip-flpops 86-100 is controlled by the D-Reg. Load signals appearing at the outputs of inverters 102 and 104 in the D-Register Load circuit, FIG. 16. The outputs of inverters 102 and 104, FIG. 16, are connected respectively to the Clock inputs of even-numbered flip-flops 86, 90, 94 and 98 and even-numbered flip-flops 88, 92, 96 and 100, FIG. 14.

Figure 16:
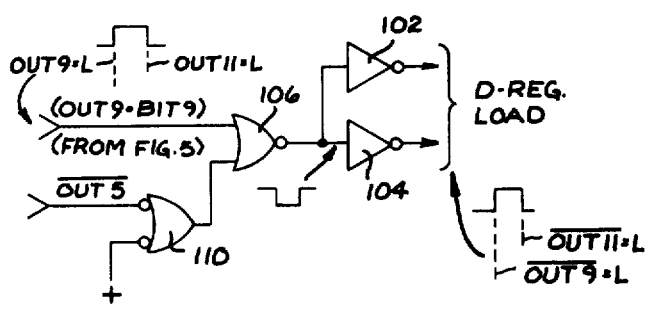

One input to NOR gate 106 in the D-Register Load circuit, FIG. 16, is connected to the output of NOR gate 108 in the Bit 9 Input Control circuit, FIG. 5. NOR gate 108 therefore generates a "high" output signal if decoder output $\overline{OUT\ 9}$ goes "low" while Bit 9 is "low," that is, while the programmer is supplying data to the audio-processor. The second input to NOR gate 106 is connected to the output of NAND gate 110. Since, during the Second Phase, the decoder output $\overline{OUT\ 5}$ is "high," Table 2, the output of NAND gate 110 is "low." Under these conditions, the output of NOR gate 106, FIG. 16, is the inverted replica of the NOR gate 108 output signal, FIG. 5. The D-Reg. Load output signal of inverters 102 and 104, therefore, will be a replica of the NOR gate 108 output signal.

In the preferred embodiment described herein, the D-Register Latch flip-flops 86-100, FIG. 14, may be SN7474-type positive-edge-triggered flip-flops manufactured by Texas Instruments, Inc. The rising edge of the D-Reg. Load signal clocks the data appearing at the D input of each of the flip-flops to the Q output terminal of the flip-flop. The data appearing at the D inputs of the flip-flops 86-100 are the signals W1-W8. Signals W1-W8 are generated at the outputs of the Word Select circuit, FIG. 13.

The Word Select circuit includes eight even-numbered NAND gates 112-126. The inputs to NAND gates 112-126 are the signal pairs $\overline{IN1}$,Bit1 - $\overline{IN8}$,Bit8. The input signals $\overline{IN1} - \overline{IN8}$ are generated by the Optical Isolaor circuit, FIG. 12, and the $\overline{Bit1}-\overline{Bit8}$ signals are generated by the T-Register Latch circuit, FIG. 19. As previously mentioned, during the Second Phase, the T-Register Latch circuit is reset so the $\overline{Bit1}-\overline{Bit9}$ signals are "high." During the encode mode, the T-Register Latch circuit is not loaded. Accordingly, the $\overline{Bit1}-\overline{Bit9}$ signals remain "high" and the outputs, W1-W8, of the Word Select circuit are determined by the signals $\overline{IN1}$ -$\overline{IN8}$.

Figure 12:
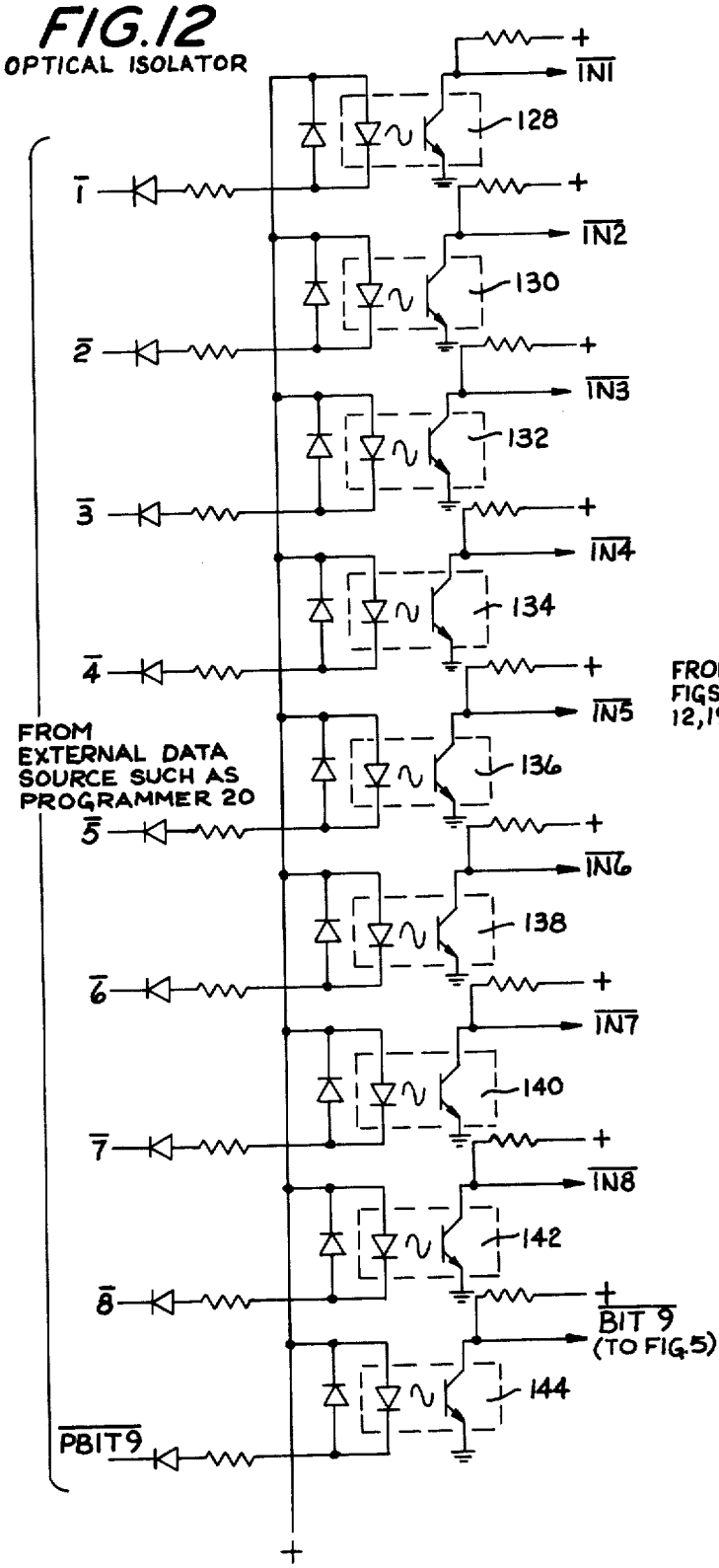

Referring to FIG. 12, the Optical Isolator circuit includes nine even-numbered optical voltage isolator circuits 128-144 which are connected to the outputs of the external data source, in this case programmer 20. Assuming that programmer 20 operates with an 8 channel punched tape, the programmer output signals $\overline{1-8}$ represent the information stored on the tape. In particular, if one of these output signals is "low," it indicates that the associated tape channel contains a punched hole. On the other hand, if the output signal is "high," it indicates that the associated tape channel has not been punched. As mentioned previously, the $\overline{PBit\ 9}$ output signal is not derived from the punched tape but is separately generated by the programmer. The $\overline{PBit\ 9}$ signal is a series of "low" pulses of approximately 30 ms duration at a pulse repetition rate of 20 pulses per second. When the $\overline{PBit\ 9}$ signal is "low", it indicates that a cue on the punched tape is being scanned by the programmer tape reader and that data is being supplied by the programmer 20 to the audioprocessor 22. The optical isolators 128-144 scale down their respective inputs so that the output signals will be compatible with the particular digital logic elements used in audio-processor 22.

The Word Select circuit, FIG. 13, inverts the input signals $\overline{IN1} - \overline{IN8}$ and feeds this information to the D-Register Latch circuit, FIG. 14, in the form of signals W1-W8. Thus, if a hole is present in a particular tape channel, say the 5th tape channel, the programmer output $\overline{5}$ will be "low," causing the output $\overline{IN5}$ of optical voltage isolator circuit 136, FIG. 12, to go "low," Accordingly, the output, W5, of NOR gate 120, FIG. 13, will be "high." When the D-Reg. Load signal appears at the Clock input of flip-flop 94, FIG. 14, the "high" W5 signal at the D input of the flip-flop will be transferred to the Q output of the flip-flop, that is, the Q output signal D5 will go "high." If, on the other hand, no hole has been punched in the 5th channel, the programmer output $\overline{5}$ will be "high," causing the optical voltage isolator circuit output $\overline{IN5}$ to go "high." As a result, the output W5 of NAND gate 120 will be "low" and, when the D-Reg. Load signal appears at the Clock input of flip-flop 94, the Q output of the flip-flop will remain "low," that is, the output signal D5 will stay "low."

In the immediately preceding description of the Word Select and D-Register Latch circuits, data is automatically transferred from the programmer punched tape to the D-Register Latch circuit. Data, however, may also be manually loaded into the D-Register Latch circuit at any time. To load the D-Register Latch circuit manually, the Channel switches, FIG. 1, are depressed to preset the D-Register Latch flip-flops 86-100, FIG. 14. When depressed, a Channel switch connects the Preset terminal of the associated D-Register Latch flip-flop to ground. When the Preset terminal of the flip-flop is grounded, the Q output of the flip-flop goes "high." Thus, for example, if Channel switch 5 is depressed, the Present input of flip-flop 94 will go "low" causing the D5 output signal to go "high."

If the wrong combination of Channel switches has been depressed, the D-Register Latch flip-flops can be cleared by manually depressing the panel Clear switch, FIG. 3B. By depressing the panel Clear switch, a "low" signal is generated at the input to NAND gate 146, FIG. 15, causing the output of the NAND gate to go "high." The output of NAND gate 146 is inverted by inverters 148 and 150 which generate the D-Reg. Reset signal at their outputs, FIG. 15. The D-Reg. Reset signal appears at the Clear inputs of the D-Register Latch flip-flops 86-100, FIG. 14, so that depressing the panel Clear switch causes the flip-flops 86–100 to be reset. The flip-flops can then be correctly loaded by again depressing the Channel switches #1–8.

Figure 18:
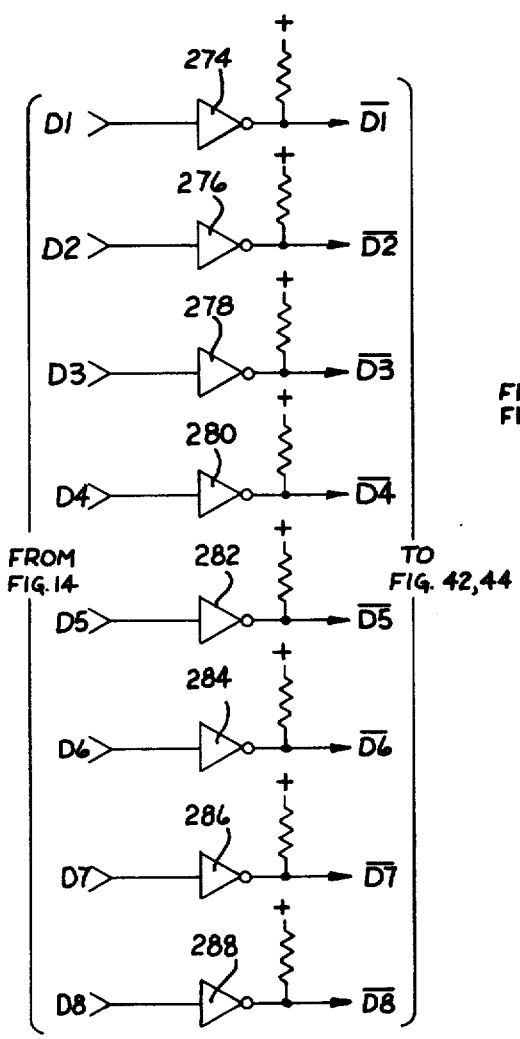
Figure 44:
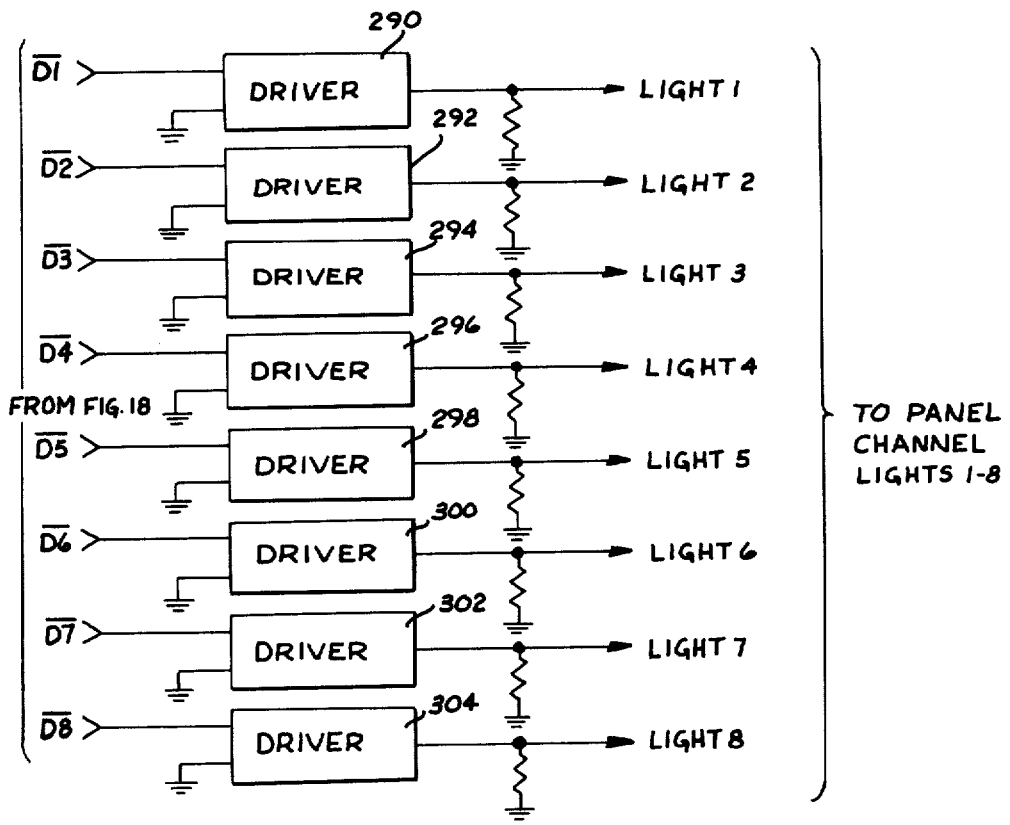

Whether the D-Register flip-flops, FIG. 14, are loaded manually or automatically, those panel Channel Display Lights, FIG. 1, which correspond to those of the eight channels which carry data will be turned "on" by the Channel Lights circuit, FIG. 44. Thus, the Q outputs of D-Register flip-flops 86–100 are inverted by inverters 274–288 in the Buffer circuit, FIG. 18. The Buffer circuit outputs, $\overline{D1}$–$\overline{D8}$, control the Channel Lights circuit drivers 290–304, FIG. 44. In the preferred embodiment described herein, drivers 290–304 may be SN75453 peripheral drivers. When the driver input goes "high," the driver turns the associated Channel Display Light "on."

Figure 27:
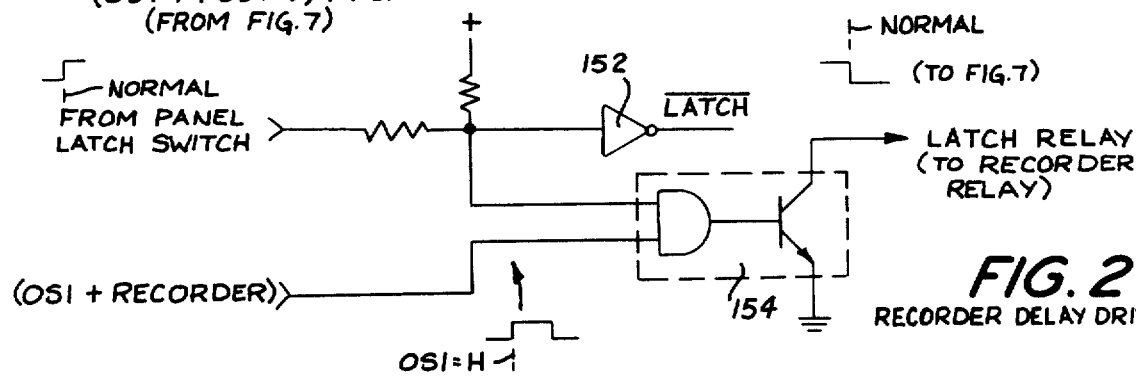
Figure 28:
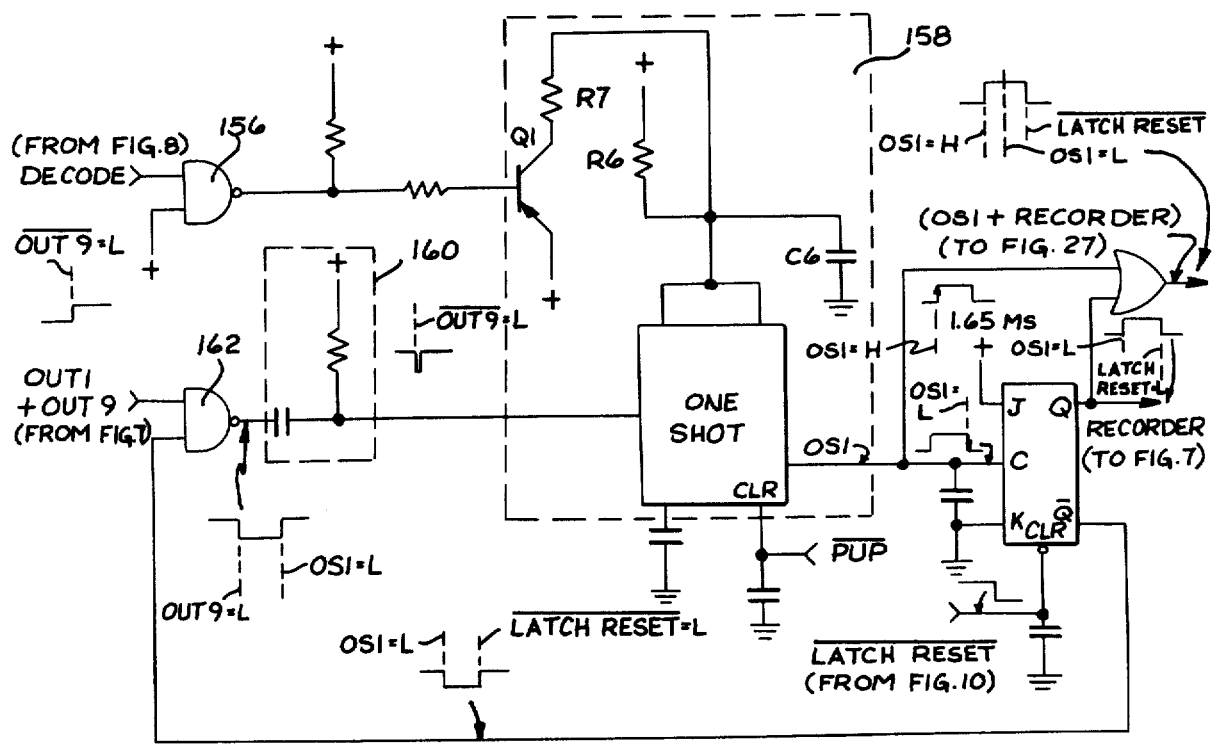

During the Second Phase, if the panel Latch switch, FIG. 3B, is in the NORMAL position, the tape recorder is automatically started by the Recorder Control circuit, FIG. 28, in cooperation with the Recorder Relay Driver circuit, FIG. 27. In particular, when the panel Latch switch is in the NORMAL position, the input to inverter 152, FIG. 27, is "high." Accordingly, the $\overline{\text{Latch}}$ signal at the output of inverter 152 is "low." The "high" signal at the input to inverter 152 also appears at the input to peripheral driver 154. In the embodiment described herein, peripheral driver 154 may be a SN75452 peripheral driver manufactured by Texas Instruments, Inc. When both inputs to the peripheral driver are "high," the Latch Relay output signal goes "low." The "low" Latch Relay signal operates a Recorder Relay (not shown), causing the tape recorder to start up.

Assuming that the panel Signal switch is in the ENCODE position, the Decode signal input to NAND gate 156, FIG. 28, is "low." Accordingly, transistor $Q_1$ in one-shot circuit 158 is "off" and the time constant of the one-shot circuit is determined by resistor $R_6$ and capacitor $C_6$. In the embodiment described herein, one-shot circuit 158 may be a Signetics 556 multivibrator, resistor $R_6$ is 100K and capacitor $C_6$ is 15μf, resulting in a one-shot output pulse OS1 which is approximately 1.65 sec long. As will be described more fully hereinafter, in the decode mode of operation, transistor $Q_1$ is turned "on" and the time constant of one-shot circuit 158 is determined by capacitor $C_6$ and resistor $R_6$ in parallel with resistor $R_7$ resulting in a one-shot output pulse of approximately 0.5 sec duration.

The one-shot circuit 158 is triggered by the output of differentiator circuit 160. The input to differentiator circuit 160 is the output of NAND gate 162. The output of NAND gate 162 goes "low" when both of its inputs are "high." Initially, the $\overline{Q}$ output of flip-flop 164 is "high." Since, as previously mentioned, the decoder output $\overline{\text{OUT 9}}$ is "low" during the Second Phase, the input signal (OUT 1+OUT 9) to NAND gate 162 is "high." Consequently, the output of NAND gate 162 goes "low," causing differentiator circuit 160 to trigger one-shot 158. When triggered, one-shot 158 generates a "high" pulse at its OS1 output.

The trailing edge of the OS1 output signal triggers the Clock input of flip-flop 164. In the embodiment described herein, flip-flop 164 may be a SN74107 dual J-K master-slave flip-flop. When flip-flop 164 is triggered, the Recorder output signal at the Q output of the flip-flop goes "high" and the $\overline{Q}$ output of the flip-flop goes "low." Accordingly, the output of NAND gate 162 returns to the "high" level.

Although flip-flop 164 is triggered by the falling edge of the OS1 signal, the peripheral driver 154 is turned "on" at the rising edge of the OS1 signal. The Recorder output signal of flip-flop 164 therefore is generated at the falling edge of the OS1 output signal, while the tape recorder starts at the rising edge of the OS1 signal. Thus, the Recorder output signal of flip-flop 164 is not generated until the tape recorder has been turned on for the length of the OS1 output pulse, namely, approximately 1.65 sec. The 1.65 sec interval permits the tape recorder motor to achieve a stable operating speed before the Recorder output signal of flip-flop 164 is generated. As will be shown hereinafter, data is not transferred to the SR Shift Register circuit, FIG. 20, until the Recorder output signal of flip-flop 164 goes "high," that is, until the tape recorder has reached a stable operating speed.

Once the peripheral driver 154, FIG. 27, is turned "on" by the output of OR gate 166, FIG. 28, it remains "on" until the Latch Reset signal at the Clear input to flip-flop 164 goes "low." Thus, the rising edge of the OS1 signal causes OR gate 166 to turn the peripheral driver 154 "on" and the Recorder output signal of flip-flop 164, generated at the falling edge of the OS1 signal, causes OR gate 166 to keep the peripheral driver "on." Tape recorder 24, therefore, stays "on," once it is started by the OS1 signal, until the $\overline{\text{Latch Reset}}$ signal resets flip-flop 164. The $\overline{\text{Latch Reset}}$ signal is described more fully hereinafter with respect to the operation of the Latch Reset Control circuit, FIG. 10.

In addition, in the Second Phase, the peripheral control equipment 27 and external devices 25a, FIG. 1, are operated by the audio-processor 22 in accordance with the data loaded into the D-Register Latch circuit, FIG. 14. In particular, the Send Data One Shot circuit, FIG. 30, and the Projector Select circuit, FIG. 41, control the Output Drive circuit, FIG. 45, and the Relay Board circuit, FIG. 42. The Output drive circuit operates the peripheral control equipment 27, FIG. 1, and the Relay Board circuit operates the external devices 25a. Thus, in the Second Phase, the (OUT1+OUT9) signal, FIG. 7, goes "high," causing the output of inverter 168 in the Send Data One Shot circuit, FIG. 30, to go "low." The output of inverter 168 appears at the input to differentiator circuit 170. The differentiator circuit 170 differentiates the output of inverter 168 and triggers the one-shot circuit 172. When triggered, one-shot 172 produces a "high" Send Data output pulse. The length of the Send Data pulse is determined by the resistor $R_8$ and the capacitor $C_8$ in one-shot circuit 172. In the embodiment described herein, one-shot circuit 172 may be a Signetics 556 multivibrator, resistor $R_8$ is 33K and capacitor $C_8$ is 1μf, so that the length of the Send Data pulse is approximately 36ms. Inverter 174 inverts the Send Data output pulse at its $\overline{\text{Send Data}}$ output. The $\overline{\text{Send Data}}$ output of inverter 174, FIG. 30, is connected to an input to NOR gate 306 in the Projector Select circuit, FIG. 41. The other input to NOR gate 306, the $\overline{\text{Projector}}$ input, is connected to the panel Projector switch, FIGS. 1 and 3D. When the Projector switch is in the NORMAL position, the input to NOR gate 306 will be "low." Consequently, when the Send Data signal goes "low" in the Second Phase the output of NOR gate 306 will go "high." The "high" NOR gate 306 output is inverted to a "low" signal at the output of inverter 308. The output of inverter 308 is connected to an input to NOR gate 310. The other input to NOR gate 310 is connected to the External output from the External Decode circuit, FIG. 43.

The purpose of the External Decode circuit is to determine whether the D-register data $\overline{D1}$-$\overline{D8}$ should be transmitted to the peripheral control equipment 27, FIG. 1, or to the external devices 25a. As mentioned previously, the purpose of peripheral control equipment 27 is to expand the channel output capacity of audio-processor 22. As described in my pending U.S. applications Ser. Nos. 486,805 and 537,724, now U.S. Pat. No. 3,947,819 which are incorporated herein by reference, peripheral control equipment 27 will typically expand the channel output capacity of a device such as the audio-processor from eight to forty or more channels. If, however, eight or less external devices are to be operated by the audio-processor 22, there is no need for peripheral control equipment 27. That is, the audio-processor is provided with eight output channels R01-R08, FIG. 42, which can drive eight external devices. Thus, peripheral control equipment 27 will not be connected to the audio-processor if only eight or less external devices are to be driven.

Figure 43:
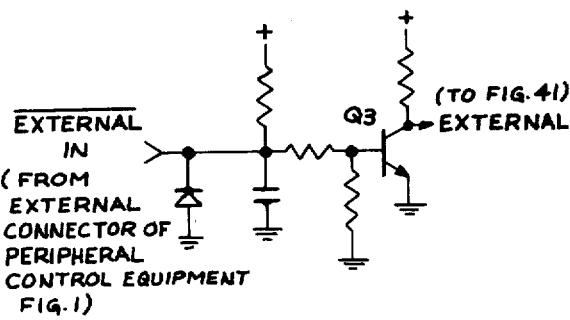

The $\overline{External\ In}$ input to the External Decode circuit, FIG. 43, is connected to an external connector (not shown) in peripheral control equipment 27 when the peripheral control equipment is connected to audio-processor 22, FIG. 1. The external connector is connected to ground. Thus, if the peripheral control equipment is connected to the audio-processor, the $\overline{External\ In}$ input to the External Decode circuit, FIG. 43, will be grounded or "low." If, on the other hand, the peripheral control equipment is not connected to the audio-processor, the $\overline{External\ In}$ input, FIG. 43, will be open and transistor $Q_3$ will turn "on." Accordingly, the External output of transistor $Q_3$ will go "low." The External output, FIG. 43, is connected to the input to NOR gate 310 in the Projector Select circuit, FIG. 41.

Figure 41:
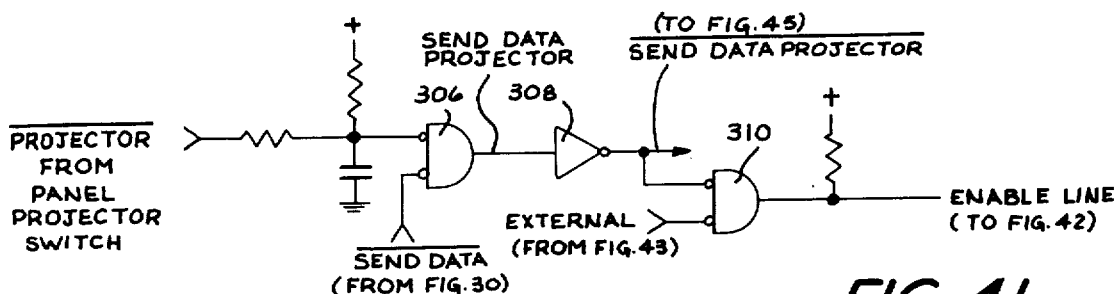
Figure 42:
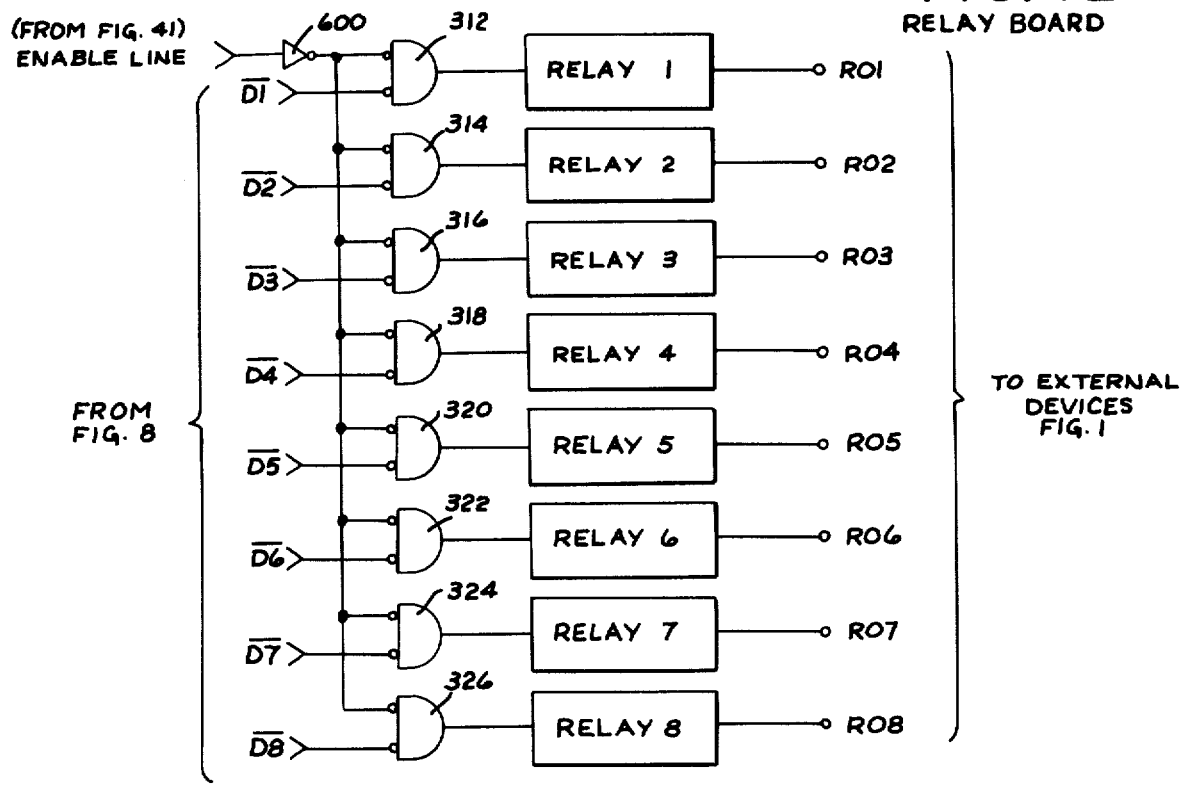

Therefore, if eight or less external devices are being driven by the audio-processor and the Projector switch is at NORMAL, both inputs to NOR gate 310, FIG. 41, will be "low" when the Send Data signal, FIG. 30, goes "low." Accordingly, the Enable Line output signal, FIG. 41, will go "high." The Enable Line output is connected through an inverter 600 to the inputs to NOR gates 312-326 in the Relay Board circuit, FIG. 42. Thus, when the Enable Line signal goes "high," it enables NOR gates 312-326. The NOR gates 312-326 are then free to respond to the inputs $\overline{D1}$-$\overline{D8}$ from the Buffer circuit, FIG. 18. Relays #1-8, FIG. 42, therefore control the external devices in response to the outputs of NOR gates 312-326.

If more than eight external devices 256, FIG. 1, are to be controlled by audio-processor 22, however, the audio-processor must control the external devices by means of peripheral control equipment 27. When the peripheral control equipment is connected to the audio-processor, the External output of the External Decode circuit, FIG. 43, goes "high," as previously explained. As a result, the Enable Line output of the Projector Select circuit, FIG. 41, goes "low," disabling the Relay Board AND gates, FIG. 42. Relays #1-8, therefore, are not used when the peripheral control equipment 27 is connected to audio-processor 22.

Figure 45:
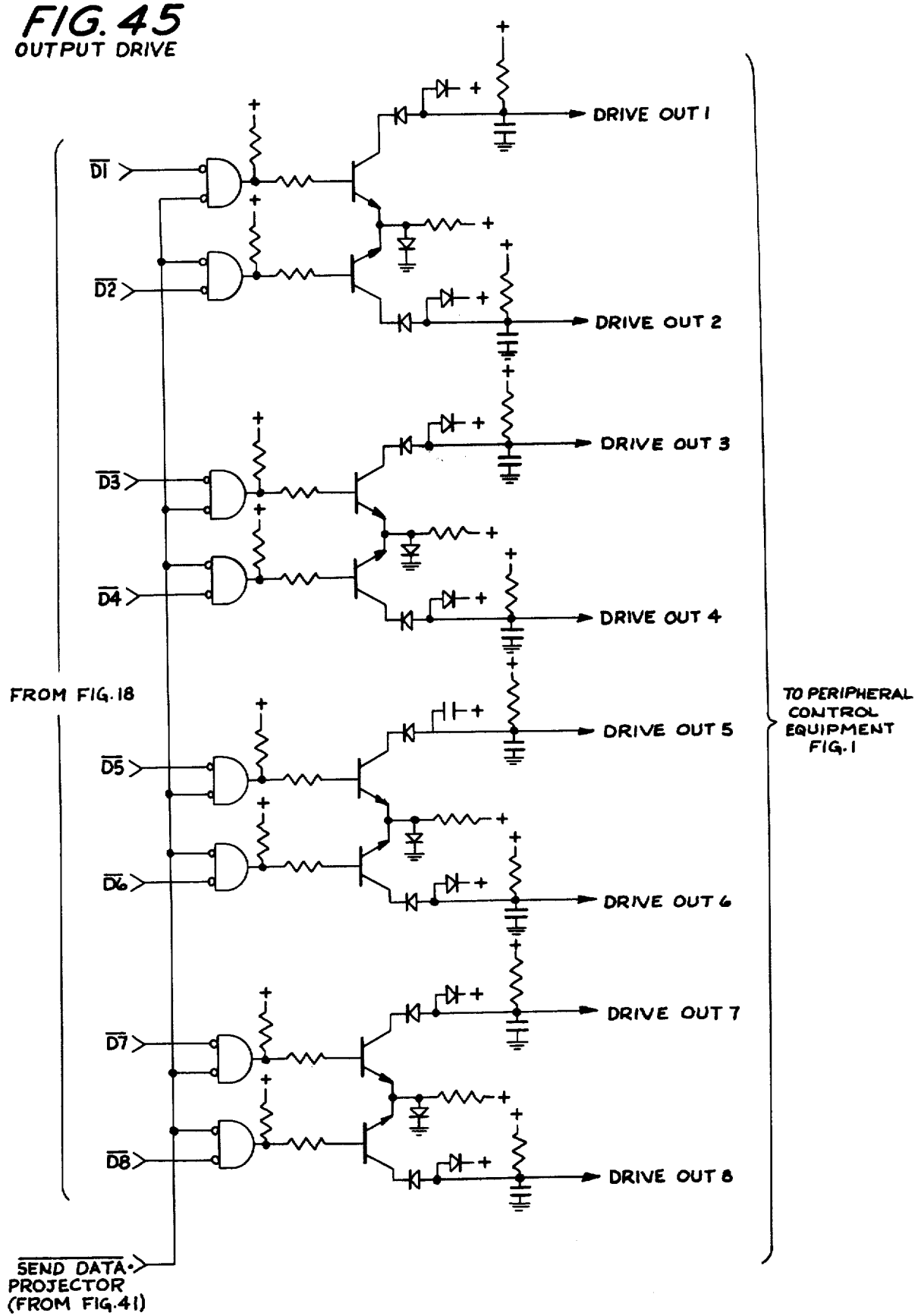

The peripheral control equipment 27, FIG. 1, is driven by the Output Drive circuit, FIG. 45, when the Projector switch is at NORMAL and the Send Data pulse is generated in the Second Phase, FIG. 2. Thus, when the Send Data·Projector signal at the output of inverter 308, FIG. 41, goes "low," it drives the inputs to NOR gates 328-342, FIG. 45, "low." The NOR gates 328-342 are therefore free to respond to the inputs $\overline{D1}$-$\overline{D8}$ generated by the Buffer circuit, FIG. 18. That is, the Drive Out 1-8 outputs of the OUtput Drive circuit, FIG. 45, control the peripheral control equipment 27 in accordance with the D-register data.

The Send Data output of one-shot circuit 172 is also connected to the input of differentiator circuit 176 in the Clear D-Register Decode Only circuit, FIG. 31. The differentiator circuit 176 differentiates the Send Data signal and triggers the one-shot circuit 178. When triggered, one-shot circuit 178 generates a "high" output pulse OS2 whose length is determined by resistor $R_9$ and capacitor $C_9$. In the embodiment described herein, one-shot circuit 178 may be a Signetics 556 multivibrator, resistor $R_9$ is 100K and capacitor $C_9$ is 0.01μf.

The OS2 output of one-shot circuit 178 is connected to an input of NAND gate 180. The other input of NAND gate 180 is connected to the output of inverter 28, FIG. 8. In the encode mode, as previously described, the output of inverter 28 is "low." Therefor, the Decode Clear output of NAND gate 180 remains "high" in the encode mode. That is, in the encode mode, the Decode Clear output of NAND gate 180 is insensitive to the OS2 output pulse. Consequently, in the encode mode, the Decode Clear output of NAND gate 180 does not activate the D-Register Reset circuit, FIG. 15, to reset the D-Register Latch circuit, FIG. 14. Thus, the D-Register Latch circuit either is automatically loaded with the programmer punched tape information at the D-Reg. Load signal pulse repetition rate or is manually loaded by depressing the Channel switches, but the circuit is not reset after the transfer of data to the external devices 25a or the peripheral control equipment 27, FIG. 1, unless the panel Clear Switch is depressed.

Once the Recorder output signal of flip-flop 164 is generated, the audio-processor 22 enters the Third Phase, FIG. 2, by setting flip-flop F2, FIG. 7. In particular, when the Recorder output signal of flip-flop 164, FIG. 28, goes "high," both inputs to AND gate 72, FIG. 7, will be "high." Accordingly, the output of AND gate 72 goes "high," driving the J input of flip-flop F2 "high." At this time, the J input of flip-flop F3 is "low" and the J and K inputs of flip-flop F1 are "low," Table 3. The A output of flip-flop F1 is "high," and the B and C outputs of flip-flops F2 and F3, respectively, are "low," as previously described.

With the inputs of the flip-flops F1, F2 and F3 in these conditions, a Clock pulse, FIG. 7, causes the B output of flip-flop F2 to change levels from a "low" to a "high" while the A output of flip-flop F1 remains "high" and the C output of flip-flop F3 remains "low." Thus, after the Clock pulse clocks flip-flops F1, F2 and F3, the A signal is "high," the B signal is "high" and the C signal is "low." The decoder output $\overline{OUT\ 11}$ therefore goes "low" while all the other decoder outputs, including decoder output $\overline{OUT\ 9}$, are "high," Table 2. This indicates that the audio-processor 22 enters the Third Phase, FIG. 2.

In the Third Phase, the SR Shift Register circuit, FIG. 20, must be loaded with the D-register data. The loading of data into the SR Shift Register circuit is controlled by the SR Register Load circuit, FIG. 22. When the decoder output $\overline{OUT\ 11}$ goes "low," it causes the output of AND gate 182 in the SR Register Load circuit, FIG. 22, to go "low." The output of AND gate 182 is inverted by inverters 184 and 186 which generate the SR Reg. Load signal. The SR Reg. Load signal appears at the Preset Enable inputs of SR Shift Registers #1 and 2, FIG. 20. When the SR Reg. Load signal goes "high," it loads the SR Shift Registers #1 and 2 with the parallel signal outputs D1–D8 of the D-Register Latch flip-flops 86–100, FIG. 14, and the "high" input signal FH, FIG. 20. The $\overline{\Sigma ODD}$·OUT 10 input is not loaded into the SR Shift register until the Fourth Phase.

To get from the Third Phase to the Fourth Phase, FIG. 2, the decoder output $\overline{OUT\ 10}$ must go "low." The J and K inputs of the flip-flops F1, F2 and F3, FIG. 7, in the Third Phase are determined by the logical gating circuitry connected thereto. The states of the J and K inputs during the Third Phase are summarized in Table 5 below.

SR Shift Register, FIG. 20. Specifically, parity checker/generator 188, FIG. 21, checks the number of input signals SR1-SR8 which are "high" and generates a ΣODD signal to indicate whether the number of "highs" is even or odd, respectively. In the encode mode, the Decode input signal to NAND gate 190, FIG. 21, is "low," as previously explained, so that the ODD input to parity checker/generator 188 is "high" while the EVEN input generated by inverter 192 is "low." In the embodiment described herein, parity checker/generator 188 may be a SN74180 9-Bit Odd-/Even parity checker/generator manufactured by Texas Instruments, Inc. The ΣEVEN and ΣODD inputs of the parity checker/generator, for the even and odd conditions are given in Table 6 below.

TABLE 5

| THIRD PHASE | | | | | | | | |
|---|---|---|---|---|---|---|---|---|
| AND gate 55 | | AND gate 52 | | NOR gate 54 | | NAND gate 56 | | J input |
| inputs | output | inputs | output | inputs | output | inputs | output | flip-flop F1 |
| $\overline{OUT\ 14}$=L | L | Valid Cue=L | L | AND gate 55 output=L | H | NOR gate 54 Output=H | L | L |
| | | | | AND gate 52 output=L | | $\overline{OUT\ 6}$=H | | |
| | | | | | | NAND gate 58 | | K input |
| | | | | | | inputs | output | flip-flop F1 |
| | | | | | | $\overline{OUT\ 11}$=L | H | H |
| | | | | NAND gate 70 | | AND gate 72 | | J input |
| | | | | inputs | output | inputs | output | flip-flop F2 |
| | | | | $\overline{OUT\ 9}$=H | L | NAND gate 70 output=L | L | L |
| | | | | $\overline{OUT\ 1}$=H | | | | |
| | | NAND gate 73 | | NAND gate 75 | | Inverter 77 | | K input |
| | | inputs | output | inputs | output | input | output | flip-flop F2 |
| | | $\overline{OUT\ 15}$=H | L | NAND gate 73 output=L | H | H | L | L |
| | | $\overline{OUT\ 7}$=H | | | | | | |
| | | | | OR gate 74 | | NAND gate 76 | | J input |
| | | | | inputs | output | inputs | output | flip-flop F3 |
| | | | | $\overline{OUT\ 2}$=H | H | $\overline{OUT\ 10}$=H OR gate 74 output=H | L | L |
| AND gate 85 | | AND gate 83 | | NOR gate 81 | | NAND gate 79 | | K input |
| inputs | output | inputs | output | inputs | output | inputs | output | flip-flop F3 |
| OUT 5=L | L | NAND gate output 73=L | L | AND gate output 83=L AND gate output 85=L | H | $\overline{OUT\ 12}$=H $\overline{OUT\ 4}$=H NOR gate output 81=H | L | L |

Corresponding to these conditions for the J and K inputs of the flip-flops, in the Third Phase, the A output of flip-flop F1 is "high," the B output of flip-flop F2 is "high," and the C output of flip-flop F3 is "low." When a Clock pulse appears at the Clock inputs of flip-flops F1, F2 and F3, the A output of flip-flop F1 goes "low," the B output of flip-flop F2 remains "high," and the C output of flip-flop F3 remains "low." Decoder 26, FIG. 8, therefore, generates a "low" signal at decoder output $\overline{OUT\ 10}$ and a "high" signal at all other decoder outputs, including decoder output $\overline{OUT\ 11}$. Thus, the audio-processor 22 enters the Fourth Phase, FIG. 2.

In the Fourth Phase, the Parity Checker/Generator circuit, FIG. 21, and the SR Register Load circuit, FIG. 22, cooperate to load the $\overline{\Sigma ODD}$·OUT 10 input into the

TABLE 6

| Output of Parity Checker/Generator 188 in Encode Mode | | | | |
|---|---|---|---|---|
| Input | | | Output | |
| ODD | EVEN | Σ of "high" SR1-SR8 | ΣEVEN | ΣODD |
| H | L | EVEN | L | H |
| H | L | ODD | H | L |

The ΣODD output of parity checker/generator 188 appears at an input to NOR gate 194 in the SR Register Load circuit, FIG. 22. The other input to NOR gate 194 is connected to the output $\overline{OUT\ 10}$ of Decoder 26, FIG. 8. In the Fourth Phase, decoder output $\overline{OUT\ 10}$ is "low." Accordingly, the level of the $\overline{\Sigma ODD}$·OUT 10 output of NOR gate 194 is determined by the level of the ΣODD output of parity checkr/generator 188. If the number of inputs SR1–SR8 which are "high" is even, the ΣODD input to NOR gate 194 is "high," and the NOR gate output is "low." On the other hand, if the number of inputs SR1–SR8 which are "high" is ODD, the ΣODD input to NOR gate 194 is "low" and the NOR gate 194 output is "high." During the Fourth Phase, the output of NOR gate 194 is loaded into the SR Shift Register. The inputs D1–D8 and FH, FIG. 22, were already loaded in during the Third Phase.

In the Fourth Phase, as previously explained, the decoder output $\overline{OUT\ 10}$ goes "low." This causes the output of NAND gate 76, FIG. 7, to go "high." In the Fourth Phase, therefore, the J input to flip-flop F3 is driven "high." In addition, the K input to flip-flip F1 goes "low" because all the inputs to NAND gate 58 are "high." The J and K inputs to flip-flop F2, the K input of flip-flop F3, and the J input of flip-flop F1 remain at their Third Phase levels, namely, "low," Table 5. Consequently, when a Clock pulse appears at the Clock inputs of flip-flops F1, F2 and F3, under these conditions, the A output of flip-flop F1 remains "low," the B output of flip-flop F2 remains "high," and the C output of flip-flop F3 changes from a "low" level to a "high" level. In response, Decoder 26, FIG. 8, generates a "low" signal at its $\overline{OUT\ 14}$ output and a "high" signal at all other outputs including output $\overline{OUT\ 10}$. The audio-processor 22, therefore, enters the Fifth Phase.

When decoder output $\overline{OUT\ 14}$ goes "low," in the Fifth Phase, decoder output $\overline{OUT\ 10}$ goes "high," Table 2, causing the output of NAND gate 76, FIG. 7, to go "low." The transition from a "high" level to a "low" level at the output of NAND gate 76 appears at the Clock input to flip-flop F4 and causes the Cycle signal at the Q output of the flip-flop to go "high." As will be described more fully hereinafter, the Cycle signal at the output of flip-flop F4 determines which phase the audio-processor 22 enters after completing operation in the Sixth Phase.

In the Fifth Phase, data is transmitted to the tape recorder 24. More particularly, data is serially shifted out of the SR Shift Registers #1 and 2, FIG. 20, by the SR Reg. Clock signal which is generated by the SR Register Clock Control circuit, FIG. 24.

The SR Register Clock Control circuit operates in response to the DClock signal. The DClock signal is generated by the Frequency Division circuit, FIG. 36. The DClock signal is a 500hz pulse train derived from the $\overline{Clock}$ signal generated by the Oscillator circuit, FIG. 9. The $\overline{Clock}$ signal is a 24Khz pulse train, as already explained. The $\overline{Clock}$ signal clocks flip-flops 196 and 198 in the Frequency Division circuit, FIG. 36. In the embodiment described herein, flip-flops 196 and 198 may be SN74107 dual J-K master-slave flip-flops. The Q output of flip-flop 198 is an 8Khz pulse train which clocks the Clock 2 input to 4-bit binary counter 200. In the embodiment described herein, 4-bit binary counter 200 may be a SN7493A 4-bit binary counter manufactured by Texas Instruments, Inc.

Figure 37:
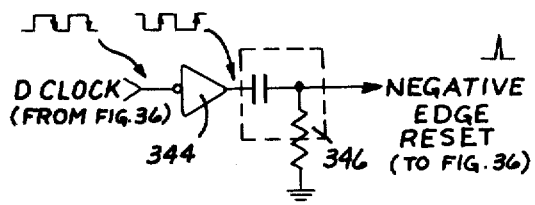

In response to the 8Khz Clock 2 input signal, 4-bit binary counter 200 generates a 4Khz pulse train at its $Q_A$ output. The 4Khz pulse train is designated FS1 in FIG. 36. In addition, 4-binary counter 200 generates the 500hz DClock signal at its $Q_D$ output. The $\overline{Clock}$ signal also clocks 4-bit binary counter 202 in FIG. 36. In the embodiment described herein 4-bit binary counter 202 may be a SN7493A 4-bit binary counter. The 4-bit binary counter 202 generates a 3Khz pulse train, designated as FS2, at its $Q_D$ output and is reset by the Negative Edge Reset circuit, FIG. 37, at the trailing edge of every DClock pulse. As previously mentioned, the DClock output of the Frequency Division circuit regulates the SR Register Clock Control circuit, FIG. 24. The FS1 and FS2 output signals operate the Transmit Logic (FSK) circuit, FIG. 38, as will be explained more fully hereinafter.

Figure 24:
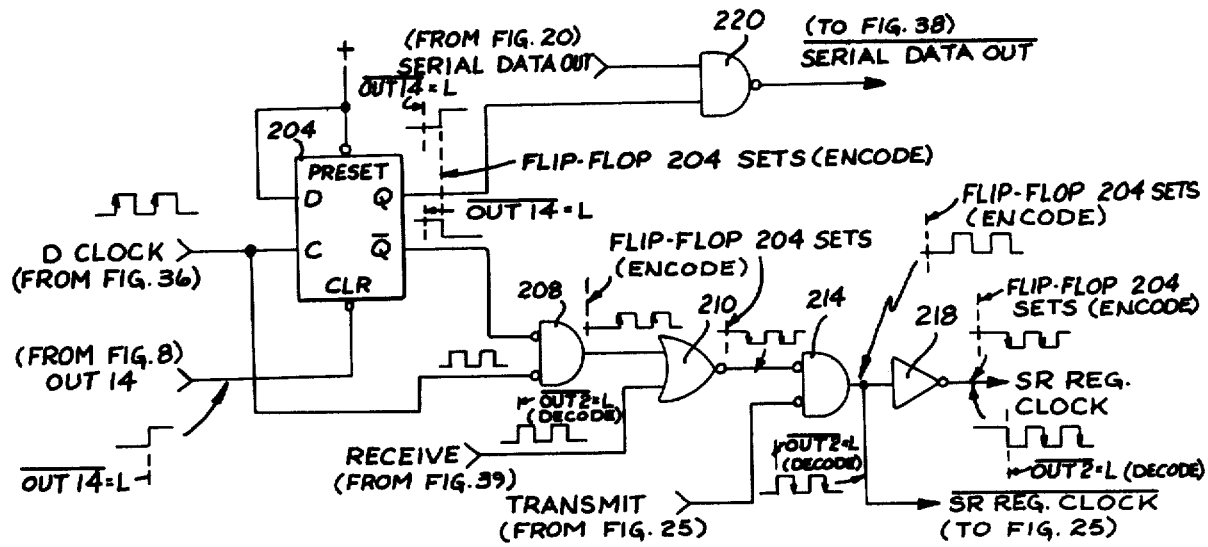

The DClock output of the Frequency Division circuit, FIG. 36, clocks flip-flop 204 in the SR Register Clock Control circuit, FIG. 24. The Clear input to flip-flop 204 is connected to the OUT 14 output of inverter 206 in the Status Decode circuit, FIG. 8. Until the Fifth Phase is entered by audio-processor 22, the OUT 14 signal is "low," keeping the $\overline{Q}$ output of flip-flop 204, FIG. 24, "high" and the Q output "low." In the Fifth Phase, the OUT 14 signal goes "high," freeing flip-flop 204. The rising edge of a DClock pulse, therefore, causes the $\overline{Q}$ output of flip-flop 204 to go "low" and the Q output to go "high."

Figure 39:
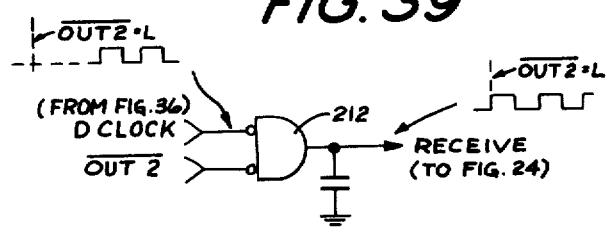

The $\overline{Q}$ output of flip-flop 204 appears at an input to NOR gate 208, FIG. 24. The DClock signal appears at the other input to NOR gate 208. Accordingly, the output of NOR gate 208 is an inverted replica of the DClock signal. The output of NOR gate 208 appears at an input to NOR gate 210. The other input of NOR gate 210 is connected to the output of NOR gate 212 in the Receive Clock Enable circuit, FIG. 39. One input to NOR gate 212, FIG. 39, is connected to the decoder output $\overline{OUT\ 2}$, FIG. 8. Throughout the encode mode of operation, the decoder output $\overline{OUT\ 2}$ is "high," as can be seen from the phase diagram in FIG. 2. As a result, in the encode mode, the Receive output signal generated by NOR gate 212 is "low." Since the Receive output signal of NOR gate 212 appears at the input to NOR gate 210, FIG. 24, NOR gate 210 inverts the output of NOR gate 208.

The output of NOR gate 210 appears at an input to NOR gate 214, FIG. 24. The other input to NOR gate 214 is connected to the Transmit output of AND gate 216 in the End of Word Decode circuit, FIG. 25. The Transmit output of AND gate 216 is initially "low" in the Fifth Phase, so that NOR gate 214, FIG. 24, inverts the output pulse train of NOR gate 210. The output of NOR gate 214 is designated $\overline{SR\ Reg.\ Clock}$ in FIG. 24. Inverter 218, FIG. 24, inverts the $\overline{SR\ Reg.\ Clock}$ signal at the output of NOR gate 214. The output of inverter 218 is therefore designated SR Reg. Clock.

As previously explained, in the Third and Fourth Phases, the SR Shift Registers #1 and 2 are loaded in parallel with ten bits of information—the D-Register Latch circuit outputs D1–D8, the FH signal input and the SR Register Loan circuit output $\overline{\Sigma ODD}\cdot \overline{OUT\ 10}$—and, in the Fifth Phase, these ten bits are serially shifted out of the SR Shift Registers #1 and 2 by the SR Reg. Clock signal, FIG. 20.

Figure 46:
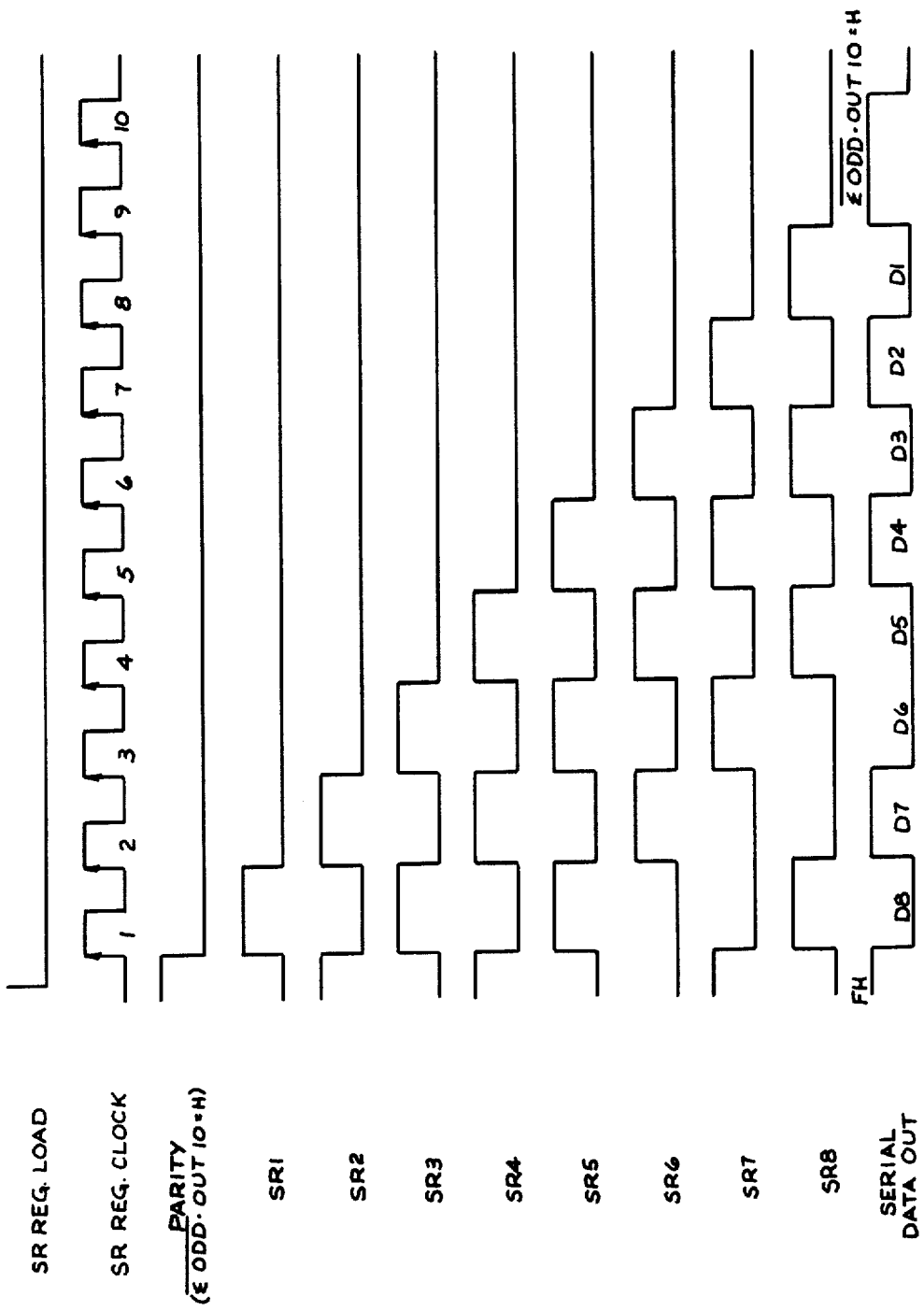
FIG. 46 is a timing diagram showing the operation of the SR Shift Register circuit, FIG. 20, in the encode mode of operation of the invention as defined hereinafter.

Specifically, the Serial Data Out terminal of SR Shift Register #2, FIG. 20, carries a serial representation of the ten parallel data inputs, FH D1–D8, and $\overline{\Sigma ODD}\cdot \overline{OUT\ 10}$, as shown in FIG. 46. The Serial Data Out output of SR Shift Register #2 is connected to an input of NAND gate 220 in the SR Register Clock control circuit, FIG. 24. The other input of NAND gate 220 is connected to the Q output of flip-flop 204. As previously explained, in the Fifth Phase, the Q output of flip-flop 204 goes "high." Consequently, the output of NAND gate 220 is an inverted replica of the Serial Data Out output of SR Shift Register #2 and is designated Serial Data Out. The output of NAND gate 220 is connected to the input of inverter 222 in the Transmit Logic (FSK) circuit, FIG. 38. The input of inverter 222 is also connected to an input to NAND gate 224. The other input to NAND gate 224 is connected to the FS2 output pulse train generated by the Frequency Division circuit, FIG. 36. The output of inverter 222 carries the Serial Data Out signal and is connected to an input to NAND gate 226. The other input to NAND gate 226 is connected to the FS1 pulse train output generated by the Frequency Division circuit.

Figure 38:
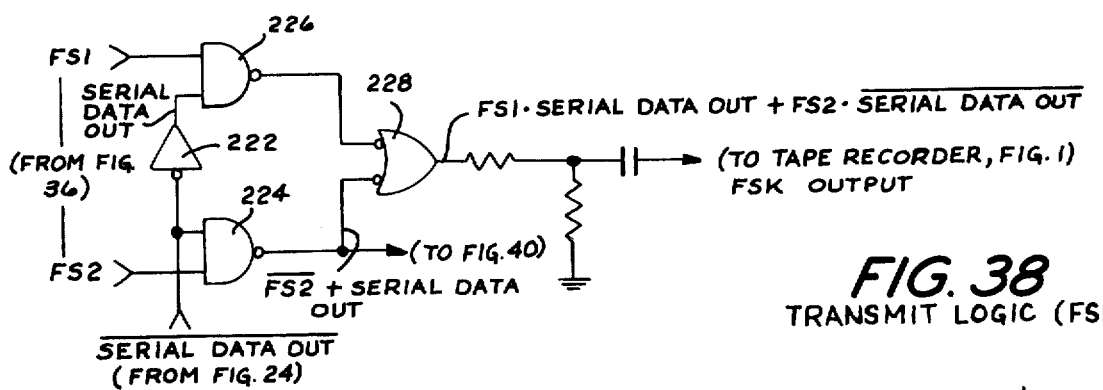

The Transmit Logic (FSK) circuit, FIG. 38, generates the FSK Output signal which is transmitted to the ape recorder 24. The FSK Output signal is a frequency shift key signal which is based upon the FS1 signal frequency, 4Khz, and the FS2 signal frequency, 3Khz. In particular, the FS1 pulse train modulates the "high" pulses appearing at the output of inverter 222. As previously mentioned, the output of inverter 222 is the Serial Data Out signal. The FS2 train modulates the "high" pulses in the Serial Data Out signal, and this is equivalent to modulating the "low" portions of the Serial Data Out signal. The outputs of NAND gates 226 and 224 are connected to the inputs of NAND gate 228, and the output of NAND gate 228 is therefore the frequency coded version of the Serial Data Out signal. Thus, the output of NAND gate 228 is a series of 3Khz and 4Khz pulse trains which, together, represent the information loaded into the SR Shift Registers #1 and 2, namely, the programmer punched tape data, and the $\overline{\Sigma ODD}$-OUT 10 and FH bits.

Referring to FIG. 46, it can be seen that at the tenth SR Reg. Clock pulse, the SR Shift Registers #1 and 2 are empty or reset. When the tenth SR Reg. Clock pulse is generated, the End of Word Decode circuit, FIG. 25, generates a Transmit signal which prevents the SR Register Clock circuit, FIG. 24, from generating any further SR Reg. Clock pulses. More specifically, the $\overline{SR Reg. Clock}$ output of NOR gate 214, FIG. 24, is connected to the Clock 1 input of 4-bit binary counter 230, FIG. 25. In the embodiment described herein, 4-bit binary counter 230 may be a SN7493A 4-bit binary counter. If either the Reset 1 or Reset 2 input of 4-bit binary counter 230 is "low," the counter will respond to the pulses at the Clock 1 input. During the Fifth Phase, decoder output $\overline{OUT 14}$ goes "low," as previously explained, and this causes AND gate 232 to generate a "low" signal at the Reset 1 and Reset 2 counter inputs. Consequently, during the Fifth Phase, the 4-bit binary counter 230 counts the pulses at its Clock 1 input.

The $Q_B$ and $Q_D$ outputs of counter 230 are connected to AND gate 216. When counter 230 counts the tenth pulse at its Clock 1 input, the $Q_B$ and $Q_D$ outputs go "high," causing the Transmit output of AND gate 216 to go "high." The Transmit output of AND gate 216 is connected to an input to NOR gate 214, FIG. 24. When the Transmit output of AND gate 216 goes "high," the output of NOR gate 214 stays "low," and the output of inverter 218 stays "high." As a result, no further pulses appear in the SR Reg. Clock input signal to SR Shift Registers #1 and 2, FIG. 20.

Figure 25:
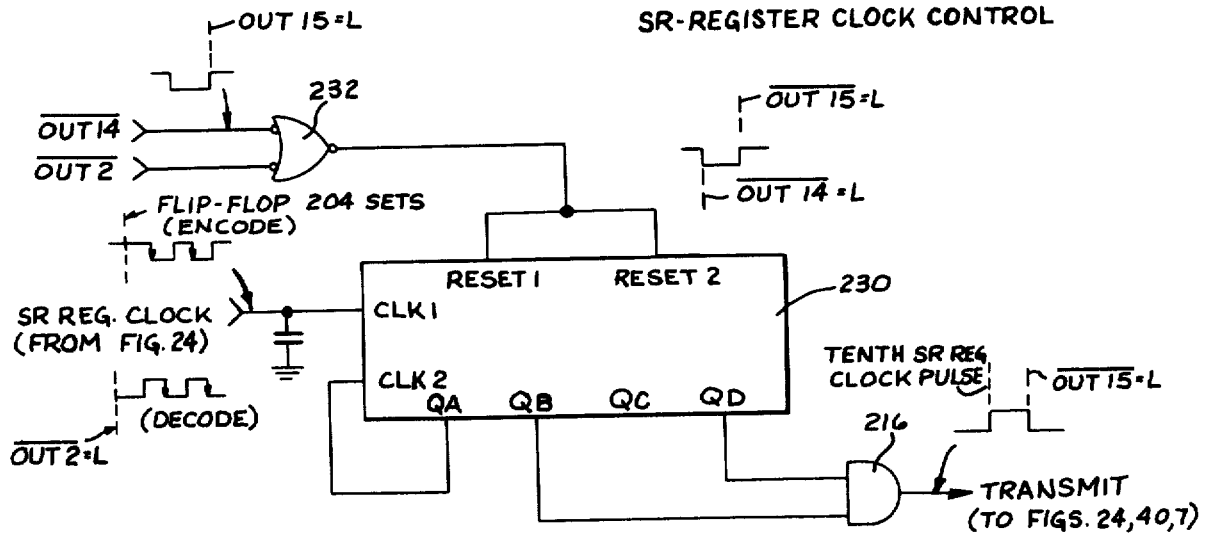

The Transmit output of AND gate 216, FIG. 25, is also connected to an input to AND gate 55 in the Input/Output Control circuit, FIG. 7. Since, in the Fifth Phase, the OUT 14 input signal to AND gate 55 is "high," when the Transmit signal output of AND gate 216 goes "high" it causes the output of AND gate 55 to go "high." As a result, the output of NOR gate 54 goes "low," causing the output of NAND gate 56 to go "high." Thus, the J input of flip-flop F1 is driven "high." In the Fifth Phase, however, the K input to flip-flop F1 is "low," so the next Clock pulse appearing at the Clock input to flip-flop F1 will cause the A output of the flip-flop to go from a "low" level to a "high" level. Additionally, in the Fifth Phase, the J and K inputs to flip-flops F2 and F3 are "low," so the B and C outputs of flip-flops F2 and F3 remain "high."

When all three outputs, A, B, and C, of the Input/Output Control circuit, FIG. 7, are "high," Decoder 26, FIG. 8, generates a "low" signal at its $\overline{OUT 15}$ output and a "high" signal at all other outputs including $\overline{OUT 14}$. The audio-processor 22, therefore, enters the Sixth Phase.

Figure 47:
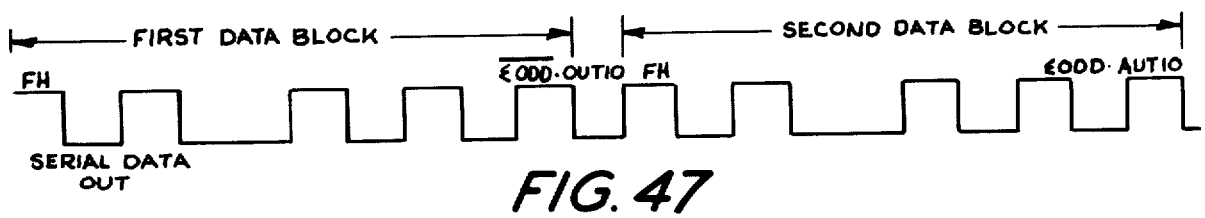
FIG. 47 is a diagram of the data format used in the preferred embodiment described herein.

When, in the Sixth Phase, decoder output $\overline{OUT 15}$ goes "low," it causes the output of NAND gate 73, FIG. 7, to go "high." Since the Cycle output of flip-flop F4 is also "high" at this time, the output of AND gate 83 goes "high." This, in turn, causes the output of NOR gate 81 to go "low," driving the output of NAND gate 79 "high." As a result, the K input of flip-flop F3 is driven "high." The J input to the flip-flop was driven "low" in the Fifth Phase, as already explained. Under these conditions, the next Clock pulse to appear at the Clock input of flip-flop F3 will cause the C output of the flip-flop to go "low." Thus, the A output of flip-flop F1 will be "high," the B output of flip-flop F2 will be "high," and the C output of flip-flop F3 will be "low." Decoder 26, therefoe, will generate a "low" signal at its $\overline{OUT 11}$ output and a "high" signal at all other outputs including $\overline{OUT 15}$. Audio-processor 22 will then cycle through the Third, Fourth, Fifth and Sixth Phases, FIG. 2, a second time. In its second cycle through these Phases, the audio-processor 22 re-generates the information stored in the SR Shift Registers #1 and 2 in serial form at the Serial Data Out terminal of SR Register #2. Thus, the information stored in SR Shift Registers #1 and 2 is transmitted two consecutive times, in two "data blocks" as shown in FIG. 47, to the tape recorder 24. The information is transmitted twice to allow for the possible destruction of part of one of the data blocks as it is recorded on the magnetic tape.

When the audio-processor 22 enters the Fifth Phase for the second time, the decoder output $\overline{OUT 14}$ goes "low" for the second time. Consequently, a second transition from a "high" level to a "low" level appears at the Clock input of flip-flop F4, causing the Cycle output of the flip-flop to go "low" and the $\overline{Cycle}$ output of the flip-flop to go "high."

When the audio-processor 22 enters the Sixth Phase for the second time, decoder output $\overline{OUT 15}$ will be "low" and the Send Data signal generated at the output of inverter 174, FIG. 30, will be "high." Decoder output $\overline{OUT 15}$ is connected to an input to NAND gate 73, FIG. 7, and, when output $\overline{OUT 15}$ goes "low," it causes the output of NAND gate 73 to go "high." In the Sixth Phase, therefore, all the inputs to NAND gate 75, FIG. 7, will be "high," causing the output of the NAND gate to go "low." The output of NAND gate 75 is inverted by inverter 77, which drives the K input to flip-flop F2 "high." The J input to the flip-flop had already been driven "low" in the Third Phase. The next Clock pulse appearing at the Clock input to flip-flop F2, therefore, causes the B output of the flip-flop to go from a "high" level to a "low" when the Transmit output of AND gate 216, FIG. 25, goes "low." The Transmit output signal goes "low" in the Sixth Phase since decoder output $\overline{OUT\ 15}$ goes "low" at that time causing AND gate 232, FIG. 25, to reset 4-bit binary counter 230. Thus, both the J and K inputs to flip-flop F1, FIG. 7, will be "low" in the Sixth Phase. Moreover, when audio-processor 22 enters the Sixth Phase for the second time, the Cycle output of flip-flop F4 will be "low," causing the output of AND gate 83 to go "low." Since the output OUT 5, of inverter 62, FIG. 8, will be "low" at this time, the output of AND gate 85, FIG. 7, will also be "low." Thus, both inputs to NOR gate 81 will be "low" causing the NOR gate output to go "high." As a result, all three inputs to NAND gate 79 will be "high," driving the K input to flip-flop F3 "low." The J input to flip-flop F3 had already been driven "low" in the Fifth Phase. Thus, both the J and K inputs to flip-flop F3 will be "low" in the Sixth Phase. Therefore, the Clock pulse which clocks flip-flop F2 will not affect flip-flops F1 and F3. Stated otherwise, the A output of the Input-/Output circuit, FIG. 7, remains "high," the B output goes "low," and the C output remains "high." Under these conditions, Decoder 26, FIG. 8, generates a "low" signal at its $\overline{OUT\ 13}$ output and a "high" signal at all its other inputs, including output $\overline{OUT\ 15}$. The audio-processor 22 therefore enters the Seventh Phase, FIG. 2.

In the Seventh Phase, the tape recorder 24 can be stopped either automatically or in response to the punched tape data. To stop the recorder 24 automatically, the Cue Mode switch FIG. 3A, must be in the MANUAL position. When the Cue Mode switch is in the MANUAL position, the $\overline{Manual}$ input to NAND gate 234, FIG. 7, will be "low." Accordingly, the output of NAND gate 235 will be "high." Since the output of NAND gate 234 is connected to an input to AND gate 236 in the Latch Reset Control circuit, FIG. 10, the output of AND gate 236 will go "high" if its other input is "high." The other input to AND gate 236 is connected to the output of NAND gate 238. One input of NAND gate 238 is connected to the decoder output $\overline{OUT\ 13}$, FIG. 8. Since, in the Seventh Phase, decoder output $\overline{OUT\ 13}$ goes "low," the output of NAND gate 238 will ge "high." Accordingly, with the Cue Mode switch in the MANUAL position, the output of AND gate will be "high." The output of AND gate 236 is connected to an input to NOR gate 242. The other input to NOR gate 242 is connected to the output of AND gate 240. AND gate 240 passes the PUP signal to the input to NOR gate 242. As previously explained, when power is initially applied to the audio-processor 22, the PUP signal goes "high" for 35ms and then goes "low." Accordingly, with the output of AND gate 240 "low," the "high" AND gate 236 output drives the $\overline{Latch\ Reset}$ output of NOR gate output 242 "low." The $\overline{Latch\ Reset}$ output of NOR gate 242 is connected to the Clear input to flip-flop 164 in the Recorder Control circuit, FIG. 28.

When the $\overline{Latch\ Reset}$ output of NOR gate 242 goes "low," therefore, it resets flip-flop 164, FIG. 28. When flip-flop 164 resets, the Recorder output signal goes "low," driving the (OS1 + Recorder) output signal of OR gate 166 "low." Thus, when the output of OR gate 166 goes "low," it turns "off" peripheral driver 154 in the Recorder Relay circuit, FIG. 27. When peripheral driver 154 turns "off," it disables the tape recorder relay (not shown) and the tape recorder stops.

The tape recorder 24 can also be stopped in response to the punched tape data with the Cue Mode switch in the REAL TIME position. To stop tape recorder 24 in response to the punched tape data, the panel Latch switch, FIG. 3B, must be in the NORMAL position. If the panel Latch switch is at NORMAL, the input to inverter 152 in the Recorder Relay Driver circuit, FIG. 27, will be "high" causing the $\overline{Latch}$ output of the inverter to go "low." Since the $\overline{Latch}$ output of inverter 152 is connected to an input to OR gate 244 in the Input-/Output Control circuit, FIG. 7, the output of OR gate 244 will go "low" only if its $\overline{Stop}$ output is "low" when its $\overline{Latch}$ input is "low." A "low" signal at the NAND gate 244 output will have the same effect as a "low" $\overline{Manual}$ signal. That is, a "low" signal at the output of NAND gate 244 will cause the audio-processor to stop the tape recorder.

Figure 17:
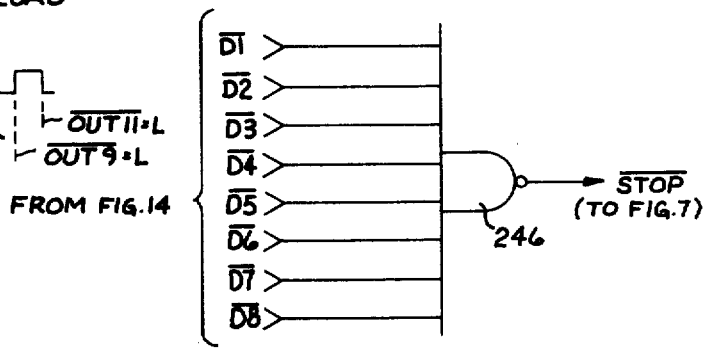

The $\overline{Stop}$ input signal to OR gate 244 is generated by the Stop Decode circuit, FIG. 17. In particular, the $\overline{Stop}$ signal is generated by the NAND gate 246, FIG. 17. The inputs to NAND gate 246 are the complementary or $\overline{Q}$ outputs $\overline{D1}$-$\overline{D7}$ of the seven flip-flops 86–98 and the Q output, D8, of flip-flop 100 in the D-Register Latch circuit, FIG. 14. Any combination of the $\overline{D1}$-$\overline{D9}$ and D8 output signals can be used as a Stop command. In the preferred embodiment described herein, the Stop command is generated when the first seven channels on the punched tape are blank and the eighth channel is punched. If only the 8th channel on the punched tape has a hole punched therein, all other channels being blank, the D-Register Latch circuit output D8 will be "high" and the outputs D1-D7 will be "low." Accordingly, the complementary outputs $\overline{D1}$-$\overline{D7}$ will be "high." Thus, all the inputs to NAND gate 246 will be "high," and the $\overline{Stop}$ output of the NAND gate will be "low."

As previously mentioned, the $\overline{Stop}$ output of NAND gate 246, FIG. 17, is connected to the input to OR gate 244 in the Input/Output Control circuit, FIG. 7. The output of OR gate 244, therefore, will go "low" when the panel Latch switch is in the NORMAL position and the $\overline{Stop}$ output, FIG. 17, goes "low." Because the output of OR gate 244 is "low," the output of NAND gate 234, FIG. 7, will be "high," driving the input to AND gate 236, FIG. 10, "high." Accordingly, when decoder output $\overline{OUT\ 13}$ goes "low" in the Seventh Phase, the output of AND gate 236 goes "high" and the $\overline{Latch\ Reset}$ output signal of NOR gate 242, FIG. 10, will go "low," resetting flip-flop 164 in the Recorder Control circuit, FIG. 28. As previously explained, when flip-flop 164 is reset, it causes the Recorder Relay Driver circuit, FIG. 27, to turn off the tape recorder 24. Thus, tape recorder 24 is stopped in the Seventh Phase if the D-Register Latch circuit is loaded with a Stop command from the punched tape and the Latch switch is at NORMAL.

As already mentioned, in th Seventh Phase, the Decoder output $\overline{OUT\ 13}$ goes "low." The decoder output $\overline{OUT\ 13}$ is connected to an input to NAND gate 58 in the Input/Ouptut Control circuit, FIG. 7. Thus, when the $\overline{OUT\ 13}$ signal goes "low," it causes the output of NAND gate 58 to go "high," driving the K input of flip-flop F1 "high." Since, at this time, the J input to flip-flop F1 is "low," the next Clock pulse at the Clock input of flip-flop F1 will cause the A output of the flip-flop to change from a "high" level to a "low" level. Since the J and K inputs to flip-flops F2 and F3 are "low" at this time, the Clock pulse will not affect these flip-flops. The A output of the Input/Output Control circuit, therefore, will go "low" while the B output remains "low" and the C output remains "high." Under these conditions, Decoder 26, FIG. 8, will generate a "low" signal at its $\overline{OUT\ 12}$ output and a "high" signal at all its other outputs including $\overline{OUT\ 13}$. The audio-processor 22 therefore enters the Eighth Phase.

In the Eighth Phase, the D-Register Latch circuit flip-flops 86–100, FIG. 14, are reset by the D-Register Reset circuit, FIG. 15. More specifically, in the Eighth Phase, decoder output $\overline{OUT\ 12}$ goes "low." Since decoder output $\overline{OUT\ 12}$ is connected to an input to NAND gate 146 in the D-Register Reset circuit, FIG. 15, the output of NAND gate 146 goes "high." The D-Register Reset signal outputs of inverters 148 and 150, FIG. 15, therefore, go "low." When the D-Register Reset signals go "low," they reset flip-flops 86–100 in the D-Register Latch circuit, FIG. 14.

Further, when, in the Eighth Phase, decoder output $\overline{OUT\ 12}$ goes "low," it causes the output and NAND gate 79, FIG. 7, to go "high," driving the K input to flip-flop F3 "high." At the same time, the J input to flip-flop F3 is "low." The next Clock pulse at the Clock input of flip-flop F3, therefore, will cause the C output of the flip-flop to change from a "high" level to a "low" level. Accordingly, the A output of the Input/Output Control circuit will be "low," the B output will be "low," and the C output will be "low." Under these conditions, the Decoder 26, FIG. 8, will generate a "low" signal at its $\overline{OUT\ 8}$ output and a "high" signal at all its other outputs including $\overline{OUT\ 12}$. Thus, the audio-processor 22 returns to the First or "Begin Encode" Phase. The foregoing sequence of events may be repeated until the desired program for controlling external devices 25a or peripheral control equipment 27, FIG. 1, has been executed and/or stored on the magnetic tape.

The preceding description of the preferred embodiment relates to the operation of the audio-processor 22, FIG. 1, in the encode mode of operation wherein data is transferred to the magnetic tape in tape recorder 24 and/or external devices 25a or peripheral control equipment 27, FIG. 1. The audio-processor, however, may also operate in a reverse mode, that is, the audio-processor may transfer data from the magnetic tape to external devices 25a or peripheral control equipment 27 and/or programmer 20, FIG. 1. The transfer of dta from the magnetic tape to the external devices 25a or the peripheral control equipment 27 and/or programmer 20 is referred to as the decode mode of operation.

In the decode mode, the panel Signal switch, FIG. 3A, is placed in the DECODE position. When the panel Signal switch is in the DECODE position, the input to inverter 28, FIG. 8, will be "low" and the Decode signal output of the inverter will be "high." The operation of Decoder 26 in the decode mode, is summarized in Table 8, below.

TABLE 8

| Decoder Inputs | | | Operation of Decoder 26 in Decode Mode Decoder Outputs | | | | | | | |
|---|---|---|---|---|---|---|---|---|---|---|
| A | B | C | $\overline{OUT\ 0}$ | $\overline{1}$ | $\overline{2}$ | $\overline{3}$ | $\overline{4}$ | $\overline{5}$ | $\overline{6}$ | $\overline{7}$ |
| L | L | L | L | H | H | H | H | H | H | H |
| H | L | L | H | L | H | H | H | H | H | H |
| L | H | L | H | H | L | H | H | H | H | H |
| H | H | L | H | H | H | L | H | H | H | H |
| L | L | H | H | H | H | H | L | H | H | H |
| H | L | H | H | H | H | H | H | L | H | H |
| L | H | H | H | H | H | H | H | H | L | H |

TABLE 8-continued

| Decoder Inputs | | | Operation of Decoder 26 in Decode Mode Decoder Outputs | | | | | | | |
|---|---|---|---|---|---|---|---|---|---|---|
| A | B | C | $\overline{OUT\ 0}$ | $\overline{1}$ | $\overline{2}$ | $\overline{3}$ | $\overline{4}$ | $\overline{5}$ | $\overline{6}$ | $\overline{7}$ |
| H | H | H | H | H | H | H | H | H | H | L |

H = "high"
L = "low"
Decode (output of Inverter 28) = H

To enter Phase A, the "Begin Decode" Phase, FIG. 2, flip-flops F1, F2 and F3, FIG. 7, must be reset. To enter Phase B, FIG. 2, a "high" Valid Cue signal must be generated. The Cue Load Logic circuit, FIG. 6, generates a "low" Reset signal and a "high" Value Cue signal in sequence to take the audio-processor 22 through Phases A and B.

More particularly, if either the panel Cue switch or the External Cue switch (with the Remote Cue switch set at NORMAL) is depressed, FIG. 3A, or if the programmer 20, FIG. 1, generates a $\overline{PBit\ 9}$ signal at the Optical Isolator circuit input, FIG. 12, a "low" Reset signal and a "high" Valid Cue signal are generated 50μs apart, as previously described with regard to the operation of the audio-processor in the encode mode. In the decode mode, however, programmer 20 may be disconnected from audio-processor 22, FIG. 1, so that the $\overline{PBit\ 9}$ signal would not appear at the input to the Optical Isolator Circuit, FIG. 12, and the Bit 9 Input Control circuit, FIG. 5, would not be used. The Cue Load Logic circuit, FIG. 6 would then be driven exclusively by the Cue signal input to NOR gate 44.

In Phase A, the "Begin Decode" Phase, FIG. 2, the Q outputs of flip-flops F1, F2 and F3, FIG. 7, will be "low." Decoder 26, FIG. 8, therefore, will generate a "low" signal at its $\overline{OUT\ 0}$ output and a "high" signal at all other outputs, Table 8. When the Valid Cue signal at the Q output of flip-flop 48, FIG. 6, goes "high," it causes the J input of flip-flop F1 to go "high," as previously described with regard to the operation of the audio-processor in the encode mode. All other inputs to flip-flops F1, F2 and F3 will be "low." The states of the J and K inputs and the Q outputs of flip-flops F1, F2 and F3, in the decode mode, are summarized in Table 9, below.

TABLE 9

| | Operation in Decode Mode Flip-Flops | | | | | | | | |
|---|---|---|---|---|---|---|---|---|---|
| | F1 | | | F2 | | | F3 | | |
| | J | K | Q | J | K | Q | J | K | Q |
| A | L | L | L | L | L | L | L | L | L |
| Valid Cue=H | H | L | L | L | L | L | L | L | L |
| B | L | L | H | L | L | L | L | L | L |
| Recorder=H | L | L | H | H | L | L | L | L | L |
| C | L | H | H | L | L | H | L | L | L |
| System Phase D | L | L | L | L | L | H | L | L | L |
| Load=L | L | L | L | L | L | H | H | L | L |
| E | H | L | L | L | L | H | L | L | H |
| F | L | L | H | L | L | H | L | H | H |
| C | L | H | H | L | L | H | L | L | L |
| D,E | — | — | — | — | — | — | — | — | — |
| $\overline{F}$ [Send Data · | L | L | H | L | L | H | L | L | H |
| Cycle] [Manual + (Stop | L | L | H | L | H | H | L | L | H |
| Latch)], G | L | H | H | L | L | L | L | L | H |
| H [Real Time · | L | L | L | L | L | L | L | H | H |
| (Stop · Latch)], G | L | L | H | L | L | L | L | H | H |
| B | L | L | H | L | L | L | L | L | L |

After the Valid Cue signal goes "high," a Clock pulse at the Clock inputs to flip-flops F1, F2 and F3 causes the Q output of flip-flop F1 to go "high" but does not affect the Q outputs of flip-flops F2 and F3 since the J and K inputs of flip-flops F2 and F3 are "low." Thus, after the Valid Cue signal goes "high" and a Clock pulse is received by the Input/Output Control circuit, FIG. 7, the Q outputs of flip-flops F1, F2 and F3 will be "high," "low," and "low," respectively, Table 9. Decoder 26, FIG. 8, therefore, will generate a "low" signal at its $\overline{OUT\ 1}$ output and a "high" signal at all its other outputs including $\overline{OUT\ 0}$, Table 8. This indicates that the audio-processor 22 has entered Phase B, FIG. 2.

When, in Phase B, decoder output $\overline{OUT\ 1}$, FIG. 8, goes "low," it causes flip-flop 48, FIG. 6, to reset. The Valid Cue signal, at the Q output of flip-flop 48, therefore goes "low." As previously explained with regard to the operation of the audio-processor in the encode mode, when the Valid Cue signal goes "low" it causes the J input to flip-flop F1, FIG. 7, to go "low." Thus, in Phase B, the J and K inputs to flip-flops F1, F2, and F3 will be "low," Table 9.

In Phase B of the decode mode, the same functions are performed by the audio-processor 22 as in the Second Phase of the encode mode except for the loading of the D-Register Latch circuit, FIG. 14. In Phase B, the D-Register Latch circuit is reset rather than loaded. Thus, in Phase B, the T-Register Latch circuit, FIG. 19, the SR-Shift Register circuit, FIG. 20, and the D-Register Latch circuit, FIG. 14, are all reset; the tape recorder is automatically started if the panel Latch switch, FIG. 3B, is in the NORMAL position; and the Send Data signal, FIG. 30, is generated.

As in the encode mode, the function of resetting the T-Register Latch and SR-Shift Register circuits is performed by the SR and T-Register Reset circuit, FIG. 29. However, whereas in the encode mode the $\overline{SR\ and\ T\text{-}Reg.\ Reset}$ signal, FIG. 29, is generated when decoder output $\overline{OUT\ 9}$ goes "low," in the decode mode it is generated when decoder output $\overline{OUT\ 1}$ goes "low."

Figure 3D:
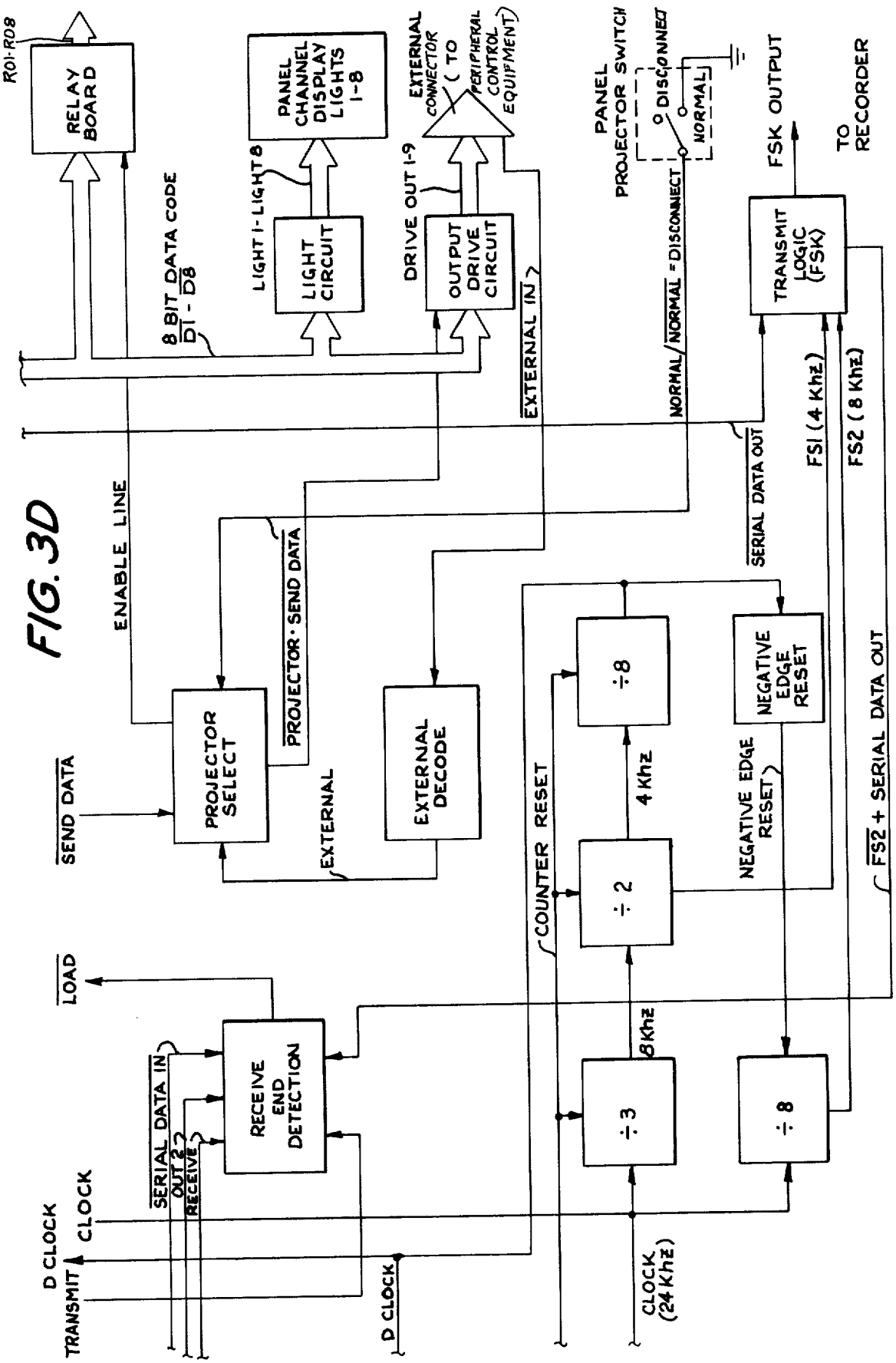

Similarly, as in the encode mode, the function of automatically starting tape recorder 24 is performed by the Recorder Control circuit, FIG. 28, in cooperation with the Recorder Relay Driver circuit, FIG. 27, when the panel Latch switch, FIG. 3B, is in the NORMAL position. However, whereas in the encode mode, one-shot circuit 158, FIG. 28, was triggered when decoder output $\overline{OUT\ 9}$ went "low," in the decode mode the one-shot is triggered when decoder output $\overline{OUT\ 1}$ goes "low." In addition, whereas in the encode mode the OS1 output of one-shot 158 goes "high" for 1.65 sec., in the decode mode the OS1 output goes "high" for 0.50sec. The duration of the OS1 output of one-shot 158 is shorter in the decode mode because, in that mode, the Decode input to NAND gate 156, FIG. 28, is "high" so that the output of the NAND gate is "low," turning "on" transistor $Q_1$. When transistor $Q_1$ is turned "on," resistor $R_7$ is placed in parallel with resistor $R_6$. In the preferred embodiment described herein, resistor R7 is 47K and resistor $R_6$ is 100K. Select reset—as below—— not Furthermore, in Phase B of the decode mode, the Send Data signal, FIG. 30, is generated by the Send Data One Shot circuit as in the encode mode. However, whereas in the encode mode the $\overline{Send\ Data}$ signal is generated when the decoder output $\overline{OUT\ 1}$ goes "low," in the decode mode it is generated when the decoder output $\overline{OUT\ 9}$ goes "low." In further contrast to the encode mode, although in Phase B the $\overline{Send\ Data}$ signal, FIG. 30, will activate the Projector /Select circuit, FIG. 41, if the panel Projector switch, FIG. 3D, is at NORMAL, as previously explained, this will not affect the external devices 25a or the peripheral control equipment 27, FIG. 1. Thus, in Phase B, the D-Register Latch circuit is reset-as will be explained more fully below-not loaded. Accordingly, no D-register data $\overline{D1\text{-}D8}$ is available for operating external devices 25a or peripheral control equipment 27 during Phase B.

As previously described with regard to the encode mode, the trailing edge of the Send Data signal triggers one-shot 178 in the Clear D-Register Decode Only circuit, FIG. 31. Although, in the encode mode, the Clear D-Register Decode Only circuit was insensitive to the Send Data signal because the Decode signal input to NAND gate 180, FIG. 31, was "low," in the decode mode the Clear D-Register Decode Only circuit responds to the Send Data signal since the Decode signal input to NAND gate 180 is "high." Thus, in the decode mode, the OS2 output of one-shot 178, FIG. 31, is inverted by NAND gate 180, that is, the Decode Clear signal output of NAND gate 130 goes "low" when the trailing edge of the Send Data signal goes "low." When the Decode Clear signal goes "low," it causes the output of NAND gate 146 in the D-Register Reset circuit, FIG. 15, to go "high." As a result, the D-Reg. Reset signal generated by inverters 148 and 150, FIG. 15, goes "low." As previously explained, the D-Reg. Reset signal appears at the Clear inputs of flip-flops 86–100 in the D-Register Latch circuit, FIG. 14, resetting those flip-flops. Thus, whereas in the encode mode the D-Register Latch circuit was loaded with the Word Select circuit outputs, FIG. 13, in the decode mode the D-Register Latch circuit is reset.

As previously mentioned, when decoder output $\overline{OUT\ 1}$, FIG. 8, goes "low" in Phase B, one-shot 158 in the Recorder Control circuit, FIG. 28, is triggered and generates the OS1 signal which is "high" for approximately 0.50sec. The trailing edge of the OS1 signal clocks flip-flop 164, FIG. 28, causing the flip-flop to generate a "high" Recorder signal at its Q output. The Recorder signal appears at an input to AND gate 72 in the Input/Output Control circuit, FIG. 7. Since decoder output $\overline{OUT\ 1}$ is "low" when the Recorder signal goes "high" in Phase B, the output of AND gate 72 will go "high," driving the J input to flip-flop F2 "high." The J and K inputs to flip-flops F1 and F3, and the K input to flip-flop F2, will be "low" at this time, Table 9. Accordingly, a Clock pulse at the Clock inputs to flip-flops F1, F2 and F3, FIG. 7, will cause the Q output of flip-flop F2 to go "high" while the Q outputs of flip-flops F1 and F3 remain "high" and "low", respectively. Under these conditions, Decoder 26, FIG. 8, will generate a "low" at its $\overline{OUT\ 3}$ output and a "high" signal at all its other outputs including $\overline{OUT\ 1}$. The audio-processor 22, therefore, enters Phase C, FIG. 2.

In Phase C, the output of NAND gate 58, FIG. 7, goes "high" in response to the "low" decoder output signal $\overline{OUT\ 3}$. Accordingly, the K input to flip-flop F1 goes "high," Table 9. The J and K inputs to flip-flop F3 remain "low," the J input to flip-flop F2 goes "low," and the J input to flip-flop F1 and the K input to flip-flop F2 remain "low," Table 9. The audio-processor 22 waits for the next Clock pulse to appear at the Clock inputs to flip-flops F1, F2 and F3 with the J and K flip-flop inputs in the aforementioned states. When the next Clock pulse appears at the Clock inputs to flip-flops F1, F2 and F3, it causes the Q output of flip-flop F1 to go "low," while the Q outputs of flip-flops F2 and F3 remain "high" and "low," respectively. Under these conditions, Decoder 26, FIG. 8, generates a "low" signal at its $\overline{OUT\ 2}$ output and a "high" signal at all its other outputs including $\overline{OUT\ 3}$. The audio-processor, therefore, enters Phase D, FIG. 2.

In Phase D, the audio-processor is ready to store the data from tape recorder 24. The data from the tape recorder 24 is in the format shown in FIG. 47, the "high" and "low" portions of the data being modulated by the FS1 and FS2 signals, respectively, FIG. 38, as previously described. The data, in this form, is processed by the Receiver Phase Locked Loop and Voltage Comparator circuits, FIGS. 32 and 33.

The Receiver Phase Locked Loop circuit, FIG. 32, includes a phase locked loop 248. In the embodiment described herein, phase locked loop 248 may be a conventional circuit such as a Signetics NE 565 locked loop with associated resistors, capacitors and diode elements as set forth in Table 10, below.

TABLE 10

| Resistors | Capacitors | Diodes |
|---|---|---|
| R20 | 10K C20 0.47µf | D21 1N914 |
| R21 | 1K C21 0.005µf | D22 1N914 |
| R22 | 8.8K C22 1500 f | |
| R23 | 5K C23 0.1µf | |
| R24 | 330Ω C24 0.01µf | |

The Receiver Phase Locked Loop circuit, FIG. 32, decodes the frequency shift key coded tape recorder data and provides amplitude signals PLL1 and PLL2 to the Voltage Comparator circuit, FIG. 33. The Voltage Comparator circuit, FIG. 33, includes a voltage comparator 250. In the preferred embodiment described herein, voltage comparator 250 may be a conventional circuit such as a National Semiconductor LM 311 voltage comparator with associated resistors and capacitors as set forth in Table 11, below.

TABLE 11

| Resistors | Capacitors |
|---|---|
| R26 10K | C25 0.01µf |
| R27 10K | C26 0.01µf |
| R28 20K | |
| R29 4.3K | |

The voltage comparator 250, FIG. 33, detects the amplitude fluctuations in the PLL1 and PLL2 outputs of the Receiver Phase Locked Loop circuit, FIG. 32, and generates a digital signal, VC, in response. More specifically, the VC output signal is a digital representation of the tape recorder data with the frequency shift key modulation stripped away. The VC signal output of voltage comparator 250 is connected to transistor Q2 in the Buffer circuit, FIG. 34. Transistor Q2 generates the $\overline{Serial\ Data\ In}$ output signal which is an inverted replica of the VC signal.

The $\overline{Serial\ Data\ In}$ output, FIG. 34, is connected to an input to NOR gate 252 in the SR Shift Register circuit, FIG. 20. The other input to NOR gate 252 is connected to the decoder output $\overline{OUT\ 2}$. Since, in Phase D, the decoder output $\overline{OUT\ 2}$ is "low," the output of NOR gate 252 will be an inverted replica of the $\overline{Serial\ Data\ In}$ signal. The output of NOR gate 252 is connected to the Serial In input of SR Shift Register #1, FIG. 20. The data at the Serial In input of SR Shift Register #1 is clocked into the SR Shift Register circuit, FIG. 20, by the SR Reg. Clock signal. As previously explained, the SR Reg. Clock signal appears at the Clock inputs to SR Shift Registers #1 and 2 and is generated by the SR Register Clock Control circuit, FIG. 24.

Referring to FIG. 24, the $\overline{Q}$ output of flip-flop 204 remains "high" in the decode mode—since the inverter output OUT 14, FIG. 8, remains "low"—keeping flip-flop 204 reset. The output of NOR gate 208, therefore, remains "low" in the decode mode. Therefore, the SR Reg. Clock signal must be generated in response to the Receive signal at the input to NOR gate 210. The Receive signal is generated by the Receive Clock Enable circuit, FIG. 39. In Phase D, the Receive signal is generated by NOR gate 212, FIG. 39, in response to the 500hz DClock signal input and the "low" $\overline{OUT\ 2}$ signal input. The Receive signal therefore is an inverted replica of the DClock signal.

In the decode mode, the Receive signal is inverted by NOR gate 210, FIG. 24, and re-inverted by NOR gate 214. The output of NOR gate 214 is the $\overline{SR\ Reg.\ Clock}$ signal. The $\overline{SR\ Reg.\ Clock}$ signal is inverted by inverter 218, FIG. 24, which provides the SR Reg. Clock signal to the SR Shift Register circuit, FIG. 20. Thus, the SR Reg. Clock signal is a replica of the DClock signal. However, the DClock signal, FIG. 36—and therefore the SR Reg. Clock signal, FIG. 24—is not generated in the decode mode until it is verified that the first bit of data recieved from the magnetic tape is "high." For consistency with the terminology used in the preceding description of the audio-processor in the encode mode, the first data bit received from the magnetic tape is hereinafter referred to as the FH bit, FIG. 48. The FH bit is always "high" and is the first bit in any data block, FIG. 47. The presence of the FH bit is verified by the FH Bit Verification/Reset Counters circuit, FIG. 35.

The FH Bit Verification/Reset Counters, FIG. 35, circuit includes a flip-flop 254. In the preferred embodiment described herein, flip-flop 254 may be a SN7476 dual J-K flip-flop. The J input of flip-flop 254 is connected to the output of inverter 256 and the Clock input of the flip-flop is connected to the output of inverter 258. The K input of the flip-flop is grounded. In addition, the Preset input of flip-flop 254 is connected to the Decode signal output of inverter 28, FIG. 8, and the Clear input to the flip-flop is connected to the output of NAND gate 260, FIG. 35. One input of NAND gate 260 is connected to the Decode signal output of inverter 28, FIG. 8, and the other input to the NAND gate is connected to decoder output $\overline{OUT\ 2}$, FIG. 8.

In the encode mode, the Decode signal output of inverter 28 is "low" as previously explained. Accordingly, flip-flop 254 is kept preset. When preset, the Q output of flip-flop 254, designated in FIG. 35 as the Counter Reset output, is "high" and the $\overline{Q}$ output of the flip-flop, designated as the $\overline{Counter\ Reset}$ output, is "low." The Counter Reset signal appears at the Clear inputs to flip-flops 196 and 198, FIG. 36, and the $\overline{Counter\ Reset}$ signal appears at the Reset 1 input to 4-bit binary counter 200, FIG. 36. Thus, in the encode mode, the Counter Reeset and $\overline{Counter\ Reset}$ signals enable flip-flops 196 and 198 and 4-bit binary counter 200 to run free. In contrast, in the decode mode, the Decode signal at the preset input to flip-flop 254, FIG. 35, is "high" so that the flip-flop does not preset. Furthermore, in the decode mode, unless the audio-processor is in Phase D, the decoder output $\overline{OUT\ 2}$ will be "high" and the output of NAND gate 260, FIG. 35, will be "low," keeping flip-flops 254 reset. When flip-flop 254 is reset, its Q output is "low" and its $\overline{Q}$ output is "High." Accordingly, in all phases of the decode mode, except Phase D, the Counter Reset and $\overline{\text{Counter Reset}}$ signals keep flip-flops 196 and 198 and 4-bit binary counter 200 reset so that the DClock output of the Frequency Division circuit, FIG. 36, cannot be generated.

In Phase D of the decode mode, however, the decoder output $\overline{\text{OUT 2}}$ goes "low" as previously explained. This causes the output of NAND gate 260, FIG. 35, to go "high," freeing flip-flop 254. Therefore, when the Serial Data In signal appears at the J input to flip-flop 154, the first data bit in the signal—the FH bit which is always "high"—will drive J input to flip-flop 254 "high," and the falling edge of the first Clock pulse at the Clock input to flip-flop 154 will cause the Q output of the flip-flop to go "high" and the $\overline{Q}$ outut of the flip-flop to go "low." Consequently, flip-flops 196 and 198 and 4-bit binary counter 200, FIG. 36, will be enabled to generate the DClock output signal.

When the DClock output signal, FIG. 36, is generated, the Receive Clock Enable circuit, FIG. 39, generates the Receive signal and the SR Register Clock Control circuit, FIG. 24, generates the SR Reg. Clock signal. As previously explained, the SR Reg. Clock signal shifts the Serial Data In signal through SR Shift Registers #1 and 2, FIG. 20. As the Serial Data In signal is shifted through the SR Shift Registers #1 and 2, the registers are insensitive to the parallel inputs ($\overline{\Sigma\text{ODD}}\cdot\overline{\text{OUT 10}}$), D1–D8 and FH since the SR Reg. Load signal keeps the Preset Enable inputs to the registers "low." The SR Reg. Load signal is "low" because both inputs to AND gate 182, FIG. 22, are "high" in the decode mode. The tape recorder data therefore apears at the parallel outputs of the SR Shift Registers, as shown in FIG. 48.

The tape recorder data format for each "cue" in a program includes two redundant data blocks, FIG. 47, as already explained. Each data block includes the FH bit as the first bit, eight channel data bits, and a last bit, hereinafter referred to as the Parity bit, which indicates whether an odd or even number of the preceding eight channel data bits is "high." As data is serially loaded into the SR Shift Register circuit, FIG. 20, the End of Word Decode circuit, FIG. 25, counts the number of bits by counting the number of $\overline{\text{SR Reg. Clock}}$ pulses. Thus, in Phase D, the decoder output $\overline{\text{OUT 2}}$ is "low," causing the output of AND gate 232, FIG. 25, to go "low," thereby freeing 4-bit binary counter 230. The 4-bit binary counter 230, therefore, counts the number of $\overline{\text{SR Reg. Clock}}$ pulses at its Clock 1 input. When the tenth bit, the last or Parity bit, is loaded into the SR Shift Registers, FIG. 20, the End of Word Decode circuit, FIG. 25, generates a "high" Transmit pulse at the output of AND gate 216. The Transmit pulse appears at an input to NAND gate 262 in the Receive End Detection circuit, FIG. 40. Another input to NAND gate 262 is connected to the Receive signal output of the Receive Clock Enable circuit, FIG. 39. The third input to NAND gate 262 is connected to the output of NOR gate 264, FIG. 40. The inputs of NOR gate 264 are connected to the Serial Data In output of inverter 256, FIG. 35, and the ($\overline{\text{FS2}}$ + Serial Data Out) output of NAND gate 224, FIG. 38.

Figure 48:
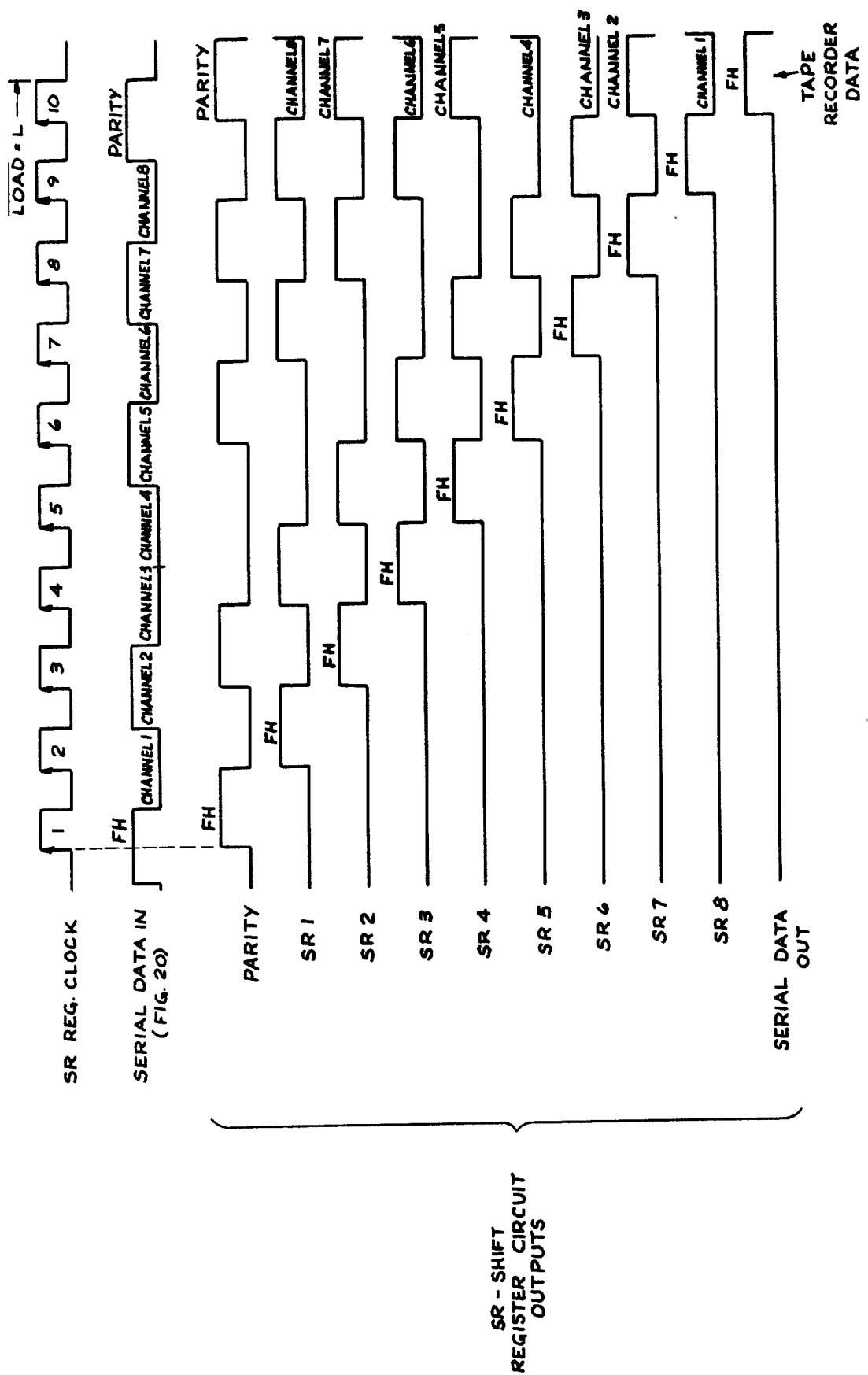
FIG. 48 is a timing diagram showing the operation of the SR Shift Register circuit, FIG. 20, in the decode mode of operation of the invention as defined hereinafter.

Referring to FIG. 48, the tenth SR Reg. Clock pulse loads the tenth bit, the last or Parity bit, into the SR Shift Register circuit, FIG. 20. When the tenth SR Reg. Clock pulse goes "high" the Receive signal, FIG. 39, goes "low". During this time, the $\overline{\text{Serial Data Out}}$ signal, FIG. 24, will be "high" because flip-flop 204 is kept reset by the OUT 14 signal which is "low." The FS2 signal, FIG. 36, is a 3Khz signal, as previously explained, having six pulses for each SR Reg. Clock pulse. Since the $\overline{\text{Serial Data Out}}$ signal is "high" during Phase D, the ($\overline{\text{FS2}}$ + Serial Data Out) signal, FIG. 38, is an inverted replica of the FS2 signal. In addition, the Serial Data In signal, FIG. 20, goes "low" after the tenth bit, the last or Parity bit, as shown in FIGS. 47 and 48.

Figure 40:
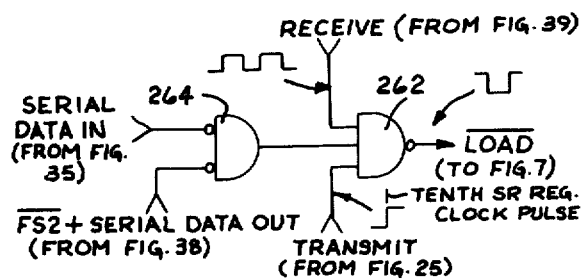
Figure 49:
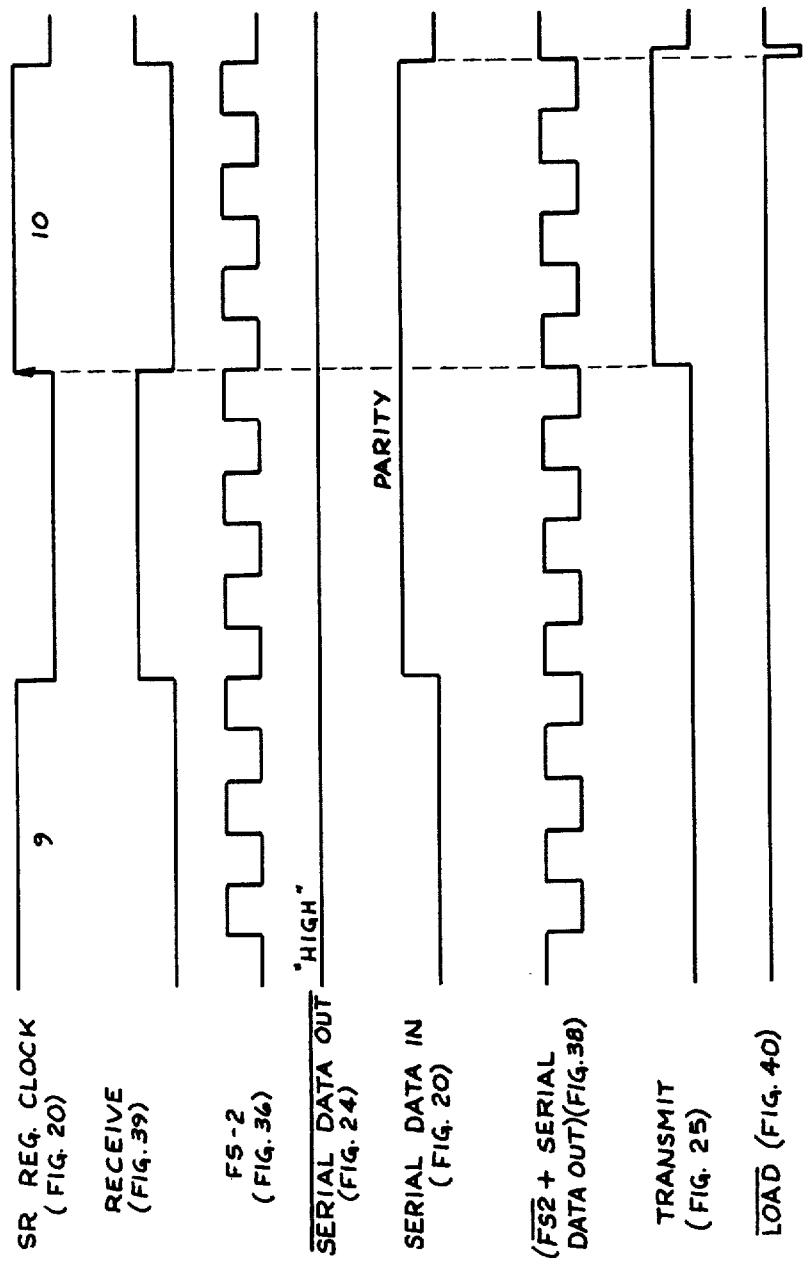
FIG. 49 is a timing diagram showing the generation of a Load signal, as defined hereinafter, in the preferred embodiment described herein.

When the Serial Data In signal goes "low" after the tenth bit, FIG. 49, it causes the output of NOR gate 264, FIG. 40, to go "high." The Receive and Transmit input signals to NAND gate 262, FIG. 40, are "high" at this time and, as a result, the NAND gate generates a "low" $\overline{\text{Load}}$ output signal, FIGS. 40 and 40. When the $\overline{\text{Load}}$ signal, FIG. 40, goes "low," it causes the J input to flip-flop F3, FIG. 7, to go "high," Table 9. Accordingly, the next Clock pulse appearing at the Clock input to flip-flop F3 causes the Q outut of the flip-flop to go "high" while the Q outputs of flip-flops F1 and F2 remain "low" and "high," respectively. Under these conditions, Decoder 26, FIG. 8, generates a "low" signal at its $\overline{\text{OUT 6}}$ output and a "high" signal at all other outputs including output $\overline{\text{OUT 2}}$. The audio-processor therefore enters Phase E, FIG. 2.

When decoder output $\overline{\text{OUT 2}}$ goes "high," it causes AND gate 232, FIG. 25, to reset 4-bit binary counter 230. The Transmit signal output of AND gate 216, FIG. 25, therefore goes "low." As a result, the $\overline{\text{Load}}$ signal output of NAND gate 262, FIG. 40, returns to the "high" level, as shown in FIG. 49.

Furthermore, when decoder output $\overline{\text{OUT 2}}$ goes "high," it causes the J input to flip-flop F3 and the Clock input to flip-flop F4, FIG. 7, to go "low." When the Clock input to F4 goes "low," it causes the Q output of the flip-flop, designated Cycle, to go "high." At the same time, the $\overline{Q}$ output of flip-flop F4, designated $\overline{\text{Cycle}}$, goes "low." Still further, when decoder output $\overline{\text{OUT 6}}$ goes "low," it causes the J input to flip-flop F1, FIG. 7, to go "high," Table 9. Consequently, the next Clock pulse to appear at the Clock input to flip-flop F1 causes the Q output of the flip-flop to go "high." The Q outputs of flip-flops F2 and F3, however, remain "high" since the J and K inputs of those flip-flops are "low," Table 9. Under these cnditions, Decoder 26, FIG. 8, generates a "low" signal at its $\overline{\text{OUT 7}}$ output and a "high" signal at all other inputs including $\overline{\text{OUT 6}}$, Table 8. The audio-processor therefore enters Phase F, FIG. 2.

Figure 19:
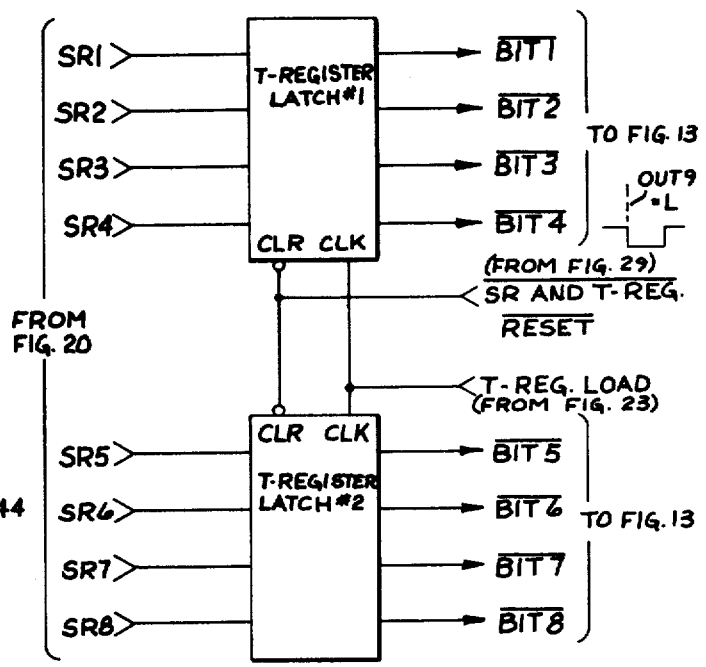

In Phase F, the parity of the Serial Data In signal, FIG. 20, is checked by the Parity Checker/Generator circuit, FIG. 21, and the T-Register Latch circuit, FIG. 19, is loaded with the SR Shift Register circuit outputs SR1–SR8, FIG. 20. Specifically, the level of the tenth Serial Data In bit, the last or Parity bit, FIG. 48, is compared by parity checker/generator 188, FIG. 21, to the number of the outputs SR1-14 SR8 which are "high." If the number of the outputs SR1-SR8 which are "high" is even, the Parity bit must be "low." On the other hand, if the number of outputs SR1-SR8 which are "high" is odd, the Parity bit must be "high." The Parity bit appears at the Parity output of SR Shift Register #1, FIG. 20, which is connected to an input to NAND gate 190, FIG. 21. The other input to NAND gate 190 is the Decode signal generated by inverter 28, FIG. 8. As previously explained, in the decode mode, the Decode signal is "high." Accordingly, the output of flops F1, F2 and F3, it causes the Q output of flip-flop F1 to go "low," while the Q outputs of flip-flops F2 and F3 remain "high" and "low," respectively. Under these conditions, Decoder 26, FIG. 8, generates a "low" signal at its $\overline{OUT\ 2}$ output and a "high" signal at all its other outputs including $\overline{OUT\ 3}$. The audio-processor, therefore, enters Phase D, FIG. 2.

In Phase D, the audio-processor is ready to store the data from tape recorder 24. The data from the tape recorder 24 is in the format shown in FIG. 47, the "high" and "low" portions of the data being modulated by the FS1 and FS2 signals, respectively, FIG. 38, as previously described. The data, in this form, is processed by the Receiver Phase Locked Loop and Voltage Comparator circuits, FIGS. 32 and 33.

The Receiver Phase Locked Loop circuit, FIG. 32, includes a phase locked loop 248. In the embodiment described herein, phase locked loop 248 may be a conventional circuit such as a Signetics NE 565 locked loop with associated resistors, capacitors and diode elements as set forth in Table 10, below.

TABLE 10

| Resistors | Capacitors | Diodes |
|---|---|---|
| R20 10K | C20 0.47μf | D21 1N914 |
| R21 1K | C21 0.005μf | D22 1N914 |
| R22 8.8K | C22 1500f | |
| R23 5K | C23 0.1μf | |
| R24 330Ω | C24 0.01μf | |

The Receiver Phase Locked Loop circuit, FIG. 32, decodes the frequency shift key coded tape recorder data and provides amplitude signals PLL1 and PLL2 to the Voltage Comparator circuit, FIG. 33. The Voltage Comparator circuit, FIG. 33, includes a voltage comparator 250. In the preferred embodiment described herein, voltage comparator 250 may be a conventional circuit such as a National Semiconductor LM 311 voltage comparator with associated resistors and capacitors as set forth in Table 11, below.

TABLE 11

| Resistors | Capacitors |
|---|---|
| R26 10K | C25 0.01μf |
| R27 10K | C26 0.01μf |
| R28 20K | |
| R29 4.3K | |

The voltage comparator 250, FIG. 33, detects the amplitude fluctuations in the PLL1 and PLL2 outputs of the Receiver Phase Locked Loop circuit, FIG. 32, and generates a digital signal, VC, in response. More specifically, the VC output signal is a digital representation of the tape recorder data with the frequency shift key modulation stripped away. The VC signal output of voltage comparator 250 is connected to transistor Q2 in the Buffer circuit, FIG. 34. Transistor Q2 generates the $\overline{Serial\ Data\ In}$ output signal which is an inverted replica of the VC signal.

The $\overline{Serial\ Data}$ In output, FIG. 34, is connected to an input to NOR gate 252 in the SR Shift Register circuit, FIG. 20. The other input to NOR gate 252 is connected to the decoder output $\overline{OUT\ 2}$. Since, in Phase D, the decoder output $\overline{OUT\ 2}$ is "low," the output of NOR gate 252 will be an inverted replica of the $\overline{Serial\ Data\ In}$ signal. The output of NOR gate 252 is connected to the Serial In input of SR Shift Register #1, FIG. 20. The data at the Serial In input of SR Shift Register #1 is clocked into the SR Shift Register circuit, FIG. 20, by the SR Reg. Clock signal. As previously explained, the SR Reg. Clock signal appears at the Clock inputs to SR Shift Registers #1 and 2 and is generated by the SR Register Clock Control circuit, FIG. 24.

Referring to FIG. 24, the $\overline{Q}$ output of flip-flop 204 remains "high" in the decode mode—since the inverter output OUT 14, FIG. 8, remains "low"—keeping flip-flop 204 reset. The output of NOR gate 208, therefore, remains "low" in the decode mode. Therefore, the SR Reg. Clock signal must be generated in response to the Receive signal at the input to NOR gate 210. The Receive signal is generated by the Receive Clock Enable circuit, FIG. 39. In Phase D, the Receive signal is generated by NOR gate 212, FIG. 39, in response to the 500hz DClock signal input and the "low" $\overline{OUT\ 2}$ signal input. The Receive signal therefore is an inverted replica of the DClock signal.

In the decode mode, the Receive signal is inverted by NOR gate 210, FIG. 24, and re-inverted by NOR gate 214. The output of NOR gate 214 is the $\overline{SR\ Reg.\ Clock}$ signal. The $\overline{SR\ Reg.\ Clock}$ signal is inverted by inverter 218, FIG. 24, which provides the SR Reg. Clock signal to the SR Shift Register circuit, FIG. 20. Thus, the SR Reg. Clock signal is a replica of the DClock signal. However, the DClock signal, FIG. 36—and therefore the SR Reg. Clock signal, FIG. 24—is not generated in the decode mode until it is verified that the first bit of data recieved from the magnetic tape is "high." For consistency with the terminology used in the preceding description of the audio-processor in the encode mode, the first data bit received from the magnetic tape is hereinafter referred to as the FH bit, FIG. 48. The FH bit is always "high" and is the first bit in any data block, FIG. 47. The presence of the FH bit is verified by the FH Bit Verification/Reset Counters circuit, FIG. 35.

The FH Bit Verification/Reset Counters, FIG. 35, circuit includes a flip-flop 254. In the preferred embodiment described herein, flip-flop 254 may be a SN7476 dual J-K flip-flop. The J input of flip-flop 254 is connected to the output of inverter 256 and the Clock input of the flip-flop is connected to the output of inverter 258. The K input of the flip-flop is grounded. In addition, the Preset input of flip-flop 254 is connected to the Decode signal output of inverter 28, FIG. 8, and the Clear input to the flip-flop is connected to the output of NAND gate 260, FIG. 35. One input of NAND gate 260 is connected to the Decode signal output of inverter 28, FIG. 8, and the other input to the NAND gate is connected to decoder output $\overline{OUT\ 2}$, FIG. 8.

In the encode mode, the Decode signal output of inverter 28 is "low" as previously explained. Accordingly, flip-flop 254 is kept preset. When preset, the Q output of flip-flop 254, designated in FIG. 35 as the Counter Reset output, is "high" and the $\overline{Q}$ output of the flip-flop, designated as the $\overline{Counter\ Reset}$ output, is "low." The Counter Reset signal appears at the Clear inputs to flip-flops 196 and 198, FIG. 36, and the $\overline{Counter\ Reset}$ signal appears at the Reset 1 input to 4-bit binary counter 200, FIG. 36. Thus, in the encode mode, the Counter Reeset and $\overline{Counter\ Reset}$ signals enable flip-flops 196 and 198 and 4-bit binary counter 200 to run free. In contrast, in the decode mode, the Decode signal at the preset input to flip-flop 254, FIG. 35, is "high" so that the flip-flop does not preset. Furthermore, in the decode mode, unless the audio-processor is in Phase D, the decoder output $\overline{OUT\ 2}$ will be "high" and the output of NAND gate 260, FIG. 35, will be "low," keeping flip-flops 254 reset. When flip-flop 254 is reset, its Q output is "low" and its $\overline{Q}$ output is "High." Accordingly, in all phases of the decode mode, except Phase D, the Counter Reset and $\overline{\text{Counter Reset}}$ signals keep flip-flops 196 and 198 and 4-bit binary counter 200 reset so that the DClock output of the Frequency Division circuit, FIG. 36, cannot be generated.

In Phase D of the decode mode, however, the decoder output $\overline{\text{OUT 2}}$ goes "low" as previously explained. This causes the output of NAND gate 260, FIG. 35, to go "high," freeing flip-flop 254. Therefore, when the Serial Data In signal appears at the J input to flip-flop 154, the first data bit in the signal—the FH bit which is always "high"—will drive J input to flip-flop 254 "high," and the falling edge of the first $\overline{\text{Clock}}$ pulse at the Clock input to flip-flop 154 will cause the Q output of the flip-flop to go "high" and the $\overline{Q}$ outut of the flip-flop to go "low." Consequently, flip-flops 196 and 198 and 4-bit binary counter 200, FIG. 36, will be enabled to generate the DClock output signal.

When the DClock output signal, FIG. 36, is generated, the Receive Clock Enable circuit, FIG. 39, generates the Receive signal and the SR Register Clock Control circuit, FIG. 24, generates the SR Reg. Clock signal. As previously explained, the SR Reg. Clock signal shifts the Serial Data In signal through SR Shift Registers #1 and 2, FIG. 20. As the Serial Data In signal is shifted through the SR Shift Registers #1 and 2, the registers are insensitive to the parallel inputs ($\overline{\Sigma\text{ODD}}\cdot$ OUT 10), D1–D8 and FH since the SR Reg. Load signal keeps the Preset Enable inputs to the registers "low." The SR Reg. Load signal is "low" because both inputs to AND gate 182, FIG. 22, are "high" in the decode mode. The tape recorder data therefore apears at the parallel outputs of the SR Shift Registers, as shown in FIG. 48.

The tape recorder data format for each "cue" in a program includes two redundant data blocks, FIG. 47, as already explained. Each data block includes the FH bit as the first bit, eight channel data bits, and a last bit, hereinafter referred to as the Parity bit, which indicates whether an odd or even number of the preceding eight channel data bits is "high." As data is serially loaded into the SR Shift Register circuit, FIG. 20, the End of Word Decode circuit, FIG. 25, counts the number of bits by counting the number of $\overline{\text{SR Reg. Clock}}$ pulses. Thus, in Phase D, the decoder output $\overline{\text{OUT 2}}$ is "low," causing the output of AND gate 232, FIG. 25, to go "low," thereby freeing 4-bit binary counter 230. The 4-bit binary counter 230, therefore, counts the number of $\overline{\text{SR Reg. Clock}}$ pulses at its Clock 1 input. When the tenth bit, the last or Parity bit, is loaded into the SR Shift Registers, FIG. 20, the End of Word Decode circuit, FIG. 25, generates a "high" Transmit pulse at the output of AND gate 216. The Transmit pulse appears at an input to NAND gate 262 in the Receive End Detection circuit, FIG. 40. Another input to NAND gate 262 is connected to the Receive signal output of the Receive Clock Enable circuit, FIG. 39. The third input to NAND gate 262 is connected to the output of NOR gate 264, FIG. 40. The inputs of NOR gate 264 are connected to the Serial Data In output of inverter 256, FIG. 35, and the ($\overline{\text{FS2}}$ + Serial Data Out) output of NAND gate 224, FIG. 38.

Referring to FIG. 48, the tenth SR Reg. Clock pulse loads the tenth bit, the last or Parity bit, into the SR Shift Register circuit, FIG. 20. When the tenth SR Reg. Clock pulse goes "high" the Receive signal, FIG. 39, goes "low". During this time, the $\overline{\text{Serial Data Out}}$ signal, FIG. 24, will be "high" because flip-flop 204 is kept reset by the OUT 14 signal which is "low." The FS2 signal, FIG. 36, is a 3Khz signal, as previously explained, having six pulses for each SR Reg. Clock pulse. Since the $\overline{\text{Serial Data Out}}$ signal is "high" during Phase D, the ($\overline{\text{FS2}}$ + Serial Data Out) signal, FIG. 38, is an inverted replica of the FS2 signal. In addition, the Serial Data In signal, FIG. 20, goes "low" after the tenth bit, the last or Parity bit, as shown in FIGS. 47 and 48.

When the Serial Data In signal goes "low" after the tenth bit, FIG. 49, it causes the output of NOR gate 264, FIG. 40, to go "high." The Receive and Transmit input signals to NAND gate 262, FIG. 40, are "high" at this time and, as a result, the NAND gate generates a "low" $\overline{\text{Load}}$ output signal, FIGS. 40 and 40. When the $\overline{\text{Load}}$ signal, FIG. 40, goes "low," it causes the J input to flip-flop F3, FIG. 7, to go "high," Table 9. Accordingly, the next Clock pulse appearing at the Clock input to flip-flop F3 causes the Q outut of the flip-flop to go "high" while the Q outputs of flip-flops F1 and F2 remain "low" and "high," respectively. Under these conditions, Decoder 26, FIG. 8, generates a "low" signal at its $\overline{\text{OUT 6}}$ output and a "high" signal at all other outputs including output $\overline{\text{OUT 2}}$. The audio-processor therefore enters Phase E, FIG. 2.

When decoder output $\overline{\text{OUT 2}}$ goes "high," it causes AND gate 232, FIG. 25, to reset 4-bit binary counter 230. The Transmit signal output of AND gate 216, FIG. 25, therefore goes "low." As a result, the $\overline{\text{Load}}$ signal output of NAND gate 262, FIG. 40, returns to the "high" level, as shown in FIG. 49.

Furthermore, when decoder output $\overline{\text{OUT 2}}$ goes "high," it causes the J input to flip-flop F3 and the Clock input to flip-flop F4, FIG. 7, to go "low." When the Clock input to F4 goes "low," it causes the Q output of the flip-flop, designated Cycle, to go "high." At the same time, the $\overline{Q}$ output of flip-flop F4, designated $\overline{\text{Cycle}}$, goes "low." Still further, when decoder output $\overline{\text{OUT 6}}$ goes "low," it causes the J input to flip-flop F1, FIG. 7, to go "high," Table 9. Consequently, the next Clock pulse to appear at the Clock input to flip-flop F1 causes the Q output of the flip-flop to go "high." The Q outputs of flip-flops F2 and F3, however, remain "high" since the J and K inputs of those flip-flops are "low," Table 9. Under these cnditions, Decoder 26, FIG. 8, generates a "low" signal at its $\overline{\text{OUT 7}}$ output and a "high" signal at all other inputs including $\overline{\text{OUT 6}}$, Table 8. The audio-processor therefore enters Phase F, FIG. 2.

In Phase F, the parity of the Serial Data In signal, FIG. 20, is checked by the Parity Checker/Generator circuit, FIG. 21, and the T-Register Latch circuit, FIG. 19, is loaded with the SR Shift Register circuit outputs SR1–SR8, FIG. 20. Specifically, the level of the tenth Serial Data In bit, the last or Parity bit, FIG. 48, is compared by parity checker/generator 188, FIG. 21, to the number of the outputs SR1-14 SR8 which are "high." If the number of the outputs SR1-SR8 which are "high" is even, the Parity bit must be "low." On the other hand, if the number of outputs SR1–SR8 which are "high" is odd, the Parity bit must be "high." The Parity bit appears at the Parity output of SR Shift Register #1, FIG. 20, which is connected to an input to NAND gate 190, FIG. 21. The other input to NAND gate 190 is the Decode signal generated by inverter 28, FIG. 8. As previously explained, in the decode mode, the Decode signal is "high." Accordingly, the output of NAND gate 190 is controlled by the level of the Parity bit. The states of the ODD and EVEN inputs to parity checker/generator 188, FIG. 21, as a function of the level of the Parity bit are summarized in Table 12, below.

TABLE 12

| Parity Bit | Output of Parity Checker/Generator 188 in Decode Mode | | | | |
|---|---|---|---|---|---|
| | Input | | Σ of "high" | Output | |
| | EVEN | ODD | SR1-SR8 | ΣEVEN | ΣODD |
| H | H | L | EVEN | H | L |
| H | H | L | ODD | L | H |
| L | L | H | EVEN | L | H |
| L | L | H | ODD | H | L |

If the level of the Parity bit is correct, the ΣEVEN output of parity checker/generator 188 will be ¢low." If the level of the Parity bit is incorrect, however, the ΣEVEN output of the Parity checker/generator will be "high."

Figure 23:
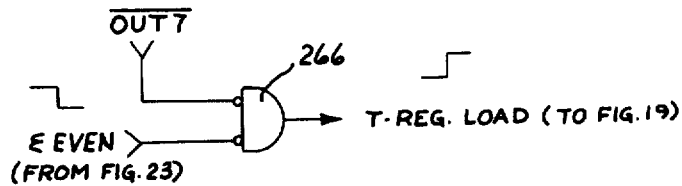

The ΣEVEN output of parity checker/generator 188, FIG. 21, is connected to an input to NOR gate 266 in the Load T-Register Latch/Parity Compare circuit, FIG. 23. The other input to NOR gate 266 is connected to output OUT 7 of Decoder 26, FIG. 8. Since, in Phase F, decoder output OUT 7 is "low," when the level of the Parity bit is correct and the ΣEVEN output of parity checker/generator 188, FIG. 21, goes "low," the T-Reg. Load outut of NOR gate 266, FIG. 23, will go "high." When the T-Reg. Load signal output of NOR gate 266 goes "high," it loads the T-Register Latches #1 and 2, FIG. 19, with the SR1-14 SR8 outputs of the SR Shift Register circuit, FIG. 20. On the other hand, if the level of the Parity bit is incorrect, ΣEVEN output of parity checker/generator 188, FIG. 21, stays "high," the T-Register Load signal stays "low," and the T-Register Latch circuit, FIG. 19, is not loaded.

When, in Phase F, decoder output OUT 7 goes ¢low," it causes the output of AND gate 83, FIG. 7, to go "high" since the Cycle output signal of flip-flop F4 is "high" and both inputs to AND gate 83 will therefore be "high." As a result, the K input to flip-flop F3 goes "high," Table 9. The next Clock pulse appearing at the input to flip-flop F3, therefore, causes the Q output of the flip-flop to go "low" while the Q outputs of flip-flops F1 and F2 remain "high," Table 9. Accordingly, the Decoder 26, FIG. 8, generates a "low" signal at its OUT 3 output and a "high" signal at all other outputs including OUT 7. Audio-processor 22, then, re-enters Phase C, FIG. 2. The audio-processor 22 then cycles through Phases D, E and F as before, receiving the second data block from the magnetic tape and loading the T-Registers. However, when the audio-processor cycles through Phases C, D, E and F for the second time, the flip-flop F4, FIG. 7, generates a "low" signal at is Q output and a "high" signal at its Q̄ output during Phase E. Consequently, when the audio-processor enters Phase F for the second time, the K input to flip-flop F3 will be "low" rather than "high," Table 9.

To go from Phase F to Phase G, FIG. 2, a (Send Data Cycle) condition must occur. As previously explained, the Send Data signal, FIG. 30, is generated in Phase B to clear the D-Registers. When the audio-Processor enters Phase F for the second time, the Send Data signal will have returned to a "low" level. The Send Data signal will therefore be "high." In addition, the Cycle output of flip-flop F4, FIG. 7, will be "high." Accordingly, all three inputs to NAND gate 75, FIG. 7, will be "high," causing the K input to flip-flop F2 to go "high,"

Table 9. Consequently, the next Clock pulse to appear at the Clock input to flip-flop F2 causes the Q output of the flip-flop to go "low," Table 9. The Q outputs of flip-flops F1 and F3, however, remain "low." Under these conditions, Decoder 26, FIG. 8, generates a "low" signal at its OUT 5 output and a "high" signal at all other outputs including output OUT 7. The audio-processor therefore enters Phase G, FIG. 2.

Figure 26:
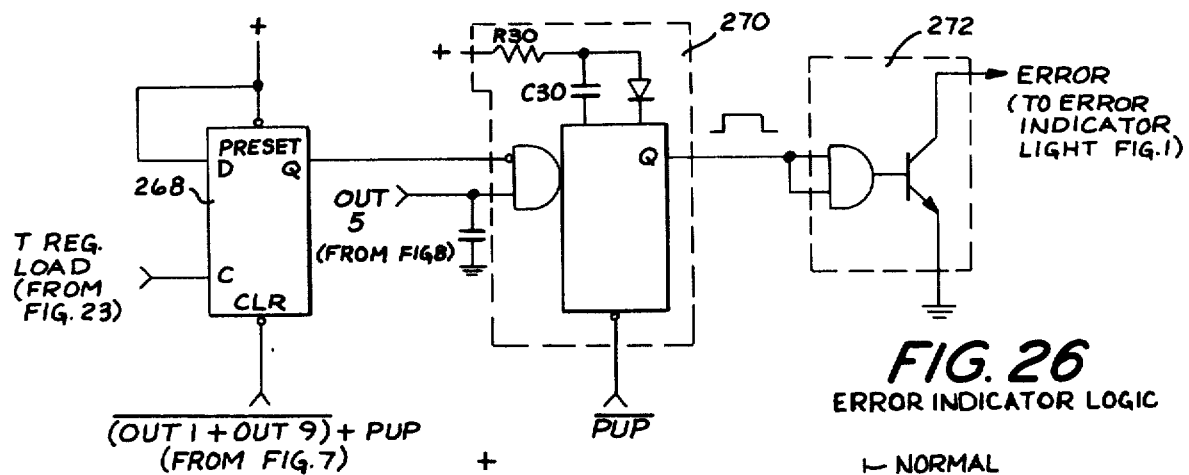

In Phase G, the D-Register Latch circuit, FIG. 14, is loaded with the outputs of the Word Select circuit, FIG. 13, and the Error Indicator Logic circuit, FIG. 26, is activated. More particularly, when the decoder output OUT 5 goes "low" in Phase G, it causes the outut of NAND gate 110 in the D-Register Load circuit, FIG. 16, to go "high." As a result, the output of NOR gate 106, FIG. 16, goes "low" and the D-Reg. Load signal outputs of inverters 102 and 104, FIG. 16, go "high." When the D-Reg. Load signal goes "high," it transfers the Word Select circuit outputs W1-W8, FIG. 13, to the Q outputs of flip-flops 86-100 in the D-Register Latch circuit, FIG. 14. Depending upon the mode of operation, namely, encode or decode, the Word Select circuit outputs W1-W8, FIG. 13, are generated in response to either the T-Register Latch circuit outputs Bit 1-Bit 8, FIG. 19, or the Optical Isolator circuit outputs IN1-IN8, FIG. 12. As previously explained, in the encode mode, the Word Select circuit responds only to the Optical Isolator circuit outputs IN1-IN8 and the T-Register Latch circuit, FIG. 19, is not loaded. In contrast, in the decode mode, the punched tape reader in programmer 20, FIG. 1, is disabled so that no IN-1-IN8 data is generated. In further contrast to the encode mode, in Phase F of the decode mode the T-Register Latch circuit, FIG. 19, is loaded with the SR Shift Register data SR1-SR8 if the level of the Parity bit is correct, as already explained. Accordingly, in the decode mode, the Word Select circuit, FIG. 13, responds only to the T-Register Latch circuit outputs Bit 1-Bit 8, FIG. 19. Thus, in Phase G of the decode mode, the D-Register Latch circuit, FIG. 14, is loaded with the T-Register information.

The Error Indicator Logic circuit, FIG. 26, is activated in Phase G only if the T-Register Latch circuit, FIG. 19, has not been loaded during Phase F. The T-Register Latch circuit will not be loaded during Phase F if the level of the Parity Bit is incorrect. Thus, if the level of the Parity Bit is incorrect. the ΣEVEN output of parity checker/generator 188, FIG. 21, will be "high" as previously explained. Consequently, the T-Reg. Load signal output of NOR gate 266, FIG. 23, will remain "low" and the T-Registers, FIG. 19, will not be loaded. The T-Reg. Load signal appears at the Clock input of flip-flop 268 in the Error Indicator Logic circuit, FIG. 26. In the preferred embodiment described herein, fip-flop 268 may be a SN7474 dual D-type positive edge-triggered flip-flop. The Clear input of flip-flop 268 is connected to the output of NOR gate 80 in the Input/Output Control circuit, FIG. 7. Therefore, when, in Phase B, the decoder output OUT 1 goes "low," Table 8, it resets flip-flop 268 and the Q output of the flip-flop gos "low." If the level of the Parity bit is incorrect, the T-Reg. Load signal at the Clock input to the flip-flop will be "low" and the Q output of the flip-flop will remain "low."

The Q output of flip-flop 268, FIG. 26, is connected to an input to one-shot circuit 270. In the preferred embodiment described herein, one-shot 270 may be a SN74123 dual retriggerable monostable multivibrator. When the Q output of flip-flop 268 is "low," one-shot 270 is triggered by a "low" to a "high" transition of the output OUT 5 of inverter 62, FIG. 8. The OUT 5 signal of inverter 62, FIG. 8, changes from a "low" level to a "high" level when audio-processor 22 enters Phase G, FIG. 2. Thus, if the Parity bit level is incorrect, one-shot 270, FIG. 26, will be triggered when the audio-processor enters Phase G. When triggered, the one-shot 270 generates a "high" pulse at its Q output. The duration of the pulse is determined by resistor $R_{30}$ and capacitor $C_{30}$. In the preferred embodiment described herein, resistor $R_{30}$ is 27K and capacitor $C_{30}$ is 100μf. The Q output of one-shot 270 is connected to peripheral driver 272 and, when the Q output of the one-shot goes "high" in Phase G, the peripheral driver turns "on," turning the Error Indicator Light, FIG. 1, "on." This indicates that the level of the Parity bit is incorrect.

If, on the other hand, the Parity Bit level is correct, the T-Reg. Load signal output of NOR gate 266, FIG. 23, will go "high," as previously explained. This causes the Q output of flip-flop 268, FIG. 26, to go "high," preventing one-shot 270 from being triggered. Stated otherwise, when the Parity bit level is correct, the T-Register Latch circuit, FIG. 19, is loaded in Phase F and the Error Indicator Light, FIG. 1, remains "off" during Phase G.

After performing the required operations in Phase G, FIG. 2, the audio-processor may either return to Phase B or enter Phase H. Moreover, the audio-processor may enter Phase H either automatically or in response to a Stop command signal on the magnetic tape. To enter Phase H automatically, the Cue Mode switch must be in the MANUAL position. If the Cue Mode switch is in the MANUAL position, the $\overline{\text{Manual}}$ input to NAND gate 234, FIG. 7, will be "low." Accordingly, the output of the NAND gate will be "high." Since, in Phase G, the OUT 5 signal input to NAND gate 60, FIG. 7, is also "high," the output of that NAND gate will be "low" when either the Cue Mode switch is in the MANUAL position. As a result, the K input to flip-flop F1 will be driven "high," Table 9. In addition, with the $\overline{\text{Manual}}$ signal "low," FIG. 7, the J and K inputs to flip-flops F2 and F3, FIG. 7, will be "low" in Phase G, Table 9. Accordingly, the next Clock pulse to appear at the Clock input to flip-flop F1 will cause the Q output of the flip-flop to go "low" while the Q outputs of flip-flops F2 and F3 remain "low" and "high," respectively, Table 9. The Decoder 26, FIG. 8, therefore, generates a "low" signal at its $\overline{\text{OUT 4}}$ output and a "high" signal at all other outputs including $\overline{\text{OUT 5}}$. The audio-processor 22, therefore, enters Phase H, FIG. 2.

When the decoder output $\overline{\text{OUT 4}}$ goes "low" in Phase H, it causes the K input to flip-flop F3, FIG. 7, to go "high," Table 9. Moreover, in Phase H, the OUT 5 output of inverter 62, FIG. 8, goes "low" causing the K input to flip-flop F1 to go "low," Tbale 9. The next Clock pulse to appear at the Clock inputs to flip-flops F1 and F3, therefore, cause the Q outputs of those flip-flops to go "low" and the Q output of flip-flop F2 remains "low." Thus, each of the flip-flops F1, F2 and F3, FIG. 7, will be reset, the audio-processor 22 will return to Phase A, and the decoder output $\overline{\text{OUT 0}}$ will go "low" while all other decoder outputs will be "high."

When the audio-processor returns to Phase A and the decoder output $\overline{\text{OUT 0}}$ goes "low," it causes the $\overline{\text{Latch Reset}}$ signal output of the Latch Reset Control circuit, FIG. 10, to go "low," resetting flip-flop 164 in the Recorder Control circuit, FIG. 28, and therby causing the Recorder Relay Driver circuit, FIG. 27, to stop tape recorder 24. Thus, if the Cue Mode switch is set at MANUAL, the audio-processor automatically returns to Phase A, FIG. 2, and stop tape recorder 24.

The audio-processor can also enter Phase H regardless of the position of the Cue Mode switch if a "high" (Stop . Latch) condition occurs, that is, if the Stop signal, FIG. 17, and the Latch signal, FIG. 27, are "low" at the same time. As previously explained, if the panel Latch switch is in the NORMAL position, the Latch signal, FIG. 27, will be "low." In addition, if the D-Register Latch circuit outputs $\overline{\text{D1}}$-$\overline{\text{D7}}$ and D8, FIG. 14, are "high," the $\overline{\text{Stop}}$ signal, FIG. 17, will go "low." This condition will occur when a Stop command is received from the magnetic tape. Thus, if the panel Latch switch is in the NORMAL position and a Stop command is received from the magnetic tape, both inputs to OR gate 244 in the Input/Output Control Circuit, FIG. 7, will be "low." Consequently, the output of OR gate 244 will go "low" and the output of NAND gate 234 will go "high" whether or not the Cue Mode switch is in the MANUAL position. The audio-processor will then cycle through Phases H and A and stop the tape recorder 24 as it would if the Cue Mode switch had been set at MANUAL.

If, however, the Cue Mode switch is set at REAL TIME instead of MANUAL and, in addition, either a Stop command is not received from the magnetic tape when the panel Latch switch, FIG. 3B, is at NORMAL or, although a Stop command may be received from the magnetic tape, the panel Latch switch is set at DISCONNECT, the audio-processor will return to Phase B, FIG. 2, rather than enter Phase H. In particular, under either of the above conditions, both inputs to NAND gate 234, FIG. 7, will be "high" and the output of the NAND gate will stay "low." As a result, the K input to flip-flop F1, FIG. 7, will stay "low", Table 9. In addition, since both the OUT 5 and $\overline{\text{Manual}}$ inputs to AND gate 85, FIG. 7, will be "high" in Phase G under these conditions, the K input to flip-flop F3 will go "high," Table 9. The next Clock pulse to appear at the Clock input to flip-flop F3, therefore, will cause the Q output of the flip-flop to go "low" while the Q outputs of flip-flops F1 and F2 remain "high" and "low," respectively, Table 9. Under these conditions, Decoder 26, FIG. 8, will generate a "low" signal at its $\overline{\text{OUT 1}}$ output and a "high" signal at all other outputs including $\overline{\text{OUT 5}}$. Audio-processor 22, therefore, re-enters Phase B, FIG. 2. The audio-processor then continues to cycle through the system phases as previously described. However, one-shot 158 in the Recorder Control circuit, FIG. 28, is not triggered when the audio-processor enters Phase B for the second time since the tape recorder is already running. That is, when the audio-processor re-enters Phase B, the $\overline{\text{Q}}$ output of flip-flop 164, FIG. 28, will be "low" disabling NAND gate 162 from triggering one-shot 158. Moreover, although when the audio-processor entered Phase B for the first time, neither the external devices 25a nor the peripheral control equipment 27, FIG. 1, could be operated, when the audio-processor enters Phase B for the second time it can operate the external devices or the peripheral control equipment. When the audio-processor entered Phase B for the first time, the D-registers, FIG. 14, were not loaded, that is, no data was available for operating the external devices or peripheral control equipment. However, when the audio-processor enters Phase B for the second time, the D-registers will have been loaded earlier in Phase G. Accordingly, when the Send Data signal is generated for the second time in Phase B, either the external devices or the peripheral control equipment can be operated by the audio-processor, according to the D-register outputs, as previously explained in connection with the encode mode of operation.

In addition, when the audio-processor enters Phase B for the second time, the D-register output information can be transmitted to the programmer. The programmer, in response, can store the information on the punched tape.

Although in the preceding description of the preferred embodiment, various digital logic elements and voltage levels have been referred to in explaining the functions performed by the invention, it should be appreciated that the invention is not confined to those specific logic elements and voltage levels. Thus, with the benefit of the preceding description, the voltage levels and logic elements may be modified without exceeding the spirit and scope of the invention.

Similarly, it will be evident from the preceding description that the timing relationship of the waveforms generated can be changed without affecting the inventive features disclosed herein. Moreover, certain other features of the invention described herein—such as the particular code used to generate a Stop command signal, the level of the FH bit, the levels used in checking the parity of the data, and the number of data channels—can be modified within the spirit and scope of the invention.

The present invention may be embodied in other specific forms without departing from the spirit or essential attributes thereof and, accordingly, reference should be made to the appended claims, rather than to the foregoing specification as indicating the scope of the invention.

I claim:

1. A method of controlling one or more audio-visual devices in response to stored information in parallel bit format on a punched tape or in serial bit format on a magnetic tape, comprising:
    selectively detecting either said information stored in serial bit format on said magnetic tape or in parallel bit format on said punched tape and generating a set of digital signals in parallel bit format in response thereto;
    temporarily storing said set of digital signals; and
    controlling said one or more audio-visual devices in response to said set of temporarily stored signals.

2. The method according to claim 1, including converting said set of temporarily stored digital signals from parallel bit format into serial bit format for storage on said magnetic tape.

3. Apparatus for controlling one or more audio-visual devices in response to stored information in parallel bit format on a punched tape or in serial bit format on a magnetic tape, comprising:
    first means for detecting said information stored in serial bit format on said magnetic tape and for generating a first set of digital signals in parallel bit format in response thereto;
    second means for detecting said information stored on said punched tape in parallel bit format and for generating a second set of digital signals in parallel bit format in response thereto;
    selectively actuatable means operatively connected to said first and second means for cuasing either said first means to detect said magnetic tape information and generate said first set of digital signals or said second means to detect said punched tape information and generate said second set of digital signals;
    third means operatively connected to said first and second means for temporarily storing said first or second sets of digital signals; and
    fourth means operatively connected to said third means for controlling said one or more audio-visual devices in response to said set of signals stored in said third means.

4. Apparatus according to claim 3, including fifth means for converting said digital signals stored in said third means from parallel bit format into serial bit format in a form for storage on said magnetic tape.

5. Apparatus according to claim 4 including means for automatically starting and stopping said magnetic tape.

6. Apparatus according to claim 5 including means for preventing said fifth means from converting said digital signals stored in said third means from parallel bit format to serial bit format until said magnetic tape reaches a stable operating speed.

7. Apparatus according to claim 4 including means for modulating said converted digital signals in a FSK code.

8. Apparatus according to claim 3 including means for checking the parity of said first set of digital signals.

* * * * *